(12) United States Patent
Ookubo et al.

(10) Patent No.: US 12,123,442 B2
(45) Date of Patent: Oct. 22, 2024

(54) FASTENING PART STRUCTURE FOR FRP MEMBER, METAL COLLAR, AND METHOD OF ATTACHING METAL COLLAR

(71) Applicant: Nissan Motor Co., Ltd., Kanagawa (JP)

(72) Inventors: Hiroshi Ookubo, Kanagawa (JP); Hayato Sakurai, Kanagawa (JP)

(73) Assignee: Nissan Motor Co., Ltd., Kanagawa (JP)

( * ) Notice: Subject to any disclaimer, the term of this patent is extended or adjusted under 35 U.S.C. 154(b) by 0 days.

(21) Appl. No.: 17/662,396

(22) Filed: May 6, 2022

(65) Prior Publication Data

US 2022/0260103 A1 Aug. 18, 2022

Related U.S. Application Data

(62) Division of application No. 16/649,089, filed as application No. PCT/JP2017/033917 on Sep. 20, 2017, now abandoned.

(51) Int. Cl.
*F16B 5/02* (2006.01)
*F16B 13/08* (2006.01)
*F16B 13/14* (2006.01)

(52) U.S. Cl.
CPC ...... *F16B 13/0858* (2013.01); *F16B 13/0825* (2013.01); *F16B 13/143* (2013.01)

(58) Field of Classification Search
CPC ........ F16B 5/01; F16B 5/0258; F16B 13/063; F16B 13/0891; F16B 13/124; F16B 19/02;

(Continued)

(56) References Cited

U.S. PATENT DOCUMENTS 2,499,315 A 2/1950 Johnson
2,508,409 A * 5/1950 Le .......................... F16B 13/124
59/85

(Continued)

FOREIGN PATENT DOCUMENTS

AU 496094 B2 12/1976
DE 102008047017 A1 3/2010

(Continued)

*Primary Examiner* — Flemming Saether
(74) *Attorney, Agent, or Firm* — Osha Bergman Watanabe & Burton LLP

(57) ABSTRACT

A metal collar attached in a through-hole of FRP member includes first and second collar members. The first collar member includes outer and inner circumferential surfaces. The outer circumferential surface is in contact with a hole inner circumferential surface of the through-hole. A slit is formed in a part in a circumferential direction of the first collar member. The second collar member applies a pressing force radially outward to at least a part of the inner circumferential surface of the first collar member or a pressing force to inner surfaces of the slit in a direction in which the inner surfaces separate from each other in the circumferential direction. The second collar member is held in the first collar member by reaction of the pressing force, deforms the first collar member for diameter expansion with the pressing force, and presses the outer circumferential surface against the hole inner circumferential surface.

64 Claims, 35 Drawing Sheets

(58) Field of Classification Search
CPC ........ F16B 7/14; F16B 7/1427; F16B 7/0413; F16B 13/0825; Y10T 16/05; Y10T 16/088
USPC ......... 411/55, 58, 69, 80.5, 80.6; 16/2.1, 2.5
See application file for complete search history.

(56) References Cited

U.S. PATENT DOCUMENTS

| | | | | |
|---|---|---|---|---|
| 2,901,787 | A | * | 9/1959 | Whistler, Jr. ......... F16B 13/124 |
| | | | | 403/19 |
| 2,936,014 | A | * | 5/1960 | Kraus ................... F16B 37/122 |
| | | | | 29/451 |
| 3,157,417 | A | * | 11/1964 | Ruskin ................. F16B 19/004 |
| | | | | 92/187 |
| 3,252,493 | A | | 5/1966 | Smith |
| 3,515,418 | A | * | 6/1970 | Nielsen, Jr. ............ A61B 5/021 |
| | | | | 403/109.5 |
| 3,566,662 | A | | 3/1971 | Champoux |
| 3,638,974 | A | | 2/1972 | Stratienko |
| 3,639,137 | A | | 2/1972 | Marinelli |
| 4,147,444 | A | * | 4/1979 | Herb ..................... F16B 13/122 |
| | | | | 411/80.6 |
| 4,244,661 | A | | 1/1981 | Dervy |
| 4,419,026 | A | * | 12/1983 | Leto ...................... F16D 41/063 |
| | | | | 403/DIG. 7 |
| 4,481,702 | A | * | 11/1984 | Mitchell ............... F16B 13/066 |
| | | | | 29/432 |
| 4,961,687 | A | | 10/1990 | Bost et al. |
| 5,011,319 | A | * | 4/1991 | Levi ...................... F16B 7/1427 |
| | | | | 403/109.5 |
| 5,549,407 | A | * | 8/1996 | Levi ...................... F16B 7/1427 |
| | | | | 403/374.1 |
| 5,738,477 | A | | 4/1998 | McCorkle et al. |
| 5,876,147 | A | * | 3/1999 | Longo .................... F16B 7/182 |
| | | | | 403/109.5 |
| 5,938,384 | A | * | 8/1999 | Pratt ..................... A43C 15/161 |
| | | | | 411/533 |
| 7,047,596 | B2 | | 5/2006 | Sucic et al. |
| 7,100,264 | B2 | | 9/2006 | Skinner et al. |
| 7,686,555 | B1 | * | 3/2010 | Larson ................... F16B 19/00 |
| | | | | 411/367 |
| 8,409,395 | B2 | | 4/2013 | Schumacher, Jr. et al. |
| 8,568,034 | B2 | | 10/2013 | Johnson |
| 10,030,380 | B2 | * | 7/2018 | Merrick ............... F16B 13/0891 |
| 10,980,310 | B2 | * | 4/2021 | Bartel ................ A43B 23/0225 |
| 2005/0084361 | A1 | | 4/2005 | Fly |

FOREIGN PATENT DOCUMENTS

| | | |
|---|---|---|
| FR | 2694608 A1 | 2/1994 |
| GB | 1356051 A | 6/1974 |
| JP | H7-117088 B2 | 12/1995 |
| JP | 3500256 B2 | 2/2004 |
| JP | 2007-332975 A | 12/2007 |
| JP | 2016-098999 A | 5/2016 |

\* cited by examiner

FASTENING PART STRUCTURE FOR FRP MEMBER, METAL COLLAR, AND METHOD OF ATTACHING METAL COLLAR

TECHNICAL FIELD

The present invention relates to a fastening part structure for an FRP member, a metal collar, and a method of attaching the metal collar.

BACKGROUND ART

For fastening a to-be-fastened object to a member made of fiber reinforced plastic (hereinafter, FRP member), there has been a method of attaching a metal collar in a through-hole formed in the FRP member and fastening the FRP member and the to-be-fastened object together using a fastener inserted through the metal collar. The metal collar is bonded and fixed to the FRP member with an adhesive applied in a gap between the outer circumferential surface of the metal collar and a hole inner circumferential surface. Japanese Patent Application Publication No. 2007-332975 discloses related art.

SUMMARY OF INVENTION

However, since the adhesive is creep-deformed, a relative positional relation between the through-hole and the metal collar and accordingly a relative positional relation between the FRP member and the to-be-fastened object often change with time. A conceivable method of suppressing the change with time is to make the gap as small as possible and reduce the thickness of a layer of the adhesive. However, if the gap is formed small, the insertion of the metal collar into the through-hole is more likely to be associated with a frictional force in an inserting direction of the metal collar acting on the hole inner circumferential surface. The frictional force can be a factor of a bend, peeling, and the like of reinforced fiber in a hole peripheral part.

In general, one or more embodiments of the present invention relate to a fastening part structure in which a metal collar is attached in a through-hole formed in an FRP member, prevent damage to reinforced fiber in a hole peripheral part, which may occur in the process of attaching the metal collar, while suppressing influence due to creep deformation of an adhesive.

In an aspect of the present invention, a metal collar attached in a through-hole of an FRP member includes a first collar member and a second collar member. The first collar member includes an outer circumferential surface and an inner circumferential surface. The outer circumferential surface is in contact with a hole inner circumferential surface of the through-hole. A slit communicating from one end face to another end face of the first collar member is formed in a part in a circumferential direction of the first collar member. The second collar member applies a pressing force outward in a radial direction to at least a part of the inner circumferential surface of the first collar member or applies a pressing force to inner surfaces of the slit in a direction in which the inner surfaces separate from each other in a circumferential direction. The second collar member is held in the first collar member by reaction of the pressing force, deforms the first collar member for diameter expansion with the pressing force, and presses the outer circumferential surface against the hole inner circumferential surface.

With the fastening part structure, it is possible to prevent damage to reinforced fiber in a hole peripheral part, which may occur in the process of attaching the metal collar, while suppressing influence due to creep deformation of an adhesive.

DESCRIPTION OF EMBODIMENTS

Fastening part structures for an FRP member according to several embodiments are explained below with reference to the drawings. Note that terms representing directions such as "upper" and "lower" in the following explanation are decided for convenience in order to explain positional relations among sections and do not limit actual attachment postures and the like. In this specification, an "axial direction" means the axial direction of a through-hole formed in an FRP member and a "radial direction" means the radial direction of the through-hole. When a sectional shape of the through-hole is an elliptical shape or a regular polygonal shape, the "radial direction" means a direction orthogonal to the center axis of the through-hole. A "circumferential direction" means a direction in which circumferential surfaces of members extends defined for each of the members.

First Embodiment

A fastening part structure according to a first embodiment is explained with reference to FIG. 1A to FIG. 1F.

Figure 1A:
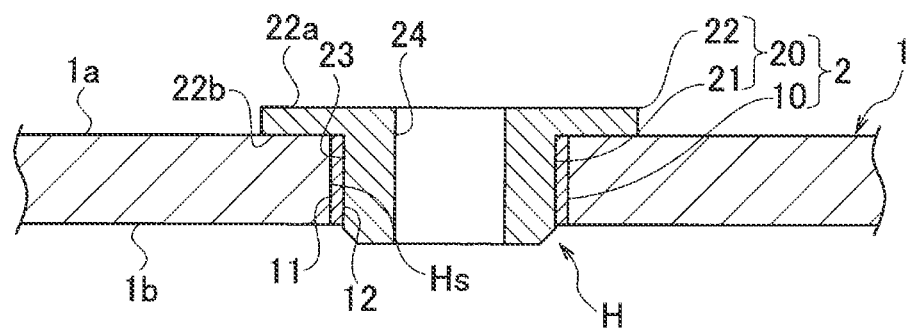
FIG. 1A is a sectional view along the center axis of a through-hole of a fastening part structure according to a first embodiment.
Figure 1B:
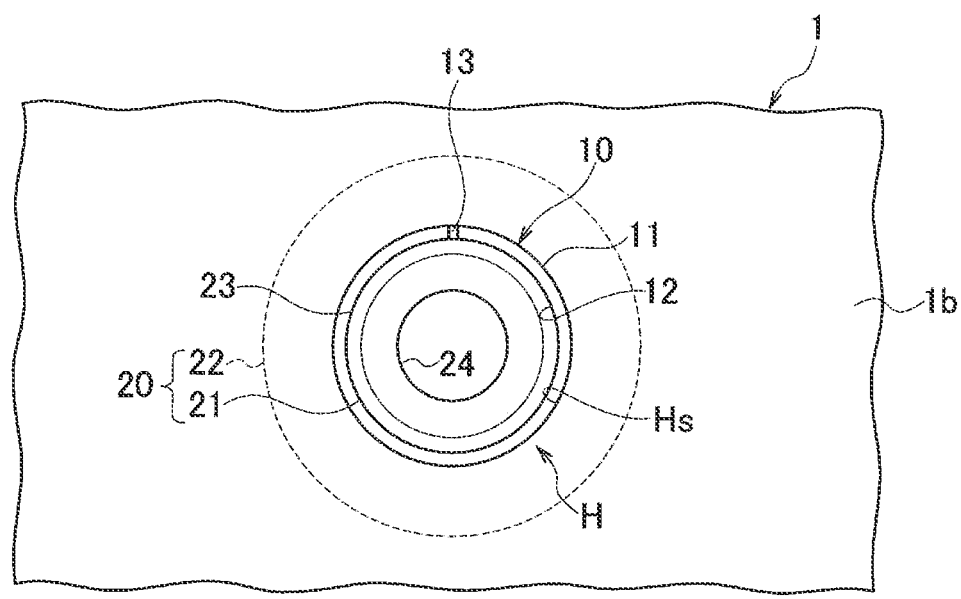
FIG. 1B is a lower side view of a fastening part structure according to the first embodiment.
Figure 1C:
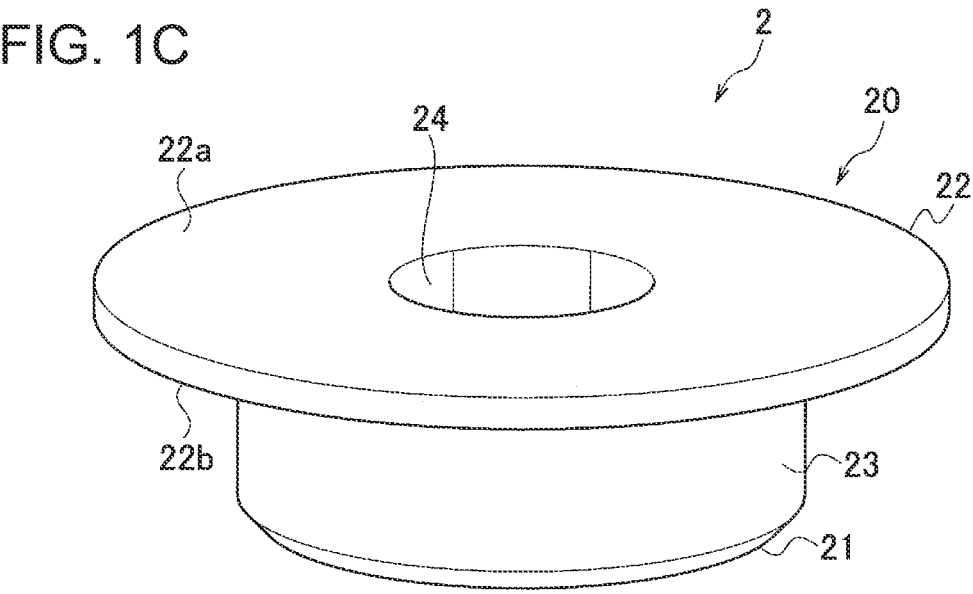
FIG. 1C is a developed perspective view of a metal collar according to the first embodiment.
Figure 1C:
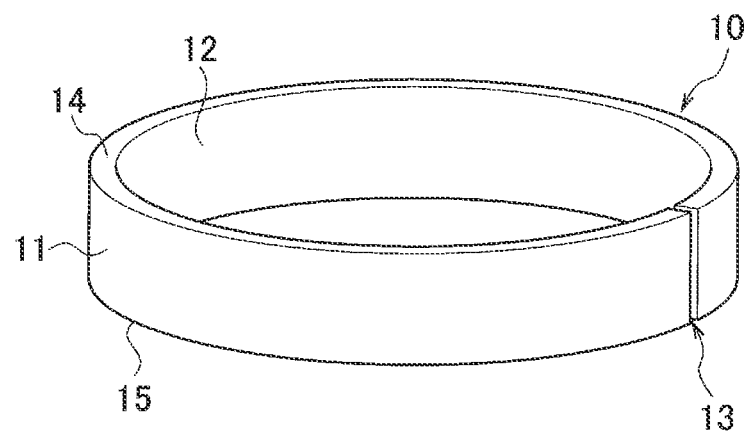

As shown in FIG. 1A and FIG. 1B, in the fastening part structure according to the first embodiment, a metal collar 2 is attached to a through-hole H formed in an FRP member 1. The metal collar 2 includes, as shown in FIG. 1C, an outer collar member 10 and an inner collar member 20.

The outer collar member 10 is configured from metal such as steel and has an annular or tubular shape. The outer collar member 10 includes an outer circumferential surface 11 and an inner circumferential surface 12. The width (or the axial direction length) of the outer collar member 10 is substantially equal to the depth of the through-hole H (or the width of a hole inner circumferential surface Hs).

A slit 13 is formed in a part in the circumferential direction of the outer circumferential surface 11 of the outer collar member 10. The outer collar member 10 assumes a C shape in plan view and is elastically deformable in the radial direction (a diameter expanding and reducing direction) of the through-hole H. The slit 13 communicates from a side surface 14, which is one end face, to a side surface 15, which is the other end face, in the axial direction of the outer collar member 10. The shape of the slit 13 is not limited to the shape shown in the figure and may obliquely incline with respect to the axial direction or may be a polygonal line shape, a curved line shape, or a shape obtained from a combination of the polygonal line shape and the curved line shape. When the outer collar member 10 is in a natural state, the outer circumferential surface 11 of the outer collar member 10 has an outer diameter smaller than the inner diameter of the hole inner circumferential surface Hs of the through-hole H.

The inner collar member 20 is configured from metal such as steel and includes a tubular main body section 21 and a tabular flange section 22. The flange section 22 extends outward in the radial direction from the upper side end portion of an outer circumferential surface 23 of the main body section 21. An insertion hole 24 for inserting a fastener F (see FIG. 21C and FIG. 21D) such as a bolt is opened on a side surface (a front surface) 22a on the upper side of the flange section 22.

As shown in FIG. 1A and FIG. 1B, the main body section 21 of the inner collar member 20 is fitted into the inner circumferential surface 12 of the outer collar member 10. The outer circumferential surface 23 of the main body section 21 is in contact with the inner circumferential surface 12 of the outer collar member 10. The outer collar member 10 is in a state where the outer collar member 10 is fitted into the hole inner circumferential surface Hs. The outer circumferential surface 11 of the outer collar member 10 is in contact with the hole inner circumferential surface Hs of the through-hole H. A side surface (a rear surface) 22b on the lower side (the outer collar member 10 side) of the flange section 22 and the side surface 14 on the upper side (the flange section 22 side) of the outer collar member 10 are opposed to and in contact with each other in the axial direction of the through-hole H (hereinafter, the axis of the through-hole H is referred to as "hole axis" as well).

The inner collar member 20 is pressed into the outer collar member 10. A pressing force is applied outward in the radial direction from the outer circumferential surface 23 (a pressing surface) of the main body section 21 to the inner circumferential surface 12 of the outer collar member 10. The outer collar member 10 is deformed in a diameter expanding direction by the pressing force. The outer circumferential surface 11 of the outer collar member 10 is pressed against the hole inner circumferential surface Hs. The inner collar member 20 receives reaction of the pressing force from the inner circumferential surface 12 of the outer collar member 10. The inner collar member 20 is held in the outer collar member 10 by the reaction.

The outer circumferential surface 23 of the main body section 21 of the inner collar member 20 and the inner circumferential surface 12 of the outer collar member 10 are bonded by an adhesive. The outer circumferential surface 11 of the outer collar member 10 and the hole inner circumferential surface Hs are bonded by the adhesive.

The peripheral part of the through-hole H of the FRP member 1 configures a fastening part in conjunction with the metal collar 2. The fastening part is fastened to an to-be-fastened object E (see FIG. 21C and FIG. 21D) laid on a surface 1b on the lower side of the FRP member 1 by the fastener F inserted through the insertion hole 24. A washer made of metal is interposed between the surface 1b on the lower side of the FRP member 1 and the upper surface of the to-be-fastened object E. In that state, the FRP member 1 and the to-be-fastened object E can also be fastened.

The FRP member 1 is configured from reinforced fiber and matrix resin. The reinforced fiber is made of continuous fiber oriented along the surface direction of the FRP member 1. The FRP member 1 can have a laminated structure obtained by laminating reinforced fiber bundles in one direction or at varied angles or a form of fabrics. The reinforced fiber is not particularly limited. For example, carbon fiber, glass fiber, polyaramide fiber, alumina fiber, silicon carbide fiber, boron fiber, and silicon carbide fiber can be used. As the carbon fiber, for example, polyacrylonitrile (PAN-based), pitch-based carbon fiber, cellulose-based carbon fiber, vapor phase growth-based carbon fiber, and graphite fiber can be used. Two or more kinds of these fibers may be combined and used. The matrix resin is not particularly limited. For example, publicly-known thermosetting resin and thermoplastic resin such as epoxy resin, phenolic resin, unsaturated polyester resin, vinyl ester resin, polyimide resin, polycarbonate resin, polyamide resin, and polyphenylene sulfide (PPS) resin can be used. Note that the reinforced fiber of the FRP member 1 may be made of long fiber, discontinuous fiber such as short fiber, or a combination of the continuous fiber and the discontinuous fiber. A part of the entire reinforced fiber may be oriented at random.

Action effects of this embodiment are explained below.

In this embodiment, the outer circumferential surface 23 of the main body section 21 of the inner collar member 20 is in contact with the inner circumferential surface 12 of the outer collar member 10 and applies a pressing force outward in the radial direction to the inner circumferential surface 12. The outer collar member 10 is deformed in the diameter expanding direction and the outer circumferential surface 11 of the outer collar member 10 is pressed against the hole inner circumferential surface Hs by the pressing force. Therefore, a layer thickness of the adhesive disposed in a gap between the outer circumferential surface 11 and the hole inner circumferential surface Hs can be set smaller than when the pressing force does not act. The inner collar member 20 is held in the outer collar member 10 by reaction of the pressing force received from the inner circumferential surface 12 of the outer collar member 10. That is, the shape of the outer collar member 10 is restrained by the hole inner circumferential surface Hs and the inner collar member 20. Therefore, a high pressing force can be more stably obtained than when the pressing force is obtained from only an elastic force of the outer collar member 10. Therefore, with the fastening part structure according to this embodiment, it is possible to suppress influence (for example, a change with time of a positional relation between the through-hole H and the metal collar 2) due to creep deformation of the adhesive.

In this embodiment, the slit 13 is formed in a part in the circumferential direction of the outer circumferential surface 11 of the outer collar member 10. The outer collar member 10 is deformable in the radial direction of the through-hole H. Therefore, when the outer collar member 10 is fitted into the through-hole H, the outer collar member 10 can be fitted while being deformed for diameter reduction. Consequently, it is possible to prevent a high frictional force from acting on the hole inner circumferential surface Hs from the outer collar member 10. The outer collar member 10 fitted into the through-hole H is disposed such that the outer circumferential surface 11 of the outer collar member 10 is in contact with the hole inner circumferential surface Hs. Therefore, when the inner collar member 20 is fitted into the outer collar member 10, the hole inner circumferential surface Hs can be protected by the outer collar member 10. Therefore, with the fastening part structure according to this embodiment, it is possible to prevent damage to the reinforced fiber in the hole peripheral part that may occur in the process of attaching the metal collar 2.

In this embodiment, the outer diameter of the outer circumferential surface 11 of the outer collar member 10 is smaller than the inner diameter of the hole inner circumferential surface Hs even when the outer collar member 10 is in the natural state. Therefore, when the outer collar member 10 is attached in the through-hole H, it is possible to more surely prevent a high frictional force from acting on the hole inner circumferential surface Hs from the outer collar member 10. Note that, in general, a tolerance of the inner diameter of the through-hole H of the FRP member 1 is −0.2 mm to +0.2 mm. The outer diameter of the outer circumferential surface 11 of the outer collar member 10 in the natural state is desirably set smaller than a minimum value of the tolerance. Consequently, it is possible to more surely prevent an input of a frictional force to the hole inner circumferential surface Hs when the outer collar member 10 is fitted into the through-hole H.

In this embodiment, since the inner collar member 20 is pressed into the outer collar member 10, it is possible to press the outer circumferential surface 11 of the outer collar member 10 against the hole inner circumferential surface Hs with a simple configuration and at a high press force.

<Method of Attaching the Metal Collar>

Figure 1D:
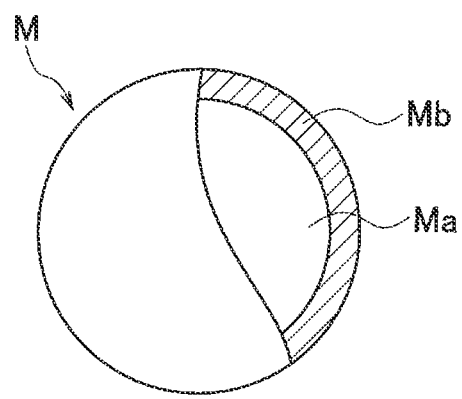
FIG. 1D is a partial sectional view showing the structure of a microcapsule.

A method of attaching the metal collar 2 in this embodiment is explained with reference to FIG. 1D to FIG. 1F.

(1) Adhesive Applying Process

Prior to an assembly process explained below, microcapsules M are applied to at least one of the outer circumferential surface 23 of the main body section 21 and the inner circumferential surface 12 of the outer collar member 10 and the outer circumferential surface 11 of the outer collar member 10 in advance and dried.

The microcapsules M are applied on an application surface using resin as a binder and dried to form a film. As shown in FIG. 1D, the microcapsule M is configured from an adhesive, which is a core material Ma, and a film material Mb containing the adhesive. The pressing force and the press force at the time when the outer circumferential surface 11 of the outer collar member 10 is pressed against the hole inner circumferential surface Hs act on the microcapsule M, whereby the microcapsule M is broken and discharges the adhesive encapsulated inside the microcapsule M. The microcapsules M can be manufactured using a publicly-known method including a chemical method such as an interfacial polymerization method, a physicochemical method such as a coacervation method, or a mechanical method such as pan coating method.

As the adhesive, for example, a publicly-known adhesive such as an epoxy adhesive or an acrylic adhesive that hardens when a solvent in the adhesive evaporates, hardens when reacting with oxygen and moisture in the air, and hardens when receiving heat and an ultraviolet ray can be used. The adhesive may be a one-liquid type or a two-liquid mixing type. The adhesive of the two-liquid mixing type hardens when the film material Mb of the microcapsule M is broken and, for example, a main agent and a hardening agent are mixed. The main agent and the hardening agent may be stored in separate microcapsules M. Two chambers may be provided in one microcapsule M to store the main agent and the hardening agent separately in the chambers. As a commercially available microcapsule M containing an adhesive, for example, there is "MEC thread lock" (manufactured by ThreeBond Co., Ltd.)

(2) Assembly Process

Figure 1E:
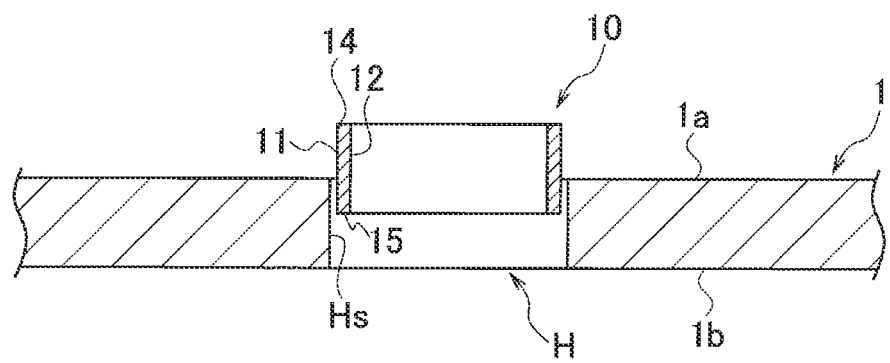
FIG. 1E is an explanatory diagram of an assembly process for the metal collar according to the first embodiment.

In an assembly process, first, as shown in FIG. 1E, the outer collar member 10 is fitted into the hole inner circumferential surface Hs of the through hole H of the FRP member 1.

Figure 1F:
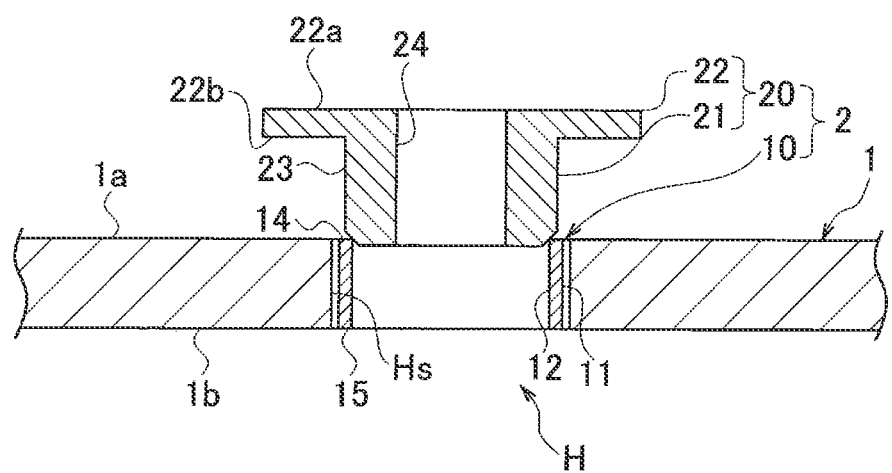
FIG. 1F is an explanatory diagram of the assembly process following FIG. 1E.

Subsequently, while downward movement of the outer collar member 10 with respect to the FRP member 1 supporting the outer collar member 10 from the lower side is restrained, as shown in FIG. 1F, the main body section 21 of the inner collar member 20 is pressed into the inner circumferential surface 12 of the outer collar member 10 from above. Consequently, the outer circumferential surface 23 of the main body section 21 is brought into contact with the inner circumferential surface 12 of the outer collar member 10. A pressing force outward in the radial direction is applied to the inner circumferential surface 12 from the outer circumferential surface 23. The outer collar member 10 is deformed in the radial direction by the pressing force and the outer circumferential surface 11 is pressed against the hole inner circumferential surface Hs. The inner collar member 20 is held in the outer collar member 10 by reaction of the pressing force.

The microcapsules M applied to at least one of the outer circumferential surface 23 and the inner circumferential surface 12 are broken by the pressing force to discharge the adhesive encapsulated inside the microcapsules M. The microcapsules M applied to the outer circumferential surface 11 of the outer collar member 10 are broken by the press force to discharge the adhesive encapsulated inside the microcapsules M. Thereafter, the discharged adhesive is hardened.

With this attaching method, it is possible to efficiently obtain the fastening part structure (in a simple process and with high productivity). It is possible to press the outer circumferential surface 11 of the outer collar member 10 against the hole inner circumferential surface Hs, while protecting the hole inner circumferential surface Hs by the outer collar member 10.

With the assembly process, the microcapsules M are applied to at least one of the outer circumferential surface 23 of the main body section 21 and the inner circumferential surface 12 of the outer collar member 10 and the outer circumferential surface 11 of the outer collar member 10 in advance. Therefore, the application of the adhesive in the assembly process can be omitted and productively is improved. Since the microcapsules M discharge the adhesive with the action of the pressing force, the adhesive can be more surely spread to a point where the pressing force acts. Therefore, it is possible to improve bonding strength of the outer collar member 10 and the inner collar member 20. It is possible to improve strength and rigidity of the metal collar 2 against tightening torque input from the fastener F.

On the outer circumferential surface 23 of the main body section 21, since the microcapsules M discharge the adhesive with the action of the press force against the hole inner circumferential surface Hs, the adhesive can also be more surely spread to a point where the press force acts. Therefore, it is possible to improve bonding strength of the FRP member 1 and the outer collar member 10. It is possible to further improve the strength and the rigidity of the metal collar 2 against the tightening torque input from the fastener F.

Note that the adhesive may be a foamable adhesive including a foaming agent. As the foaming agent, a publicly-known foaming agent such as water or a hydrocarbon-based foaming agent can be used. The foamable adhesive foams when being discharged from the microcapsules M and spreads to a wider range than a spreading range of a non-foamable adhesive. Therefore, a gap between the outer collar member 10 and the inner collar member 20, a gap between the outer collar member 10 and the hole inner circumferential surface Hs, and a gap between a rear surface 22b of the flange section 22 and a surface 1a on the upper side of the FRP member 1 are filled with the adhesive at a higher filling rate. Consequently, it is possible to exert high waterproofness against intrusion of water and the like into the gaps.

Second to Fifteenth Embodiments

Fastening part structures according to second to fifteenth embodiments are explained with reference to FIG. 2A to FIG. 15C.

Note that fastening part structures according to the second to fifteenth embodiments include the same configuration as the configuration in the first embodiment. That is, in the second to fifteenth embodiments as well, at least a part of the outer circumferential surface 23 of the inner collar member 20 comes into contact with at least a part of the inner circumferential surface 12 of the outer collar member 10 and applies a pressing force outward in the radial direction to at least a part of the inner circumferential surface 12 of the outer collar member 10. The inner collar member 20 is held in the outer collar member 10 by the reaction of the pressing force received from the inner circumferential surface 12 of the outer collar member 10. Further, in the outer collar member 10, the slit 13 is formed in a part in the circumferential direction of the outer circumferential surface 11. The outer collar member 10 is configured to be deformable in the radial direction of the through-hole H. The outer circumferential surface 11 of the outer collar member 10 attached in the through-hole H is in contact with the hole inner circumferential surface Hs of the through-hole H. Therefore, in the fastening part structures according to the second to fifteenth embodiments, as in the first embodiment, it is possible to prevent damage to the reinforced fiber in the hole peripheral part, which may occur in the process of attaching the metal collar 2, while suppressing influence due to creep deformation of the adhesive.

Although detailed explanation is omitted, in an assembly process in the second to fifteenth embodiments, as in the first embodiment, the microcapsules M are applied to at least one of the outer circumferential surface 23 of the main body section 21 and the inner circumferential surface 12 of the outer collar member 10 and the outer circumferential surface 11 of the outer collar member 10 in advance. Therefore, as in the first embodiment, it is possible to improve productivity in the assembly process for the metal collar. It is possible to improve the strength and the rigidity of the metal collar 2 against the tightening torque input from the fastener F.

In the following explanation concerning the second to fifteenth embodiments, only components different from preceding embodiments and modifications of the embodiments are explained. Elements having the same functions as elements already explained in the preceding embodiments and the like are denoted by the same reference numerals and signs and explanation of the elements is omitted.

Second Embodiment

Figure 2A:
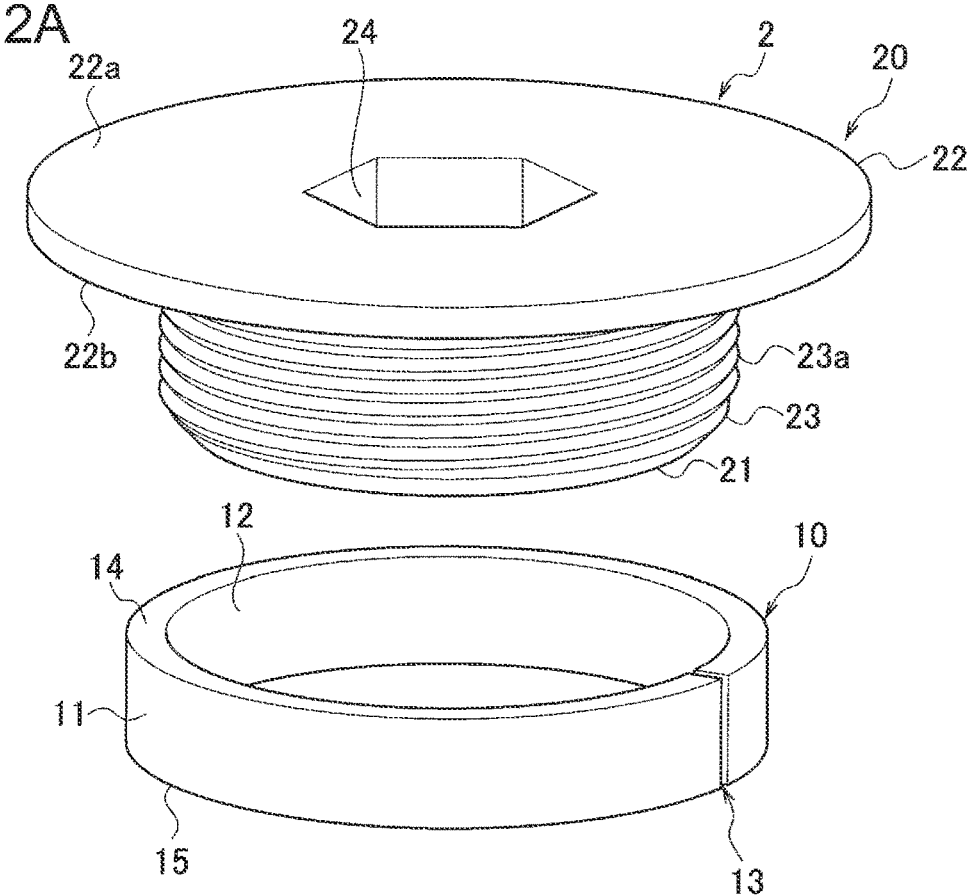
FIG. 2A is a developed perspective view of a metal collar according to a second embodiment.

In the second embodiment, as shown in FIG. 2A, a self-tapping screw 23a is formed on the outer circumferential surface 23 of the main body section 21 of the inner collar member 20. The self-tapping screw 23a has an outer diameter larger than a value obtained by subtracting a double of the radial direction thickness of the outer collar member 10 from the inner diameter of the hole inner circumferential surface Hs. As shown in FIG. 2C, the outer collar member 10 is fitted into the hole inner circumferential surface Hs and the self-tapping screw 23a is screwed into the inner circumferential surface 12 of the outer collar member 10. A screw thread of the self-tapping screw 23a bites in the inner circumferential surface 12 of the outer collar member 10. A pressing force outward in the radial direction is applied to the inner circumferential surface 12 of the outer collar member 10 from the screw thread. The outer collar member 10 is deformed in the diameter expanding direction and the outer circumferential surface 11 of the outer collar member 10 is pressed against the hole inner circumferential surface Hs by the pressing force. The inner collar member 20 receives reaction of the pressing force from the inner circumferential surface 12 of the outer collar member 10 and is held in the outer collar member 10 by the reaction. Note that the radial direction thickness of the outer collar member 10 is an average of the radial direction thicknesses of the outer collar member 10. For example, the radial direction thickness of the outer collar member 10 can be calculated as an average of radial direction thicknesses measured in a plurality of positions at an equal interval in the circumferential direction.

<Method of Attaching the Metal Collar>

Figure 2B:
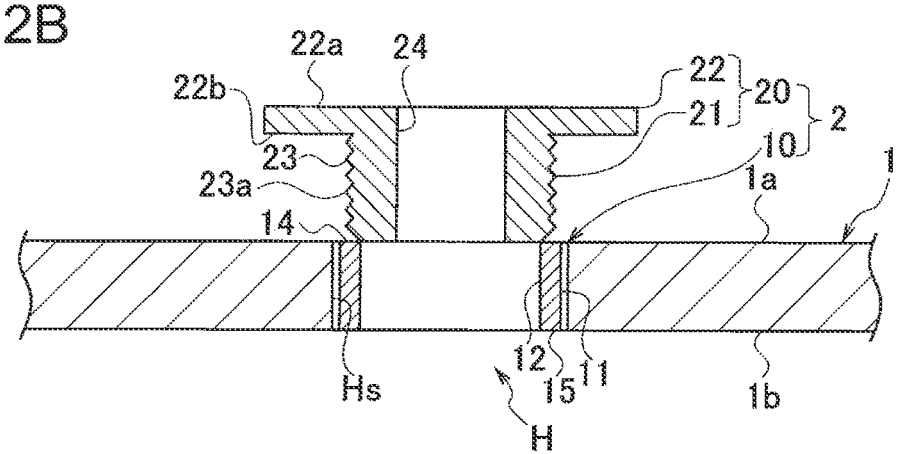
FIG. 2B is an explanatory view of an assembly process for the metal collar according to the second embodiment.
Figure 2C:
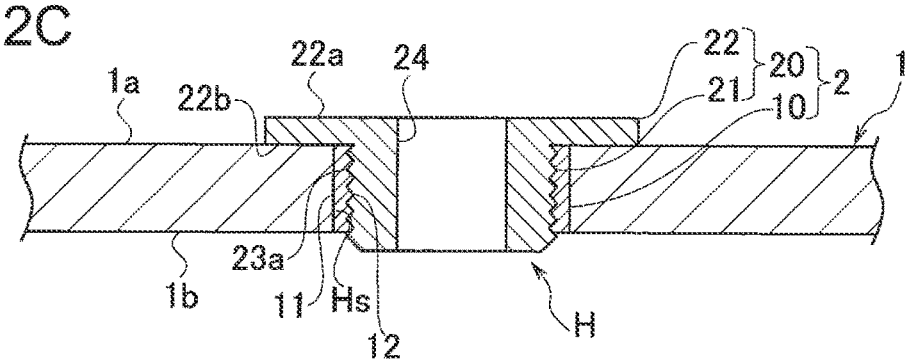
FIG. 2C is an explanatory view of the assembly process following FIG. 2B.

In the assembly process according to this embodiment, as shown in FIG. 2B, after the outer collar member 10 is fitted into the hole inner circumferential surface Hs, while whirl-stop is applied to the outer collar member 10 to restrain rotation around a hole axis of the outer collar member 10 with respect to the FRP member 1, the self-tapping screw 23a is screwed into the inner circumferential surface 12 of the outer collar member 10. Consequently, as shown in FIG. 2C, the screw thread of the self-tapping screw 23a is caused to bite into the inner circumferential surface 12 of the outer collar member 10 and a pressing force is applied outward in the radial direction to the inner circumferential surface 12 of the outer collar member 10 from the outer circumferential surface 23 of the main body section 21. Explanation of the other processes is omitted because the other processes are the same as the processes of the method of attaching the metal collar 2 according to the first embodiment. Note that the whirl-stop of the outer collar member 10 can be realized by, for example, providing a protrusion on a surface in contact with the outer collar member 10 of a jig that supports the FRP member 1 and the outer collar member 10 from the lower side in the screwing process and inserting the protrusion into the lower end portion of the slit 13 of the outer collar member 10. A washer may be fixed in the peripheral part of the through-hole H of the surface 1b on the lower side of the FRP member 1. The protrusion may be provided in the washer.

According to this embodiment, since the self-tapping screw 23a is formed on the outer circumferential surface 23 of the inner collar member 20, it is possible to apply the pressing force to the inner circumferential surface 12 by screwing the self-tapping screw 23a into the inner circumferential surface 12 of the outer collar member 10. Since a gap is formed between the screw thread and the inner circumferential surface 12, it is possible to prevent the adhesive applied to the inner circumferential surface 12 or the outer circumferential surface 23 from being completely scraped off when the inner collar member 20 is fitted into the inner circumferential surface 12 of the outer collar member 10.

Note that, in this embodiment, the self-tapping screw 23a is formed on the outer circumferential surface 23 of the main body section 21 of the inner collar member 20. However, the outer circumferential surface 23 of the main body section 21 of the inner collar member 20 may be formed as a cylindrical surface. A female thread, a male thread corresponding to which can be cut on the cylindrical surface, may be provided on the inner circumferential surface 12 of the outer collar member 10. In this case, the same effects as the effects explained above can be obtained if a sum of a value obtained by subtracting the inner diameter of the female thread from the outer diameter of the outer circumferential surface 11 of the outer collar member 10 and the outer diameter of the outer circumferential surface 23 of the inner collar member 20 is set to be larger than the inner diameter of the hole inner circumferential surface Hs.

Third Embodiment

Figure 3A:
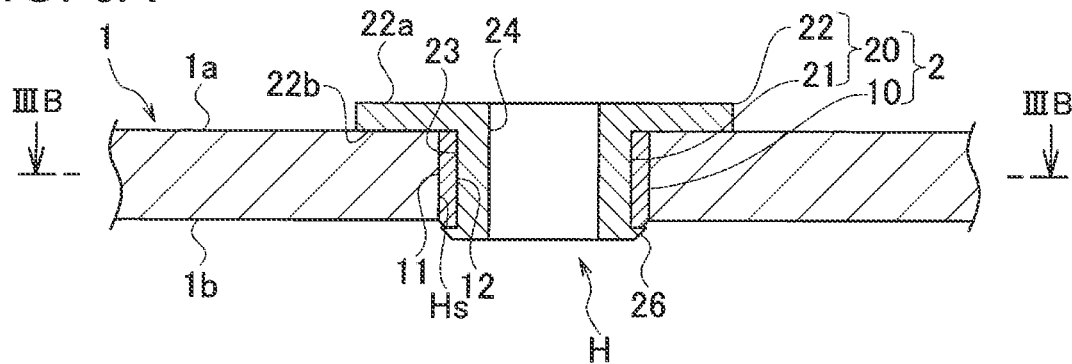
FIG. 3A is a sectional view along the center axis of a through-hole of a fastening part structure according to a third embodiment.
Figure 3B:
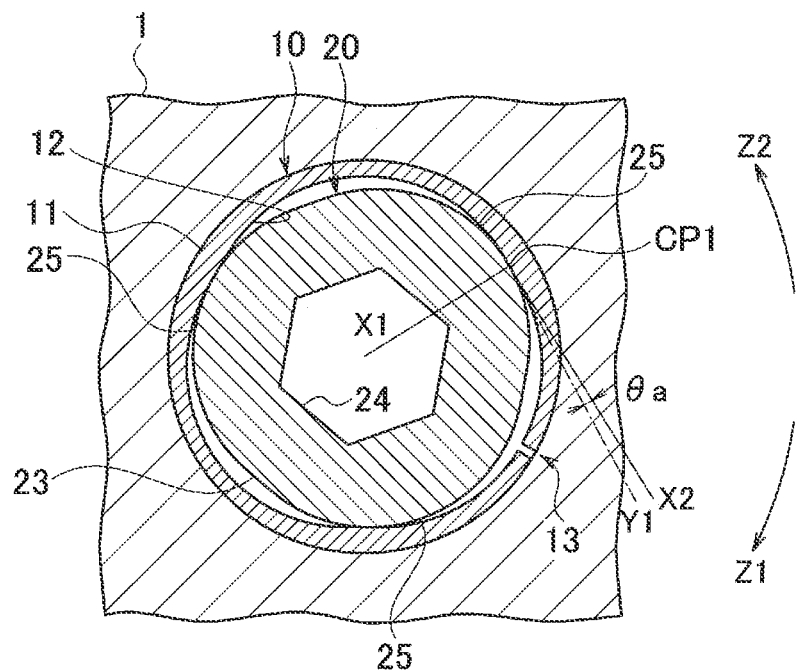
FIG. 3B is a sectional view along a line IIIB-IIIB in FIG. 3A.

In the third embodiment, as shown in FIG. 3A and FIG. 3B, in a cross section perpendicular to the axial direction of the through-hole H, the outer circumferential surface 23 of the main body section 21 of the inner collar member 20 and the inner circumferential surface 12 of the outer collar member 10 are formed in rounded regular triangular shape substantially similar to each other. According to a shape difference between the inner circumferential surface 12 and the outer circumferential surface 11 of the outer collar member 10, the radial direction thickness of the outer collar member 10 changes in the circumferential direction and takes a maximum value and a minimum value in a plurality of positions in the circumferential direction. A rounded regular n-polygonal shape (n is an integer equal to or larger than 3) in this specification is formed from a curved line bending such that the entire circumference of the curved line is convex to the radial direction outer side. A curvature radius of portions corresponding to corners of the regular n-polygonal shape is smaller than a curvature radius of portions corresponding to sides of the regular n-polygonal shape.

The outer circumferential surface 23 of the main body section 21 of the inner collar member 20 includes convex surfaces 25 in positions corresponding to the corners of the regular triangular shape. In the cross section perpendicular to the axial direction of the through-hole H, a sum of a distance L1 (see FIG. 3H) from the center of the outer circumferential surface 23 of the main body section 21 to a most distant point of the convex surface 25 and a maximum value of an average thickness T in the radial direction of the outer collar member 10 is larger than the radius of the hole inner circumferential surface Hs. The average thickness T in the radial direction is a value obtained by dividing, by three, which is the number of the corners of the regular triangular shape, a sum of radial direction thicknesses (for example, t1, t2, and t3 in FIG. 3H) of the outer collar member 10 in three positions separated from one another by 120° in the circumferential direction of the inner circumferential surface 12 of the outer collar member 10.

The outer collar member 10 is fitted into the hole inner circumferential surface Hs. The main body section 21 of the inner collar member 20 is fitted into the inner circumferential surface 12 of the outer collar member 10. In this state, the inner collar member 20 is rotated around the hole axis with respect to the outer collar member 10. The convex surfaces 25 are in contact with the inner circumferential surface 12 of the outer collar member 10. The convex surfaces 25 apply a pressing force outward in the radial direction to the inner circumferential surface 12 of the outer collar member 10. The outer collar member 10 is deformed in the diameter expanding direction and the outer circumferential surface 11 of the outer collar member 10 is pressed against the hole inner circumferential surface Hs by the pressing force. The inner collar member 20 receives reaction of the pressing force from the inner circumferential surface 12 of the outer collar member 10 and is held in the outer collar member 10 by the reaction.

Figure 3C:
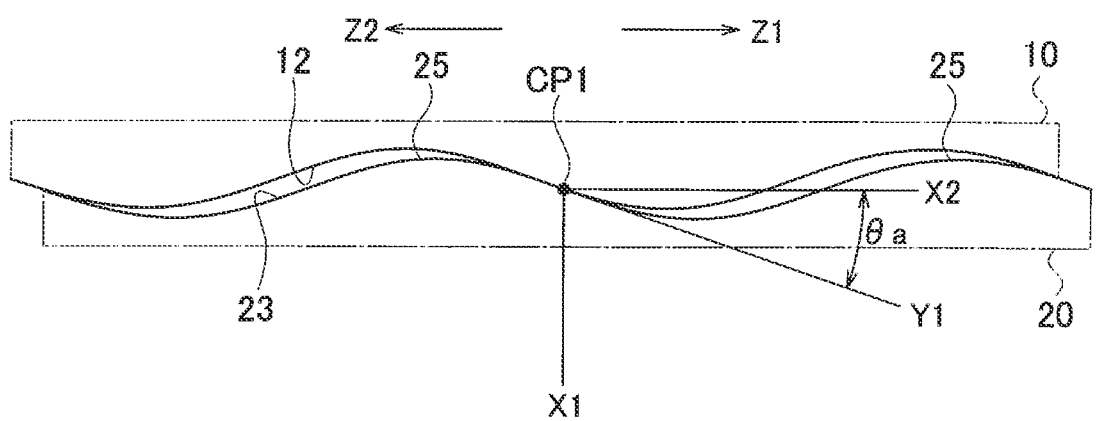
FIG. 3C is a diagram developing, in a circumferential direction, and schematically showing an example of a positional relation between the outer circumferential surface of an inner collar member and the inner circumferential surface of an outer collar member according to the third embodiment.

As shown in FIG. 3B and FIG. 3C, in the cross section perpendicular to the axial direction of the through-hole H, a smaller angle θa of angles formed by a tangential line Y1 at a contact CP1 of the convex surface 25 and the inner circumferential surface 12 of the outer collar member 10 and a straight line X2 perpendicular to a straight line X1 which passes the contact CP1 and connects the contact CP1 and the center of the outer circumferential surface 23 of the inner collar member 20 satisfies the following expression:

$$\tan \theta a \leq \mu$$

where μ is a coefficient of static friction between the convex surface 25 and the inner circumferential surface 12 of the outer collar member 10.

Figure 3D:
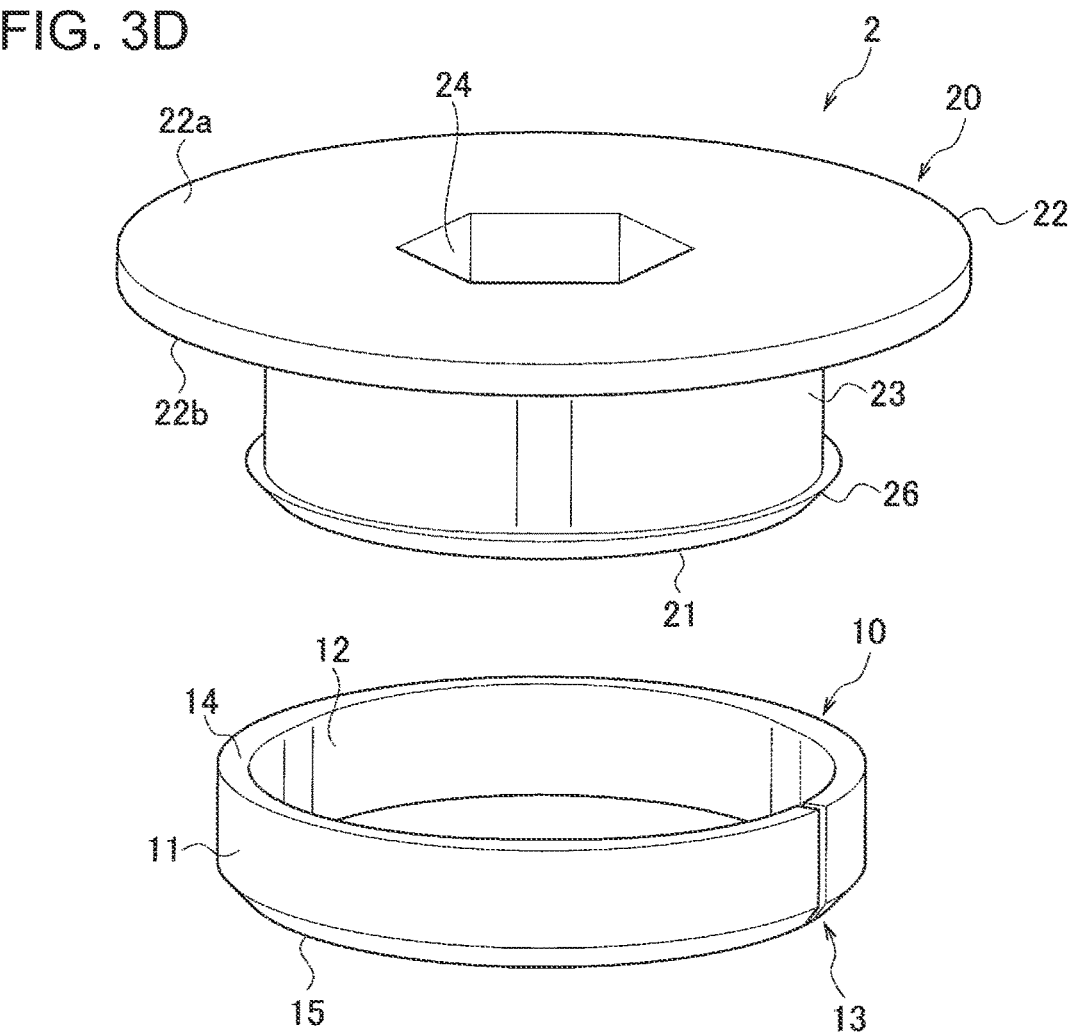
FIG. 3D is a developed perspective view of a metal collar according to the third embodiment.
Figure 3E:
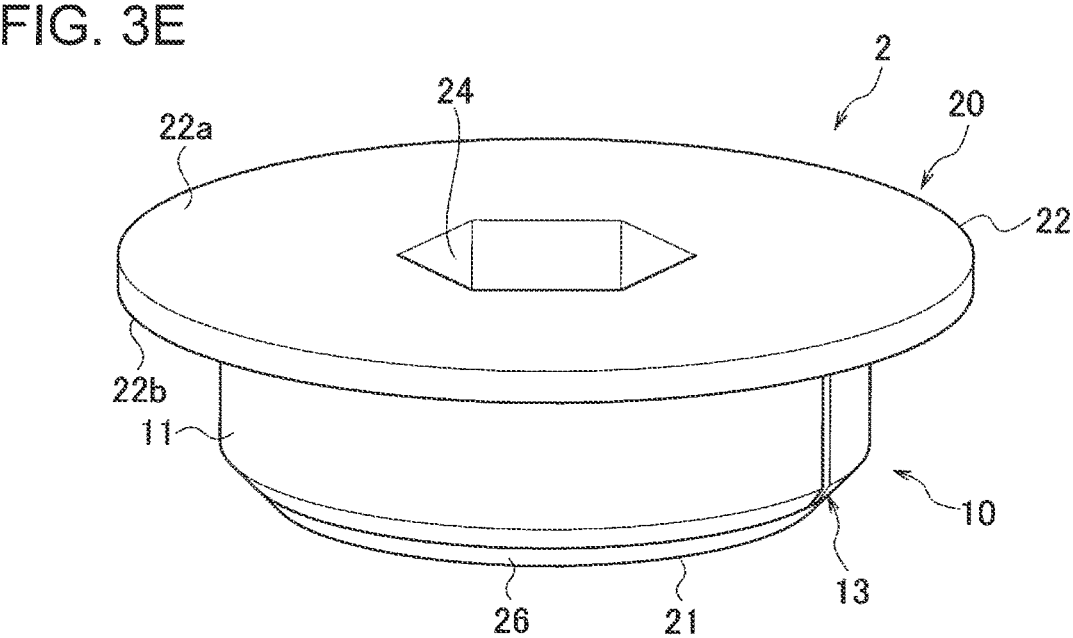
FIG. 3E is a perspective view of the metal collar according to the third embodiment.

As shown in FIG. 3D and FIG. 3E, the inner collar member 20 includes a claw section 26. The claw section 26 projects outward in the radial direction from the lower end portion (an end portion on the opposite side of an end portion where the flange section 22 is provided) of the outer circumferential surface 23 of the main body section 21 of the inner collar member 20. The claw section 26 is in contact with the side surface 15 on the lower side of the outer collar member 10 and holds the outer collar member 10 in an axial direction position between the claw section 26 and the flange section 22.

When the outer collar member 10 is in the natural state, the outer circumferential surface 11 of the outer collar member 10 has an outer diameter larger than a maximum value of the tolerance of the inner diameter of the hole inner circumferential surface Hs. The outer collar member 10 is configured to be elastically deformable for diameter reduction until the outer diameter of the outer circumferential surface 11 becomes smaller than a minimum value of the tolerance of the inner diameter of the hole inner circumferential surface Hs while being held by the claw section 26 by being applied with an external force inward in the radial direction.

An opening of the insertion hole 24 formed on the surface 22a of the flange section 22 is formed in a hexagonal shape. The inner collar member 20 can be rotated around the hold axis with respect to the outer collar member 10 using a hexagonal wrench. Note that a mechanism for enabling the rotation of the inner collar member 20 is not limited to the mechanism shown in the figures. For example, the shape of the outer circumferential edge portion of the flange section 22 may be set to a polygonal shape that can be rotated by a wrench or the like.

According to this embodiment, in the cross section perpendicular to the axial direction of the through-hole H, the outer circumferential surface 23 of the inner collar member 20 and the inner circumferential surface 12 of the outer collar member 10 are respectively formed in the rounded regular triangular shapes. The sum of the distance L1 from the center of the outer circumferential surface 23 of the inner collar member 20 to the most distant point of the convex surface 25 corresponding to the corner of the regular triangular shape on the outer circumferential surface 23 and the maximum value of the average thickness T in the radial direction of the outer collar member 10 is larger than the radius of the hole inner circumferential surface Hs. Therefore, in a state where the outer collar member 10 is fitted into the hole inner circumferential surface Hs, it is possible to bring the convex surfaces 25 into contact with the inner circumferential surface 12 of the outer collar member 10 and apply a pressing force outward in the radial direction to the inner circumferential surface 12 by rotating the inner collar member 20 around the hole axis with respect to the outer collar member 10.

The pressing force outward in the radial direction applied to the inner circumferential surface 12 of the outer collar member 10 from the convex surfaces 25 and the press force of the outer circumferential surface 11 of the outer collar member 10 against the hole inner circumferential surface Hs can be controlled to appropriate values by controlling rotation torque at the time when the inner collar member 20 is rotated around the hole axis with respect to the outer collar member 10. Consequently, it is possible to prevent an excessive force from being input to the hole peripheral part of the FRP member 1 from the metal collar 2.

Further, the claw section 26 holds the outer collar member 10 between the claw section 26 and the flange section 22. Therefore, the outer collar member 10 and the inner collar member 20 can be integrally handled. It is easy to handle the metal collar 2 in the assembly process and the like. Since the claw section 26 holds the outer collar member 10, it is possible to improve the strength and the rigidity of the metal collar 2 against a load for pulling out the inner collar member 20 to the flange section 22 side with respect to the outer collar member 10.

In the cross section perpendicular to the axial direction of the through-hole H, the angle θa satisfies the following expression:

$$\tan \theta a \leq \mu$$

where μ is a coefficient of static friction between the convex surface 25 and the inner circumferential surface 12 of the outer collar member 10.

Therefore, even if the external force in the radial direction acts on the inner collar member 20, a frictional force between the convex surface 25 and the inner circumferential surface 12 of the outer collar member 10 is larger than a component parallel to the tangential line Y1 of the external force. Therefore, it is possible to prevent a slip of the convex surface 25 with respect to the inner circumferential surface 12 of the outer collar member 10 and prevent slack of the inner collar member 20 and the outer collar member 10 (the metal collar 2).

Note that, when the shapes of the hole inner circumferential surface Hs and the outer circumferential surface 11 of the outer collar member 10 in the cross section perpendicular to the axial direction of the through-hole H are noncircular shapes (for example, elliptical shapes or rounded polygonal shapes) substantially similar to each other, the same configuration as the configuration in this embodiment can be adopted. In this case, when the outer collar member 10 is in the natural state, the outer circumferential surface 11 of the outer collar member 10 has a radial direction dimension larger than a maximum value of a tolerance of a radial direction dimension of the hole inner circumferential surface Hs. When the outer collar member 10 is applied with the external force in the radial direction inner side direction and is elastically deformed for diameter reduction, the outer circumferential surface 11 of the outer collar member 10 has a radial direction dimension smaller than a minimum value of the tolerance of the radial direction dimension of the hole inner circumferential surface Hs.

Further, the shapes of the outer circumferential surface 23 of the inner collar member 20 and the inner circumferential surface 12 of the outer collar member 10 in the cross section perpendicular to the axial direction of the through-hole H may be rounded regular polygonal shapes (regular quadrangular shapes, regular pentagonal shapes, or the like other than the regular triangular shape) substantially similar to each other. In this case, in the cross section perpendicular to the axial direction of the through-hole H, the sum of a distance from the center of the outer circumferential surface 23 of the inner collar member 20 to a most distant point of the convex surface 25 corresponding to a corner of the regular polygona shape on the outer circumferential surface 23 and the maximum value of the average thickness T in the radial direction of the outer collar member 10 only has to be set larger than a maximum value of a radial direction distance from the center of the hole inner circumferential surface Hs to the hole inner circumferential surface Hs. The average thickness T in the radial direction is a value obtained by dividing, by n (n is the number of corners of the regular polygonal shape), a sum of thicknesses in the radial direction of the outer collar member 10 in n positions separated from one another by 360°/n in the circumferential direction of the inner circumferential surface 12 of the outer collar member 10. In the case of a regular polygonal shape, the number of corners of which is an odd number, vectors of reaction of a pressing force cross one another (not opposed to one another). Therefore, when the inner collar member 20 is rotated around the hole axis with respect to the outer collar member 10, it is possible to automatically align the main body section 21 of the inner collar member 20 inside the outer collar member 10. Vectors of a pressing force transmitted from the inner collar member 20 to the outer collar member 10 are not opposed on the same axis. A press force to the hole inner circumferential surface Hs does not excessively concentrate.

As the adhesive used in this embodiment and the modifications of the embodiment, a foamable adhesive is suitable. The foamable adhesive foams when being discharged from the microcapsules M and spreads to a wider range than a non-foamable adhesive. Therefore, the gap between the outer collar member 10 and the inner collar member 20, the gap between the outer collar member 10 and the hole inner circumferential surface Hs, and the gap between the rear surface 22b of the flange section 22 and the surface 1a on the upper side of the FRP member 1 are filled by the adhesive at a higher filling rate. Consequently, it is possible to exert high waterproofness against intrusion of water and the like into the gaps. The relative movement or the relative rotation between the inner collar member 20 and the outer collar member 10 and the relative movement or the relative rotation between the FRP member 1 and the outer collar member 10 are more firmly restrained. Therefore, it is possible to improve strength and rigidity of the metal collar 2 and the fastening part. The foamable adhesive is also suitable in the fourth to fifteenth embodiments explained below.

Note that the microcapsules M containing the adhesive for bonding and fixing the outer circumferential surface 23 of the main body section 21 and the inner circumferential surface 12 of the outer collar member 10 may be applied only on the convex surface 25 of the main body section 21 or in a part with which the convex surface 25 is in contact on the inner circumferential surface 12 of the outer collar member 10.

<Method of Attaching the Metal Collar>

Figure 3F:
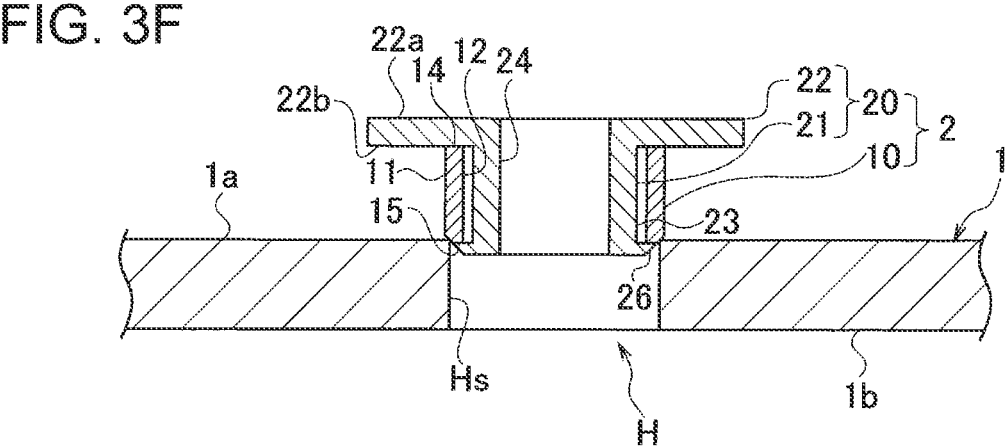
FIG. 3F is an explanatory diagram of an assembly process for the metal collar according to the third embodiment.

In the assembly process according to this embodiment and the modifications of the embodiment, as shown in FIG. 3F, when the outer collar member 10 is fitted into the hole inner circumferential surface Hs of the FRP member 1, the external force is applied to the outer collar member 10 to deform the outer collar member 10 for diameter reduction and the outer collar member 10 is fitted in a state where the radial direction dimension of the outer surface 11 of the outer collar member 10 is set smaller than the radial direction dimension of the hole inner circumferential surface Hs. The radial direction dimension of the outer circumferential surface 11 of the outer collar member 10 at the time when the external force is applied is smaller than the minimum value of the tolerance of the radial direction dimension of the hole inner circumferential surface Hs. Therefore, it is possible to prevent a high frictional force from acting on the hole inner circumferential surface Hs from the outer collar member 10 during the fitting.

Figure 3G:
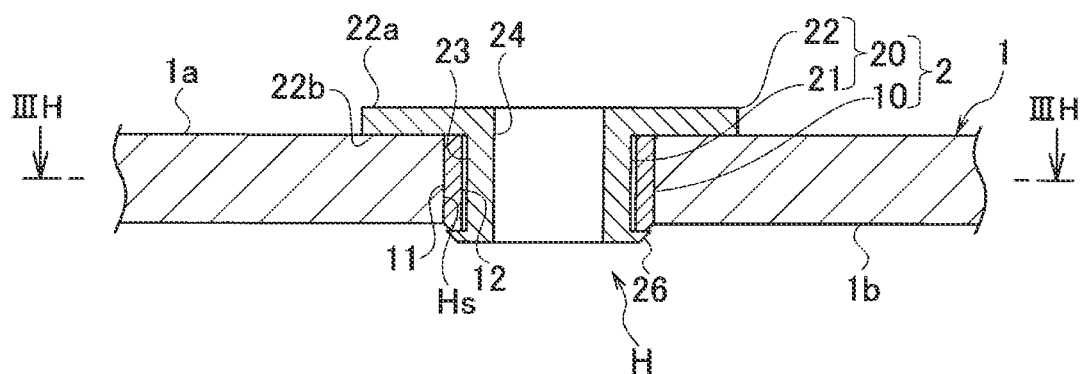
FIG. 3G is an explanatory diagram of the assembly process following FIG. 3F.
Figure 3H:
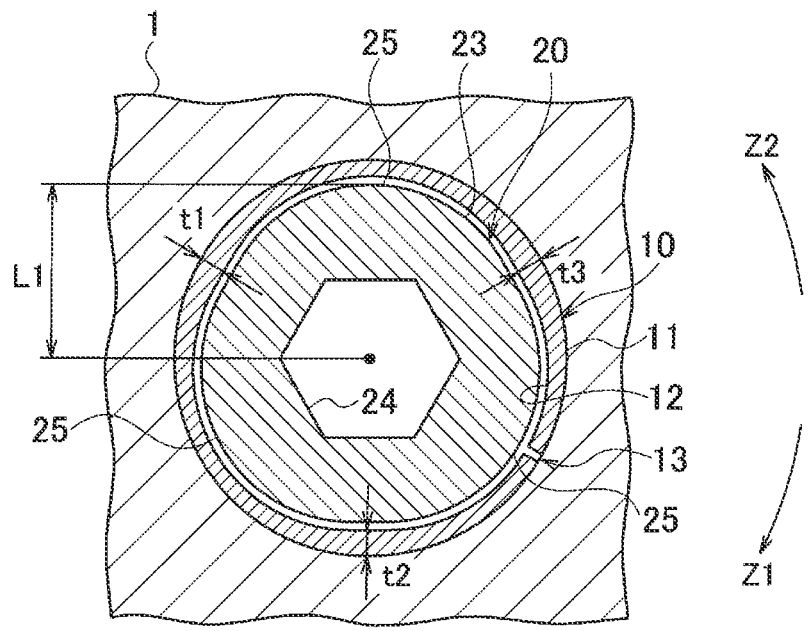
FIG. 3H is a sectional view along a line IIIH-IIIH in FIG. 3G.

Before the inner collar member 20 is rotated around the hole axis with respect to the outer collar member 10, as shown in FIG. 3G and FIG. 3H, the external force applied to the outer collar member 10 is removed to elastically restore the outer collar member 10 in the diameter expanding direction inside the through-hole H.

Thereafter, the inner collar member 20 is rotated to a circumferential direction one side (clockwise in FIG. 3H; a Z1 direction) around the hole axis with respect to the outer collar member 10. As shown in FIG. 3B, the convex surface 25 is brought into contact with the inner circumferential surface 12 of the outer collar member 10. A pressing force is applied outward in the radial direction to the inner circumferential surface 12 of the outer collar member 10 from the convex surface 25. Explanation of the other processes is omitted because the other processes are the same as the method of attaching the metal collar 2 according to the embodiment.

With the attaching method explained above, it is possible to efficiently obtain the fastening part structure (in a simple process and with high productivity). By controlling rotation torque in rotating the inner collar member 20 around the hole axis with respect to the outer collar member 10, the pressing force outward in the radial direction applied to the inner circumferential surface 12 of the outer collar member 10 from the convex surface 25 and the press force of the outer circumferential surface 11 of the outer collar member 10 against the hole inner circumferential surface Hs can be controlled to appropriate values.

Further, by removing the external force applied to the outer collar member 10 inside the through-hole H and elastically restoring the outer collar member 10 in the diameter expanding direction, the outer circumferential surface 11 of the outer collar member 10 can be pressed against the hole inner circumferential surface Hs by a restoration force of the outer collar member 10 and the outer collar member 10 can be provisionally fixed to the FRP member 1. Therefore, when the inner collar member 20 is rotated around the hole axis with respect to the outer collar member 10, rotation (a slip) of the outer collar member 10 with respect to the FRP member 1 can be prevented by a frictional force acting between the outer circumferential surface 11 of the outer collar member 10 and the hole inner circumferential surface Hs. The radial direction dimension of the outer circumferential surface 11 of the outer collar member 10 at the time when the outer collar member 10 is in the natural state is larger than the maximum value of the tolerance of the radial direction dimension of the hole inner circumferential surface Hs. Therefore, it is possible to increase the frictional force and more surely prevent the rotation of the outer collar member 10 with respect to the FRP member 1. In order to further increase the frictional force, surface roughness of the outer circumferential surface 11 of the outer collar member 10 may be increased or knurling may be applied to the outer circumferential surface 11.

Note that, in order to more surely prevent the rotation of the outer collar member 10 with respect to the FRP member 1, swirl-stop may be applied to the outer collar member 10. The whirl-stop of the outer collar member 10 can be realized by, for example, providing a protrusion on a surface, which is in contact with the outer collar member 10, of a jig that supports the FRP member 1 and the outer collar member 10 from the lower side and inserting the protrusion into the lower end portion of the slit 13 of the outer collar member 10. A washer may be fixed in the peripheral part of the through-hole H of the surface 1b on the lower side of the FRP member 1. The protrusion may be provided in the washer.

Note that methods for attaching the metal collar in the fourth, fifth, seventh, and ninth embodiments explained below are the same as the attaching method in the third embodiment. Therefore, concerning the fourth, fifth, seventh, and ninth embodiments, explanation of the methods for attaching the metal collar is omitted.

Fourth Embodiment

Figure 4A:
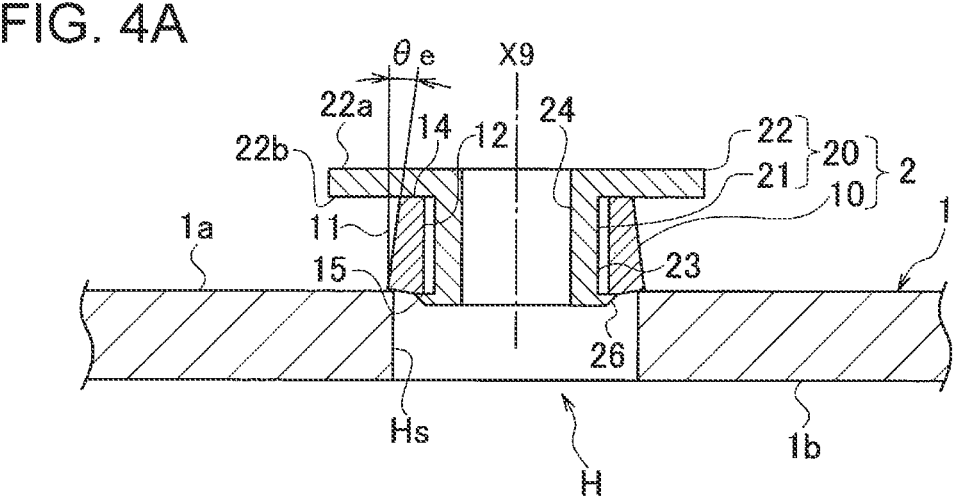
FIG. 4A is an explanatory diagram of an assembly process for a metal collar according to a fourth embodiment.
Figure 4B:
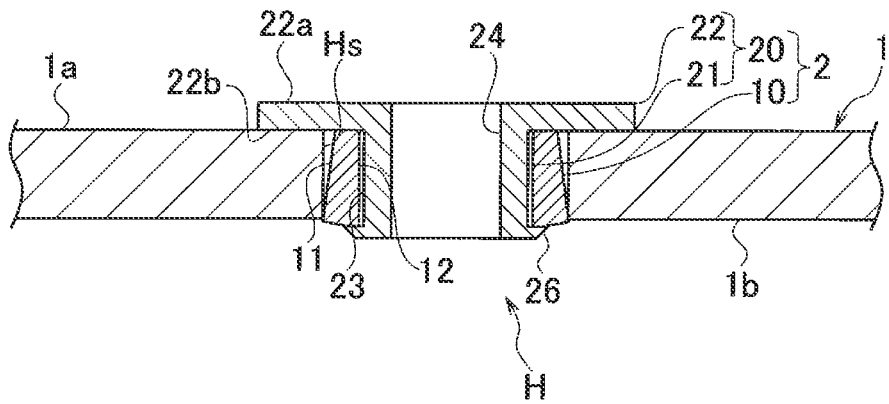
FIG. 4B is an explanatory diagram of the assembly process following FIG. 4A.
Figure 4C:
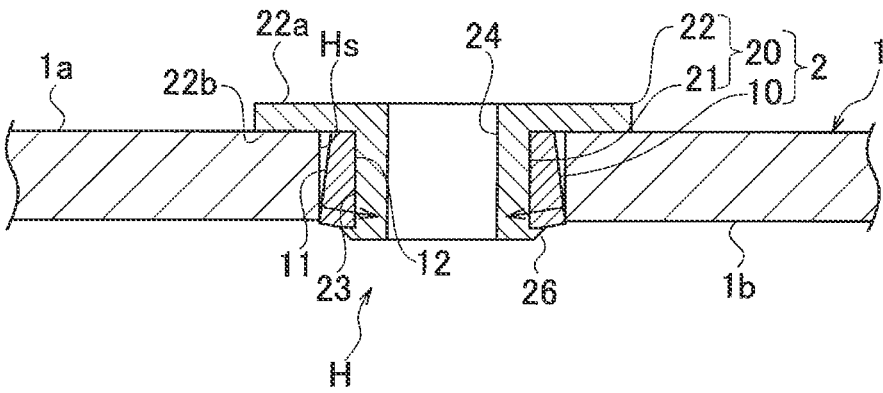
FIG. 4C is an explanatory diagram of the assembly process following FIG. 4B.

In the fourth embodiment, as shown in FIG. 4A to FIG. 4C, a taper for reducing the radial direction dimension of the outer circumferential surface 11 toward the flange section 22 is provided in in the outer circumferential surface 11 of the outer collar member 10. As shown in FIG. 4A, when the outer collar member 10 is in the natural state, a radial direction dimension at the lower end portion (an end portion most away from the flange section 22) of the taper is larger than the maximum value of the tolerance of the radial direction dimension of the hole inner circumferential surface Hs. In a cross section including a center axis X9 of the outer collar member 10, an angle θe of the taper is approximately 1° with respect to the center axis X9.

According to this embodiment, the taper for reducing the radial direction dimension of the outer circumferential surface 11 of the outer collar member 10 toward the flange section 22 is provided in the outer circumferential surface 11 of the outer collar member 10. Therefore, as shown in FIG. 4A and FIG. 4B, when the outer collar member 10 is fitted into the hole inner circumferential surface Hs, it is possible to prevent the adhesive applied to the outer circumferential surface 11 of the outer collar member 10 from being scraped off by the FRP member 1.

Since the taper is provided in the outer circumferential surface 11 of the outer collar member 10, a force received from the hole inner circumferential surface Hs when the outer circumferential surface 11 of the outer collar member 10 is pressed against the hole inner circumferential surface Hs has a component in a downward direction (the claw section 26 side direction) as indicated by an arrow in FIG. 4C. The downward force is transmitted to the flange section 22 via the claw section 26. Therefore, the rear surface 22b of the flange section 22 is pressed against the surface 1a on the upper side (the flange section 22 side) of the FRP member 1. The metal collar 2 is prevented from slipping off from the through-hole H to the upper side by the downward force.

Fifth Embodiment

Figure 5A:
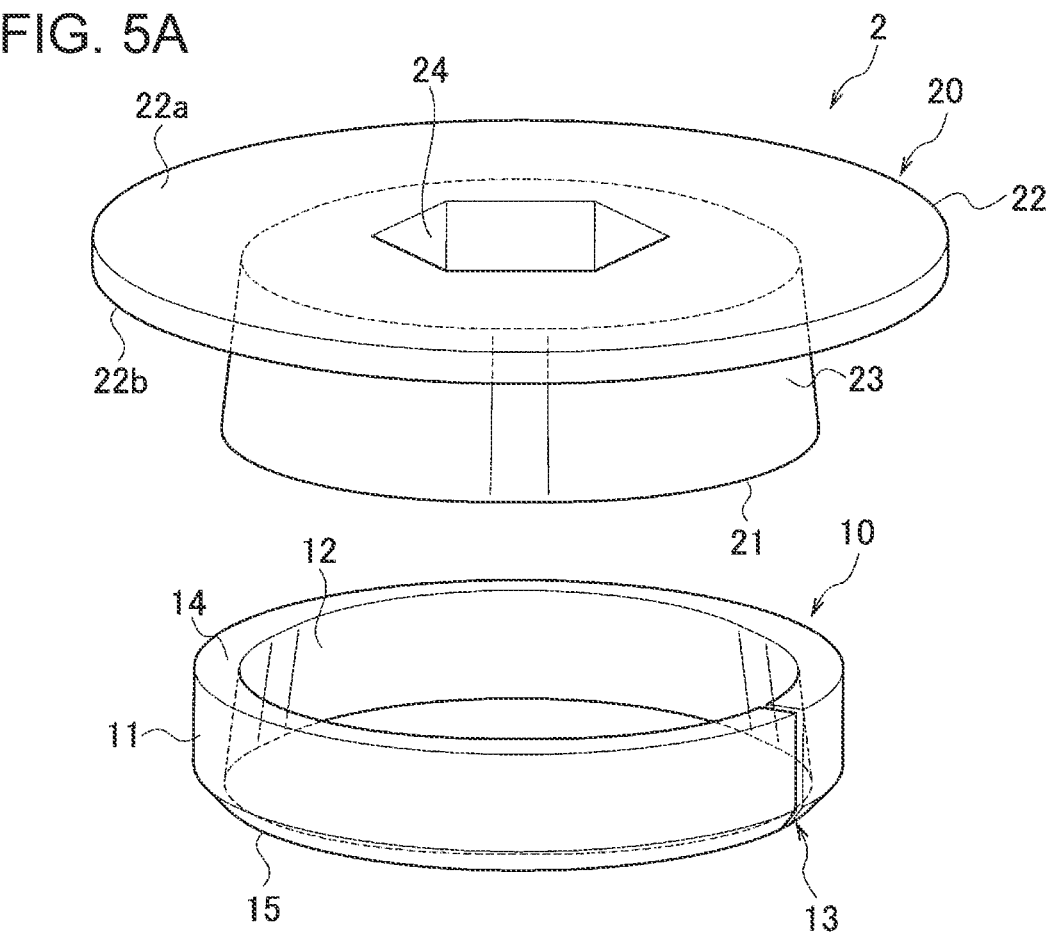
FIG. 5A is a developed perspective view of a metal collar according to a fifth embodiment.
Figure 5B:
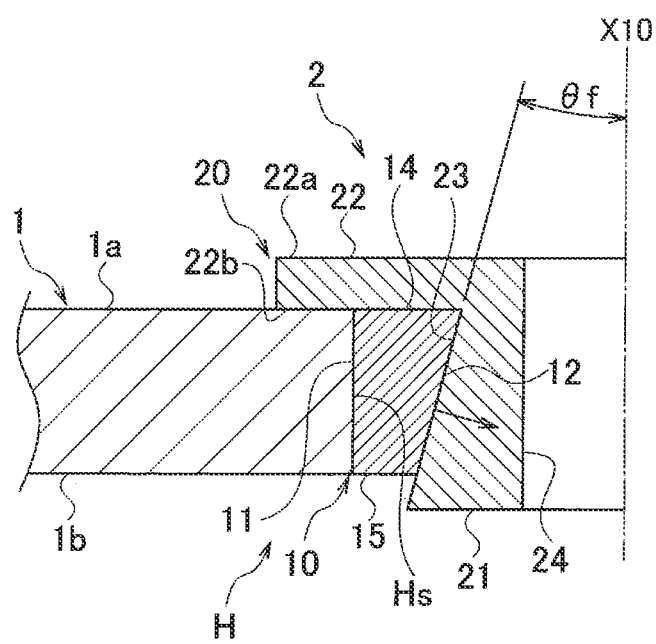
FIG. 5B is a partial sectional view along the center axis of a through-hole of a fastening part structure according to the fifth embodiment.

In the fifth embodiment, as shown in FIG. 5A and FIG. 5B, tapers for reducing the radial direction dimensions of the outer circumferential surface 23 of the inner collar member 20 and the inner circumferential surface 12 of the outer collar member 10 toward the flange section 22 are provided in the outer circumferential surface 23 of the inner collar member 20 and the inner circumferential surface 12 of the outer collar member 10. For example, in a cross section including a center axis X10 of the outer collar member 10, an angle θf of the tapers is, for example, approximately 1° with respect to the center axis X10.

The microcapsules M containing the adhesive are applied to at least one of the side surface (the rear surface) 22b on the lower side (the outer collar member 10 side) of the flange section 22 and the side surface 14 on the upper side (the flange section 22 side) of the outer collar member 10.

According to this embodiment, the tapers for reducing the radial direction dimensions of the outer circumferential surface 23 of the inner collar member 20 and the inner circumferential surface 12 of the outer collar member 10 toward the flange section 22 are provided in the outer circumferential surface 23 of the inner collar member 20 and the inner circumferential surface 12 of the outer collar member 10. Therefore, reaction of the pressing force that the inner collar member 20 receives from the inner circumferential surface 12 of the outer collar member 10 has a component in the downward direction (the distal end portion side direction of the inner collar member 20 or the opposite side direction of the side where the flange section 22 is provided) as indicated by an arrow in FIG. 5B. The side surface 14 on the upper side of the outer collar member 10 is pressed against the rear surface 22b of the flange section 22 by the downward force. Therefore, the microcapsules M applied to the side surface 14 on the upper side of the outer collar member 10 and the rear surface 22b of the flange section 22 can be more surely broken. It is possible to secure pressure necessary for hardening of the adhesive in the part.

The adhesive discharged from the microcapsules M applied to the side surface 14 on the upper surface of the outer collar member 10 or the rear surface 22b of the flange section 22 spreads to the gap between the rear surface 22b of the flange section 22 and the surface 1a on the upper side of the FRP member 1 as well. Therefore, it is possible to further improve bonding strength of the outer collar member 10 and the inner collar member 20. It is possible to improve waterproofness against intrusion of water and the like from the gap.

Sixth Embodiment

Figure 6A:
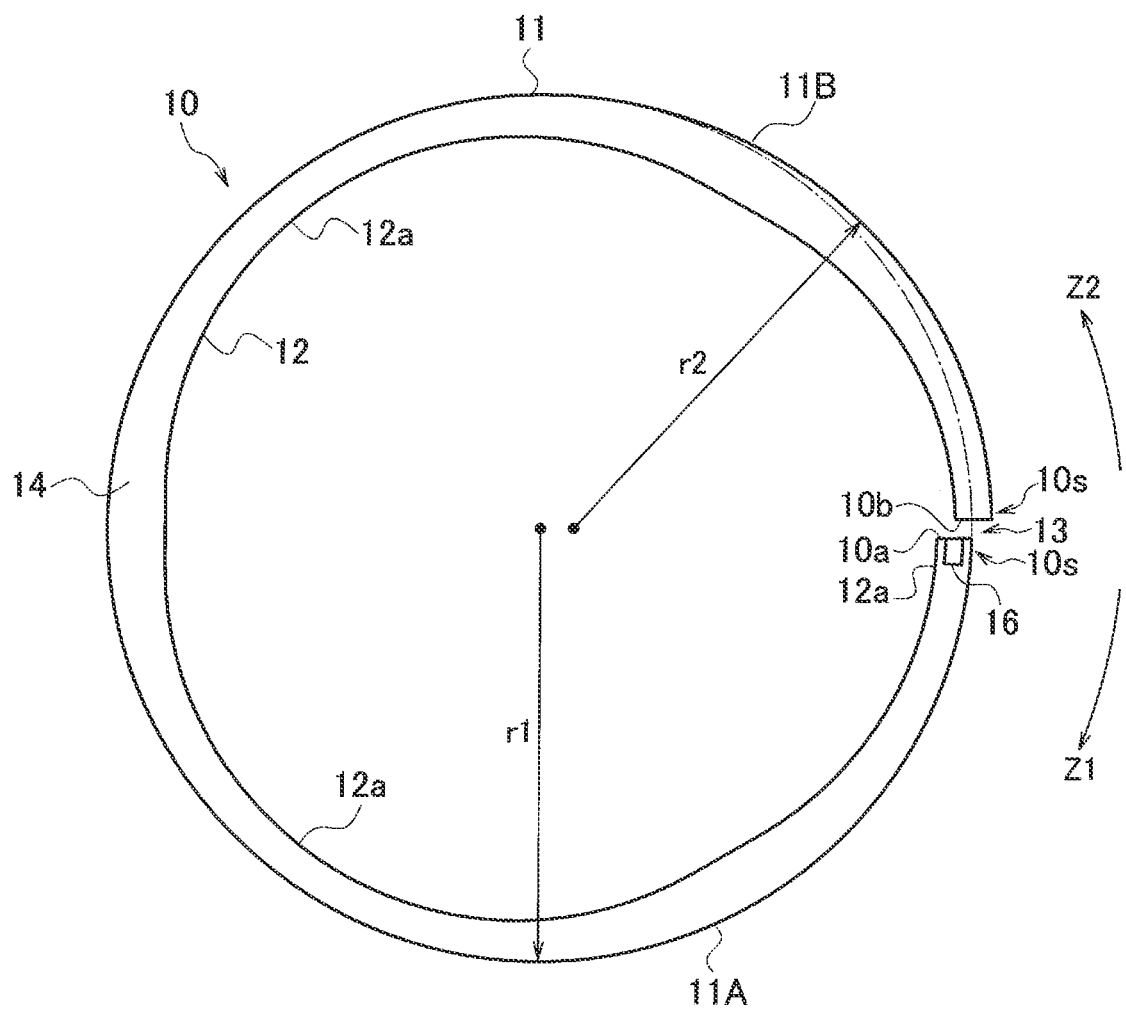
FIG. 6A is a plan view of an outer collar member according to a sixth embodiment.

In the sixth embodiment, as shown in FIG. 6A, the outer circumferential surface 11 of the outer collar member 10 is divided into a first semi-cylindrical surface 11A located on a circumferential direction one side (the clockwise side in FIG. 6A; the Z1 direction) of the slit 13 of the outer circumferential surface 11 and a second semi-cylindrical surface 11B located on a circumferential direction other side (the counterclockwise side in FIG. 6A; a Z2 direction) of the slit of the outer circumferential surface 11. A curvature radius r1 of the first semi-cylindrical surface 11A is smaller than the minimum value of the tolerance of the radius of the through-hole H. A curvature radius r2 of the second semi-cylindrical surface 11B is larger than the maximum value of the tolerance of the radius of the through-hole H.

The outer collar member 10 includes a pair of slit circumferential edge portions 10s that define the slit 13. A protrusion 16 projecting toward the upper side is provided at the end portion on the upper side (the flange section 22 side) in the slid circumferential edge portion 10s on the circumferential direction one side (in the Z1 direction) of the pair of slit circumferential edge portions 10s.

Figure 6B:
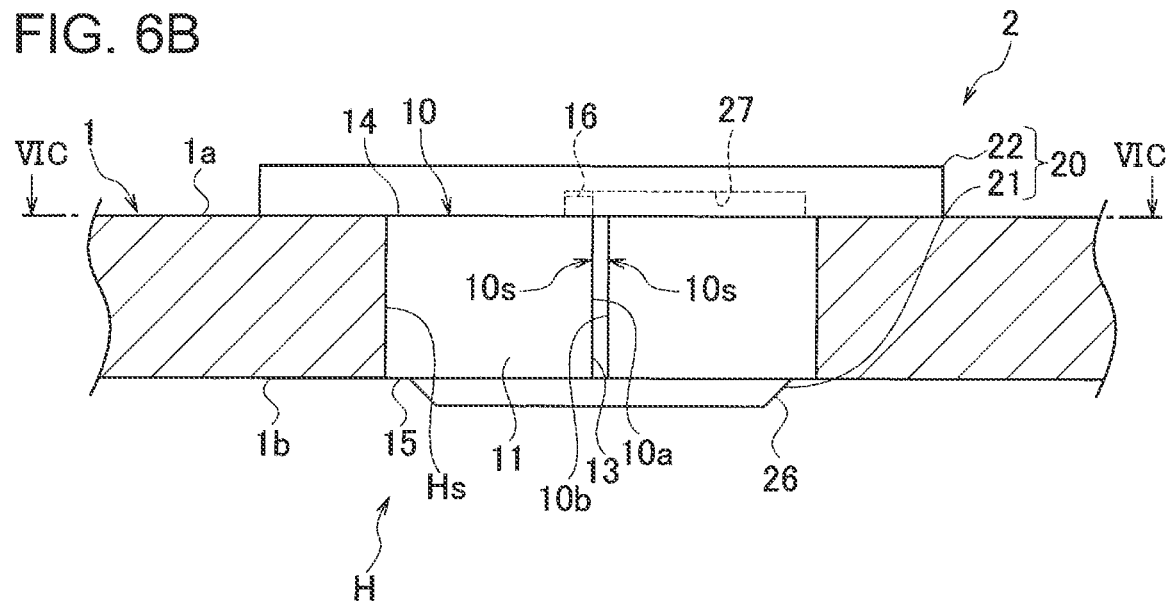
FIG. 6B is an explanatory diagram of an assembly process for a metal collar according to the sixth embodiment and shows a state where the metal collar is fitted into a through-hole.
Figure 6C:
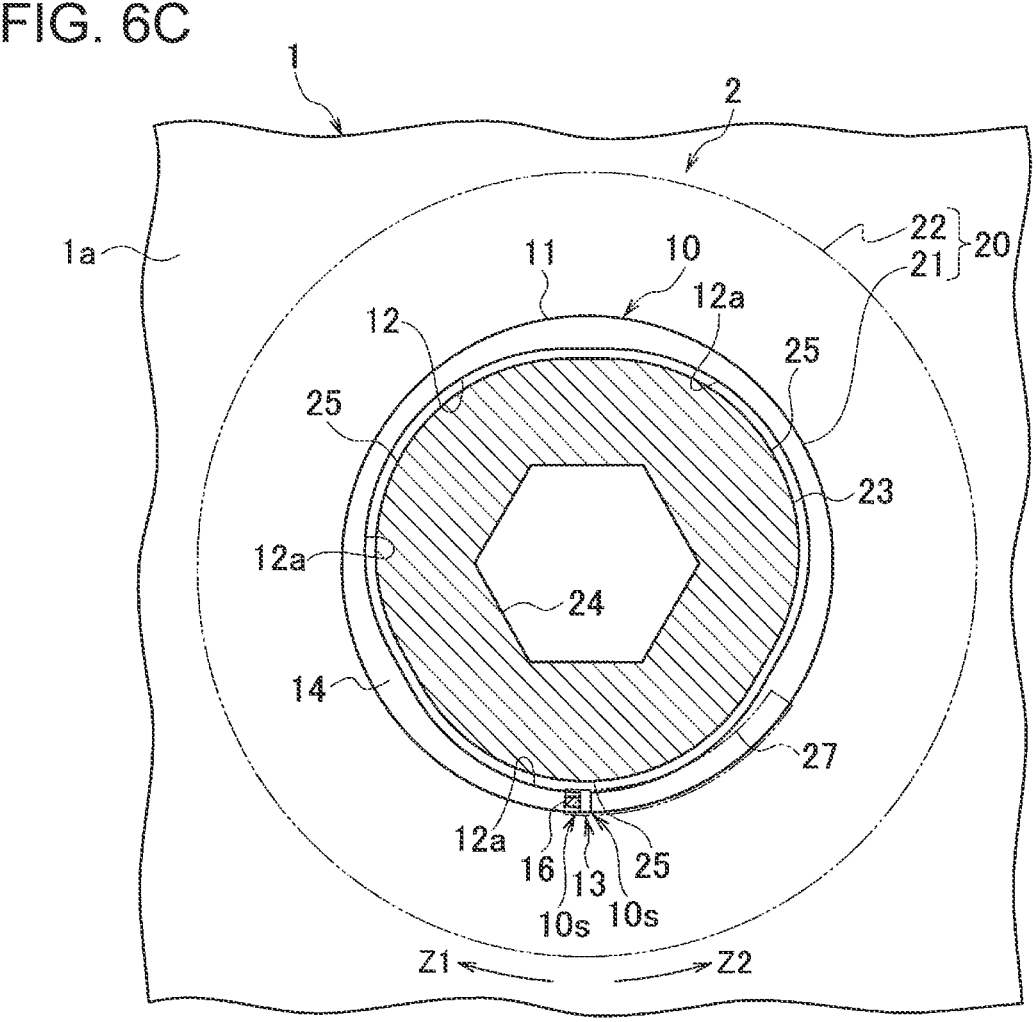
FIG. 6C is a sectional view along a VIC-VIC line in FIG. 6B.

As shown in FIG. 6B and FIG. 6C, a guide groove 27 having a substantially arcuate shape in plan view is provided on the side surface 22b on the lower side (the outer collar member 10 side) of the flange section 22. The guide groove 27 houses the protrusion 16 to be relatively movable around the hole axis.

When the protrusion 16 is located at the end portion of the guide groove 27, the guide groove 27 engages with the protrusion 16 and hinders the rotation of the inner collar member 20 around the hole axis with respect to the outer collar member 10. When the protrusion 16 is located in a portion other than the end portion of the guide groove 27, the guide groove 27 allows movement of the protrusion 16 in the guide groove 27 and allows rotation of the inner collar member 20 around the hole axis with respect to the outer collar member 10.

When circumferential direction phases of the outer circumferential surface 23 of the main body section 21 of the inner collar member 20 and the inner circumferential surface 12 of the outer collar member 10 are aligned, that is, as shown in FIG. 6C, when the convex surfaces 25 corresponding to the corners of the regular triangular shape on the outer circumferential surface 23 of the main body section 21 and concave surfaces 12a corresponding to the regular triangular shape on the inner circumferential surface 12 of the outer collar member 10 are located opposed to each other in the radial direction, the protrusion 16 is located at the end portion on the circumferential direction one side (the Z1 direction) of the guide groove 27. The length of the guide groove 27 is not particularly limited. However, when the sectional shape of the main body section 21 of the inner collar member 20 is a regular n-polygonal shape (n is an integer equal to or larger than 3), the inner collar member 20 desirably has length for allowing the inner collar member 20 to rotate by 180°/n in the circumferential one direction (clockwise in FIG. 6C; the Z1 direction) with respect to the outer collar member 10 from a position shown in FIG. 6C.

<Method of Attaching the Metal Collar>

In the assembly process according to this embodiment, when the outer collar member 10 is fitted into the hole inner circumferential surface Hs, while an end portion 10a adjacent to the circumferential direction one side of the slit 13 is towed in the direction of an end portion 10b located on the circumferential direction other side of the slit 13 (in a direction in which the width of the slit 13 decreases), the outer collar member 10 is rotated around the hole axis. Specifically, in a state where the protrusion 16 is engaged in the end portion on the circumferential direction one side (the Z1 direction) of the guide groove 27, the inner collar member 20 is sent in the hole axis direction while being rotated to the circumferential direction other side (counterclockwise in FIG. 6C; the Z2 direction) around the hole axis. The outer collar member 10 is fitted into the hole inner circumferential surface Hs. At this time, the second semi-cylindrical surface 11B is drawn into the through-hole H while slightly decreasing in diameter along the hole inner circumferential surface Hs. Therefore, the outer collar member 10 can be easily fitted into the hole inner circumferential surface Hs. Explanation of the other processes is omitted because the other processes are the same as the processes of the method of attaching the metal collar 2 according to the third embodiment.

According to this embodiment, the outer circumferential surface 11 of the outer collar member 10 is divided into the first semi-cylindrical surface 11A located on the circumferential direction one side of the slit 13 of the outer circumferential surface 11 and the second semi-cylindrical surface 11B located on the circumferential direction other side of the slit 13 of the outer circumferential surface 11. The curvature radius r1 of the first semi-cylindrical surface 11A is smaller than a minimum value of a tolerance of the radius of the hole inner circumferential surface Hs. A curvature radius r2 of the second semi-cylindrical surface 11B is larger than a maximum value of the tolerance of the radius of the hole inner circumferential surface Hs. Therefore, even when the radius of the hole inner circumferential surface Hs is the maximum value of the tolerance, an appropriate frictional force can be secured between the second semi-cylindrical surface 11B and the hole inner circumferential surface Hs. When the inner collar member 20 is rotated around the hole axis with respect to the outer collar member 10, it is possible to prevent a slip of the outer collar member 10 with respect to the hole inner circumferential surface Hs. Even when the radius of the hole inner circumferential surface Hs is the minimum value of the tolerance, the second semi-cylindrical surface 11B is drawn into the through-hole H while slightly decreasing in diameter along the hole inner circumferential surface Hs by, while causing the first semi-cylindrical surface 11A to proceed into the inside of the through-hole H earlier than the second semi-cylindrical surface 11B, rotating the outer collar member 10 around the hole axis in a direction in which the end portion 10a of the outer collar member 10 precedes the end portion 10b (the Z2 direction). Therefore, the outer collar member 10 can be easily fitted into the hole inner circumferential surface Hs.

When the protrusion 16 is located at the end portion of the guide groove 27, the guide groove 27 engages with the protrusion 16 and hinders the rotation of the inner collar member 20 with respect to the outer collar member 10. Therefore, by rotating the inner collar member 20 around the hole axis in a state where the protrusion 16 is engaged with the end portion of the guide groove 27, it is possible to rotate the outer collar member 10 around the hole axis while towing the end portion 10a of the outer collar member 10 toward the end portion 10b. When the protrusion 16 is located in a portion other than the end portion of the guide groove 27, the guide groove 27 allows movement of the protrusion 16 in the guide groove 27 and allows rotation of the inner collar member 20 around the hole axis with respect to the outer collar member 10. Therefore, after the fitting of the outer collar member 10 into the hole inner circumferential surface Hs is completed, by reversing the rotating direction of the inner collar member 20, it is possible to bring the convex surface 25 into contact with the inner circumferential surface 12 of the outer collar member 10 and apply a pressing force outward in the radial direction to the inner circumferential surface 12.

Seventh Embodiment

Figure 7A:
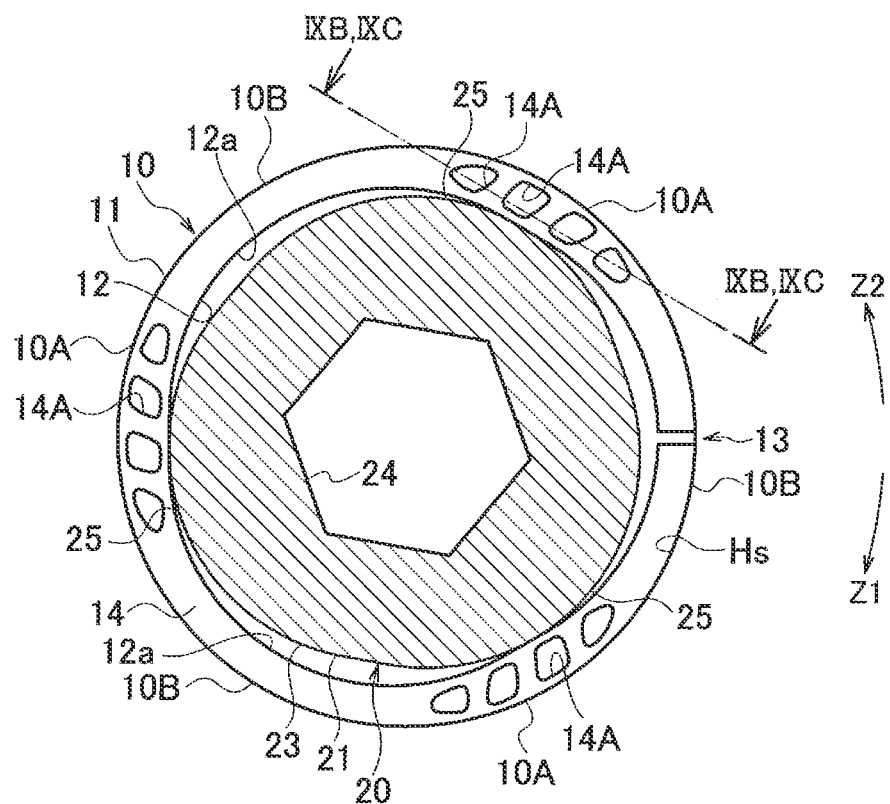
FIG. 7A is a main part sectional view of a metal collar according to a seventh embodiment.
Figure 7B:
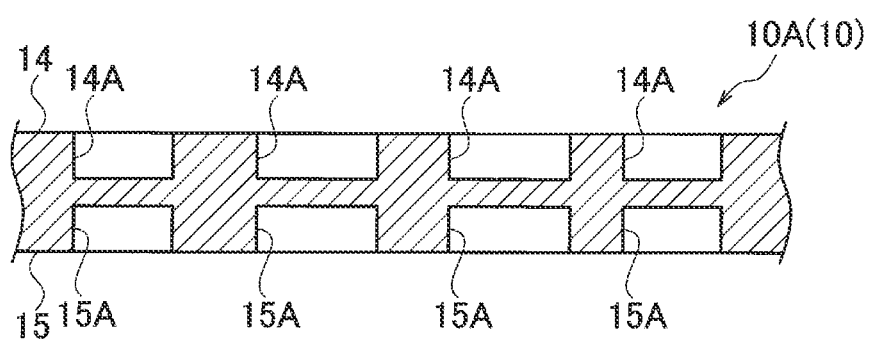
FIG. 7B is a sectional view along a line IXB-IXB in FIG. 7A
Figure 7C:
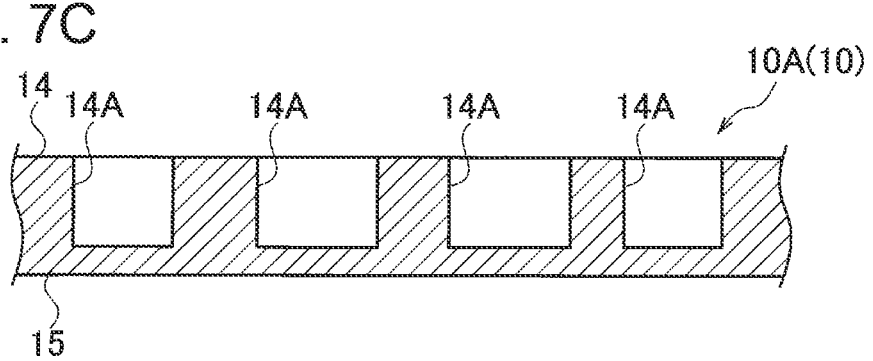
FIG. 7C is a sectional view along a line IXC-IXC in FIG. 7A of a metal collar according to a modification of the seventh embodiment.

In the seventh embodiment, the rigidity of a portion with which the convex surface 25 of the inner collar member 20 is in contact to apply a pressing force in the outer collar member 10 is set lower than the rigidity in the other portions in the outer collar member 10 as shown in FIG. 7A to FIG. 7C. More specifically, in the cross section perpendicular to the axial direction of the through-hole H, rigidity against a radial direction load (the pressing force) is lower in a thick wall section 10A corresponding to a side of a regular triangular shape of the inner circumferential surface 12 of the outer collar member 10 than a thin wall section 10B corresponding to a corner of the regular triangular shape.

As shown in FIG. 7B, pluralities of dented sections 14A and 15A having depths in the hole axis direction are respectively formed on the upper side surface 14 and the lower side surface 15 of the thick wall section 10A. Partition walls are provided among the dented sections 14A and 15A adjacent to one another in the axial direction. Note that, as shown in FIG. 7C, dented sections may be provided on only one of the upper side surface 14 and the lower side surface 15 of the thick wall section 10A. The dented sections 14A and 15A may be holes piercing though the thick wall section 10A in the axial direction. However, when high waterproofness is requested, it is more desirable to provide the partition walls.

According to this embodiment, the rigidity of the portion with which the convex surface 25 of the inner collar member 20 is in contact to apply a pressing force in the outer collar member 10 is set lower than the rigidity in the other portions. Therefore, even if the FRP member 1 is thinned by a change with time and the position of the hole inner circumferential surface Hs retracts further to the radial direction outer side than the initial position, the low-rigidity portion of the outer collar member 10 is elastically restored. Therefore, it is possible to absorb the deformation of the FRP member 1 more than when the low-rigidity portion is not provided. Consequently, it is possible to prevent slack of the metal collar 2.

Figure 7D:
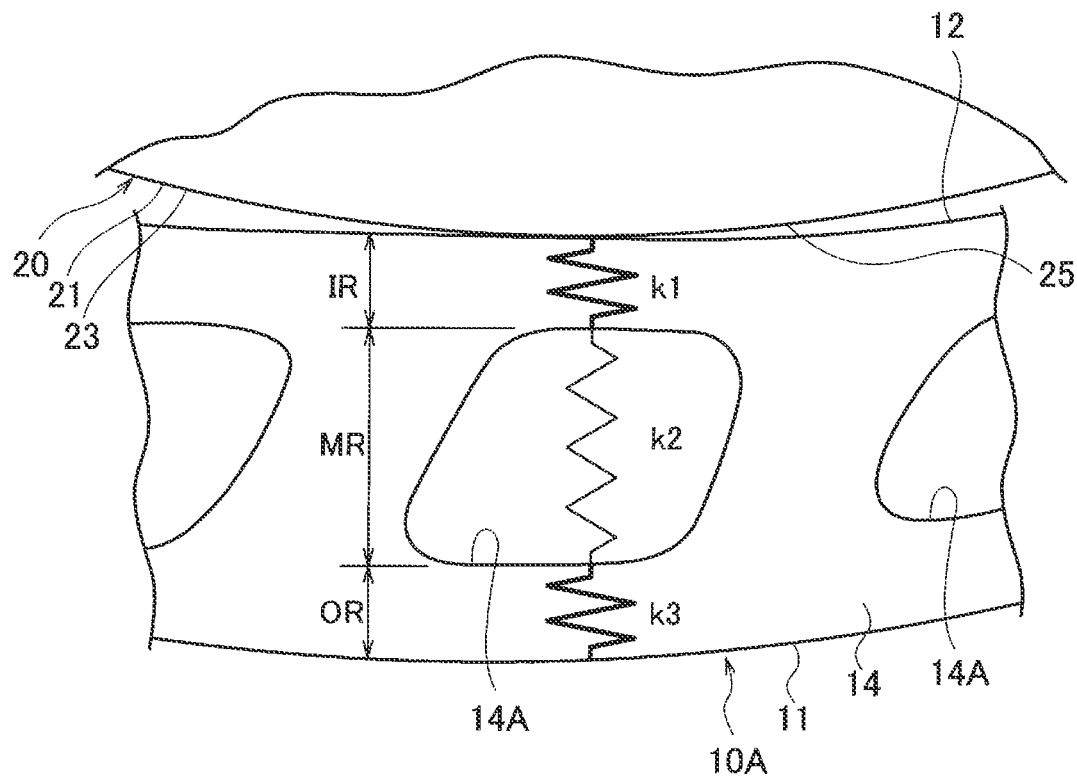
FIG. 7D is a diagram for explaining action of a low-rigidity part of an outer collar member according to the seventh embodiment.
Figure 7E:
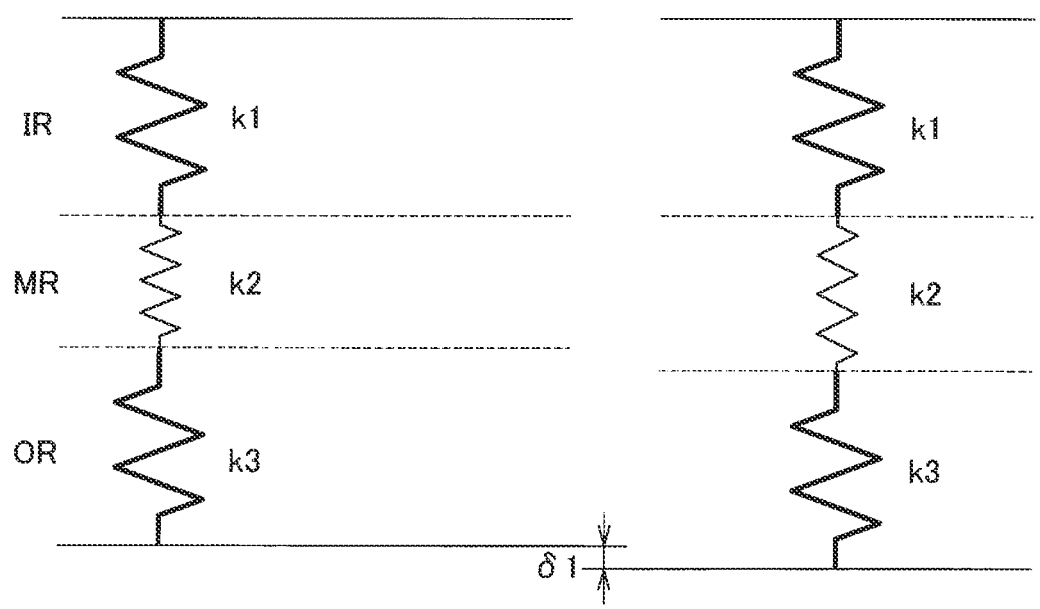
FIG. 7E is a diagram for explaining the action of the low-rigidity part of the outer collar member according to the seventh embodiment.

In this embodiment, the dented sections 14A and 15A having the depths in the hole axis direction are formed in the portion of the outer collar member 10, with which the convex surface 25 of the inner collar member 20 is in contact to apply a pres sing force. Consequently, as shown in FIG. 7D, an intermediate region MR including the dented sections 14A and 15A and an inner region IR and an outer region OR located across the intermediate region MR in the radial direction and not including the dented sections 14A and 15A are formed in the portion. If the three regions are represented as three springs connected in series in the radial direction as shown in FIG. 7D, a spring constant k2 of the intermediate region MR is smaller than a spring constant k1 of the inner region IR and a spring constant k3 of the outer region OR because the dented sections 14A and 15A are formed in the intermediate region MR. A combined spring constant of the three springs is also smaller than a combined spring constant obtained when the dented sections 14A and 15A are not formed. Therefore, according to this embodiment, as shown in FIG. 7E, since mainly the intermediate region MR is elastically restored, it is possible to absorb deformation δ1 of the FRP member 1 more than when the dented sections 14A and 15A are not provided.

Eighth Embodiment

Figure 8A:
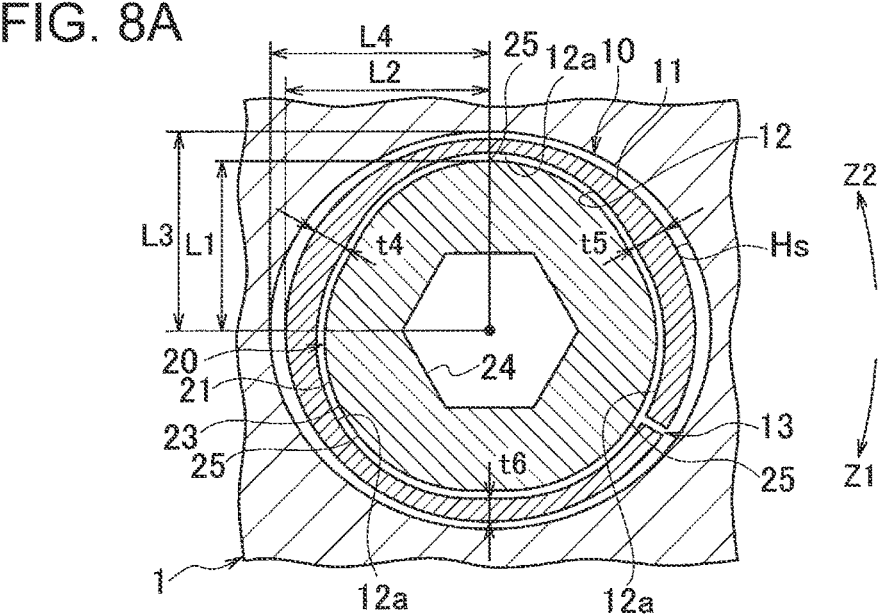
FIG. 8A is a sectional view perpendicular to the center axis of a through-hole for explaining an assembly process for a metal collar according to an eighth embodiment and shows a state where the metal collar is fitted into the through-hole.
Figure 8B:
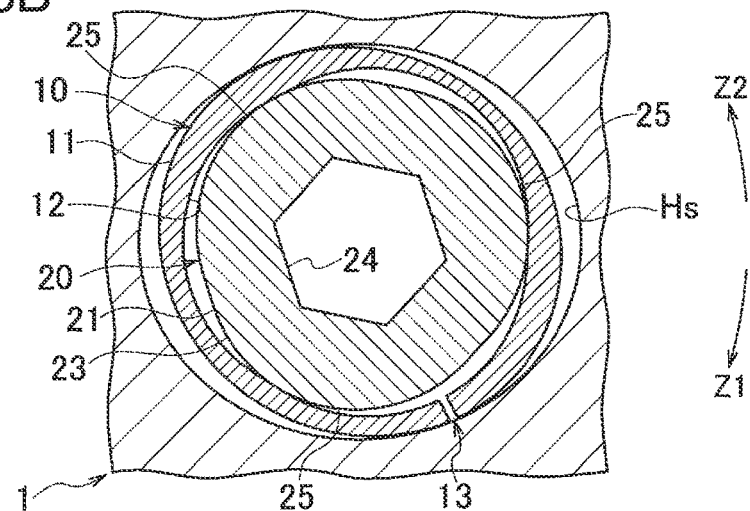
FIG. 8B is a sectional view perpendicular to the center axis of the through-hole for explaining the assembly process following FIG. 8A and shows a state where an inner collar member is rotated with respect to an FRP member to bring an outer collar member into contact with a hole inner circumferential surface.
Figure 8C:
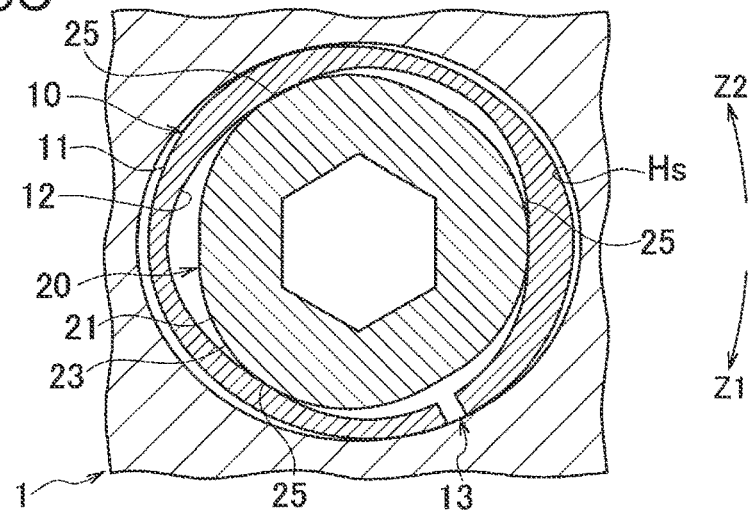
FIG. 8C is a sectional view perpendicular to the center axis of the through-hole for explaining the assembly process following FIG. 8B and shows a state where the inner collar member is rotated with respect to the outer collar member to deform the outer collar member for diameter expansion with the inner collar member.

In the eighth embodiment, as shown in FIG. 8A to FIG. 8C, in the cross section perpendicular to the axial direction of the through-hole H, the hole inner circumferential surface Hs and the outer circumferential surface 11 of the outer collar member 10 are respectively formed in elliptical shapes. The shape of the hole inner circumferential surface Hs and the shape of the outer circumferential surface 11 of the outer collar member 10 are substantially similar. A distance L2 from the center of the outer circumferential surface 11 of the outer collar member 10 to the major axis end of the elliptical shape on the outer circumferential surface 11 is larger than a distance L3 from the center of the hole inner circumferential surface Hs to a minor axis end of the elliptical shape on the hole inner circumferential surface Hs.

In the cross section perpendicular to the axial direction of the through-hole H, the outer circumferential surface 23 of the main body section 21 of the inner collar member 20 and the inner circumferential surface 12 of the outer collar member 10 are respectively formed in rounded regular triangular shapes. The shape of the outer circumferential surface 23 of the main body section 21 and the shape of the inner circumferential surface 12 of the outer collar member 10 are substantially similar. A sum of the distance L1 from the center of the outer circumferential surface 23 of the main body section 21 to the most distant point on the convex surface 25 corresponding to the corner of the regular triangular shape on the outer circumferential surface 23 and the maximum value of the average thickness T in the radial direction of the outer collar member 10 is larger than a distance L4 from the center of the hole inner circumferential surface Hs to the major axis end of the elliptical shape on the hole inner circumferential surface Hs. The average thickness T in the radial direction is a value obtained by dividing, by three, which is the number of the corners of the regular triangular shape, a sum of radial direction thicknesses (for example, t4, t5, and t6 in FIG. 8A) of the outer collar member 10 in three positions separated from one another by 120° in the circumferential direction of the inner circumferential surface 12 of the outer collar member 10.

The outer collar member 10 is fitted into the hole inner circumferential surface Hs. The main body section 21 of the inner collar member 20 is fitted into the inner circumferential surface 12 of the outer collar member 10. In this state, the inner collar member 20 is rotated around the hole axis with respect to the FRP member 1 and the outer collar member 10. The convex surfaces of the outer collar member 10 are in contact with the hole inner circumferential surface Hs. The convex surfaces 25 of the inner collar member 20 are in contact with the inner circumferential surface 12 of the outer collar member 10. The convex surfaces 25 apply a pressing force outward in the radial direction to the inner circumferential surface 12 of the outer collar member 10. The outer collar member 10 is deformed in the diameter expanding direction and the outer circumferential surface 11 of the outer collar member 10 is pressed against the hole inner circumferential surface Hs by the pressing force. The inner collar member 20 receives reaction of the pressing force from the inner circumferential surface 12 of the outer collar member 10 and is held in the outer collar member 10 by the reaction.

According to this embodiment, in the cross section perpendicular to the axial direction of the through-hole H, the hole inner circumferential surface Hs and the outer circumferential surface 11 of the outer collar member 10 are respectively formed in the elliptical shapes. The distance L2 from the center of the outer circumferential surface 11 of the outer collar member 10 to the most distant point of the convex surface corresponding to the major axis end portion of the elliptical shape on the outer circumferential surface 11 is larger than the distance L3 from the center of the hole inner circumferential surface Hs to the minor axis end of the elliptical shape on the hole inner circumferential surface Hs. Further, in the sectional view perpendicular to the axial direction of the through-hole H, the outer circumferential surface 23 of the main body section 21 of the inner collar member 20 and the inner circumferential surface 12 of the outer collar member 10 are respectively formed in rounded regular triangular shapes. The sum of the distance L1 from the center of the outer circumferential surface 23 of the main body section 21 of the inner collar member 20 to the most distant point on the convex surface 25 corresponding to the corner of the regular triangular shape on the outer circumferential surface 23 and the maximum value of the average thickness T in the radial direction of the outer collar member 10 is larger than the distance L4 from the center of the hole inner circumferential surface Hs to the major axis end of the elliptical shape on the hole inner circumferential surface Hs. Therefore, in a state where the outer collar member 10 is fitted into the hole inner circumferential surface Hs, by rotating the inner collar member 20 around the hole axis with respect to the FRP member 1, it is possible to rotate the outer collar member 10 around the hole axis with respect to the FRP member 1 and bring the convex surfaces of the outer collar member 10 into contact with the hole inner circumferential surface Hs. Thereafter, by further continuing the rotation of the inner collar member 20, it is possible to rotate the inner collar member 20 around the hole axis with respect to the outer collar member 10, bring the convex surfaces 25 of the inner collar member 20 into contact with the inner circumferential surface 12 of the outer collar member 10, and apply a pressing force to the inner circumferential surface 12.

The convex surfaces of the outer collar member 10 are in contact with the hole inner circumferential surface Hs and the outer collar member 10 is restrained to be un-rotatable in the through-hole H. Therefore, strength against tightening torque input from the fastener F is increased. Therefore, even when excessively large tightening torque is input from the fastener F, it is possible to prevent the metal collar 2 from rotating with respect to the FRP member 1.

<Method of Attaching the Metal Collar>

In the assembly process according to this embodiment, as shown in FIG. 8A, after the outer collar member 10 is fitted into the hole inner circumferential surface Hs, the inner collar member 20 is rotated to the circumferential direction one side (clockwise in FIG. 8A; the Z1 direction) around the hole axis with respect to the FRP member 1 to rotate the outer collar member 10 around the hole axis with respect to the FRP member 1. As shown in FIG. 8B, the convex surfaces of the outer collar member 10 are brought into contact with the hole inner circumferential surface Hs. Thereafter, the inner collar member 20 is further rotated in the circumferential direction one side (clockwise in FIG. 8A; the Z1 direction) around the hole axis with respect to the outer collar member 10. As shown in FIG. 8C, the convex surfaces 25 of the inner collar member 20 are brought into contact with the inner circumferential surface 12 of the outer collar member 10 to apply a pressing force to the inner circumferential surface 12 of the outer collar member 10 from the convex surfaces 25. Explanation of the other processes is omitted because the other processes are the same as the processes of the method of attaching the metal collar 2 according to the third embodiment.

With the attaching method explained above, by bringing the convex surfaces of the outer collar member 10 into contact with the hole inner circumferential surface Hs and restraining the outer collar member 10 to be un-rotatable in the through-hole H, it is possible to obtain a fastening part structure having excellent strength against tightening torque input from the fastener F. By controlling rotation torque in rotating the inner collar member 20 around the hole axis with respect to the outer collar member 10, it is possible to control a press force of the outer collar member 10 against the hole inner circumferential surface Hs of the outer circumferential surface 11 to an appropriate value.

The hole inner circumferential surface Hs and the outer circumferential surface 11 of the outer collar member 10 in the cross section perpendicular to the axial direction of the through-hole H are not limited to the elliptical shapes and may be formed in rounded regular polygonal shapes substantially similar to each other. The outer circumferential surface 23 of the inner collar member 20 and the inner circumferential surface 12 of the outer collar member 10 in the cross section perpendicular to the axial direction of the through-hole H may be formed in rounded regular polygonal shapes (regular quadrangular shapes, regular pentagonal shapes, or the like other than the regular triangular shapes) substantially similar to each other. In this case, a distance from the center of the outer circumferential surface 11 of the outer collar member 10 to a most distant point of the convex surface corresponding to a corner of the regular polygonal shape of the outer circumferential surface 11 only has to be formed larger than a minimum value of the radial direction distance from the center of the hole inner circumferential surface Hs to the hole inner circumferential surface Hs (a distance from the center of the hole inner circumferential surface Hs to a nearest point of a surface of the hole inner circumferential surface Hs corresponding to a side of the regular polygonal shape). Further, a sum of a distance from the center of the outer circumferential surface 23 of the main body section 21 to a most distant point of the convex surface 25 corresponding to the corner of the regular polygonal shape of the outer circumferential surface 23 and the maximum value of the average thickness T in the radial direction of the outer collar member 10 only has to be formed larger than a maximum value of the radial direction distance from the center of the hole inner circumferential surface Hs to the hole inner circumferential surface Hs (a distance from the center of the hole inner circumferential surface Hs to a most distant point of a concave surface of the hole inner circumferential surface Hs corresponding to the corner of the regular polygonal shape). The average thickness T in the radial direction is a value obtained by dividing, by n (n is the number of corners of the regular polygonal shape), a sum of thicknesses in the radial direction of the outer collar member 10 in n positions separated from one another by 360°/n in the circumferential direction of the inner circumferential surface 12 of the outer collar member 10. In this case, the same effects as the effects explained above can be obtained.

Ninth Embodiment

Figure 9:
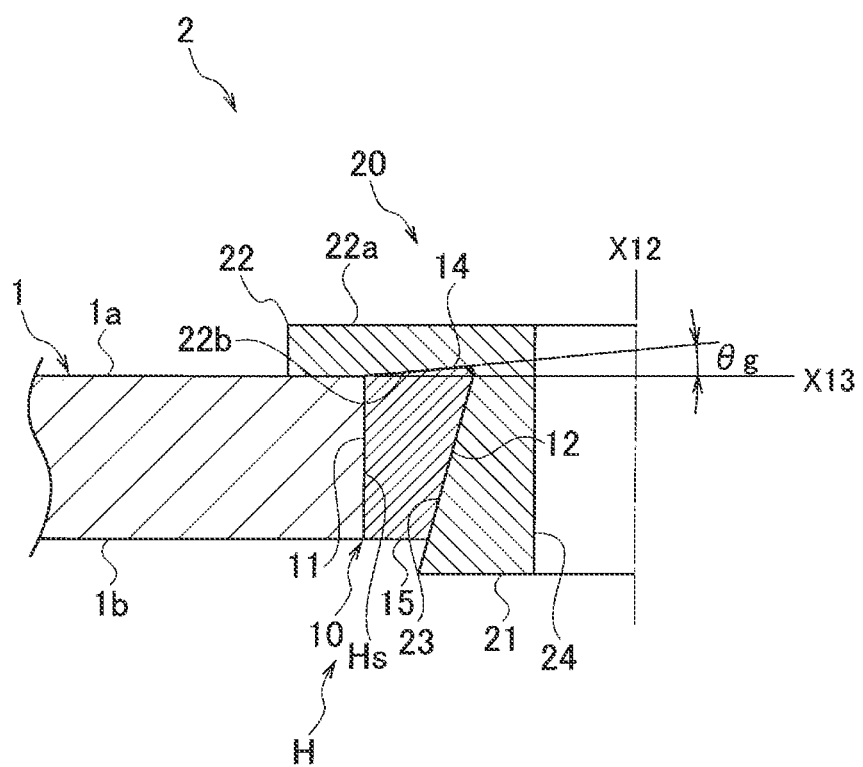
FIG. 9 is a partial sectional view along the center axis of a through-hole of a fastening part structure according to a ninth embodiment.

In the ninth embodiment, as shown in FIG. 9, tapers extending upward (the surface 22a side of the flange section 22) while extending inward in the radial direction are provided in the side surface (the rear surface) 22b on the lower side (the outer collar member 10 side) of the flange section 22 of the inner collar member 20 and the side surface 14 on the upper side (the flange section 22 side) of the outer collar member 10. In a cross section including a center axis X12 of the inner collar member 20, an angle θg of the tapers is, for example, approximately 5° with respect to a line X13 orthogonal to the center axis X12.

According to this embodiment, tapers located closer to the surface 22a of the flange section 22 inward in the radial direction are provided in the side surface 14 on the flange section 22 side of the outer collar member 10 and the rear surface 22b of the flange section 22 in contact with the side surface 14. Therefore, when an axial force of the fastener F is input to the side surface 14 of the outer collar member 10 from the rear surface 22b of the flange section 22 via the flange section 22, a force the radial direction outer side direction is less easily applied to the outer collar member 10. Therefore, even when an excessively large axial force is input from the fastener F, it is possible to prevent an excessive force from being applied outward in the radial direction to the hole inner circumferential surface Hs. Even when excessively large tightening torque is input from the fastener F, a force in the radial direction inner direction acts on the end portion on the flange section 22 side of the outer collar member 10 from the rear surface 22b of the flange section 22. The outer collar member 10 is restrained in the inner collar member 20. Therefore, it is possible to prevent rotation (a slip) of the inner collar member 20 with respect to the outer collar member 10. Note that, if the taper is provided in the rear surface 22b of the flange section 22 having larger width in the radial direction than the side surface 14 of the outer collar member 10, the effects of this embodiment can be obtained even if the taper of the side surface 14 of the outer collar member 10 is omitted.

Tenth Embodiment

Figure 10A:
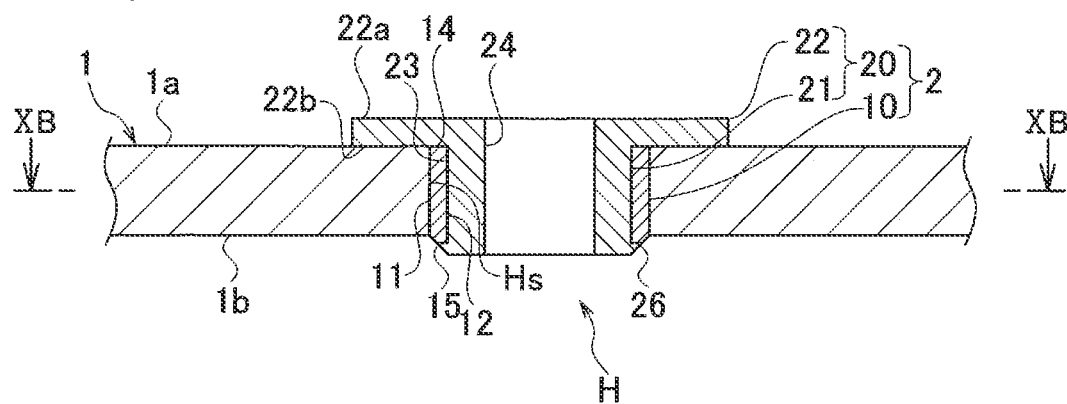
FIG. 10A is a sectional view along the center axis of a through-hole of a fastening part structure according to a tenth embodiment.
Figure 10B:
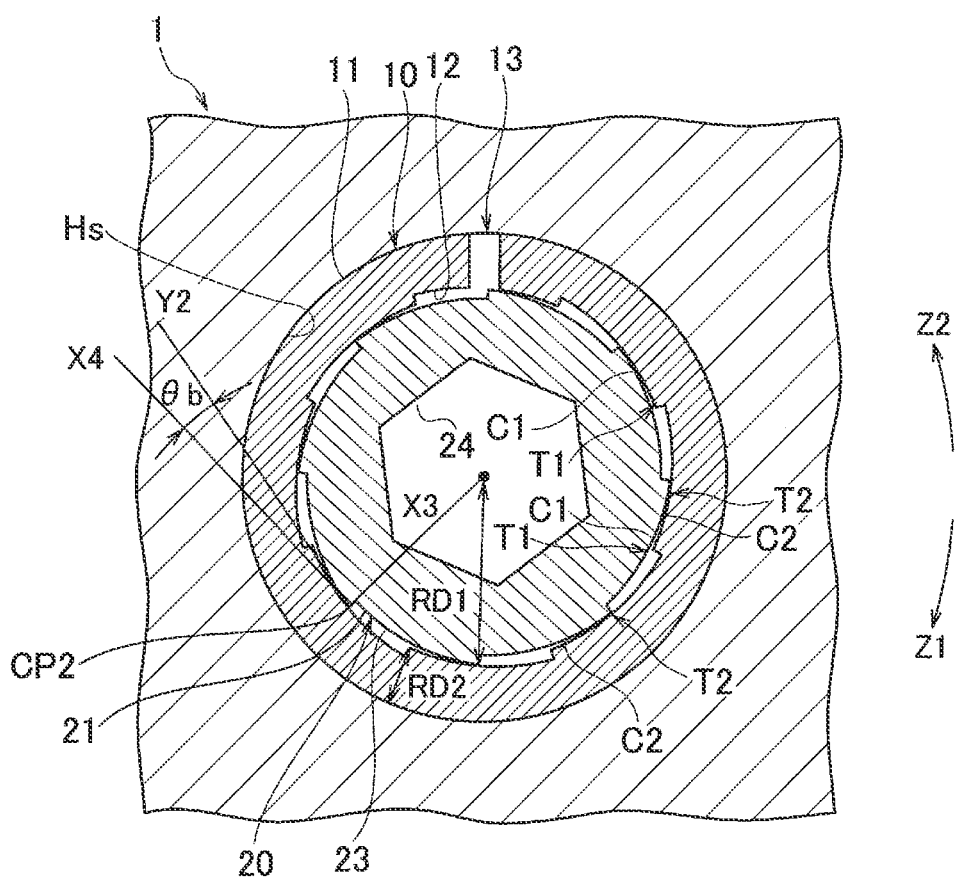
FIG. 10B is a sectional view along a line XB-XB in FIG. 10A.
Figure 10C:
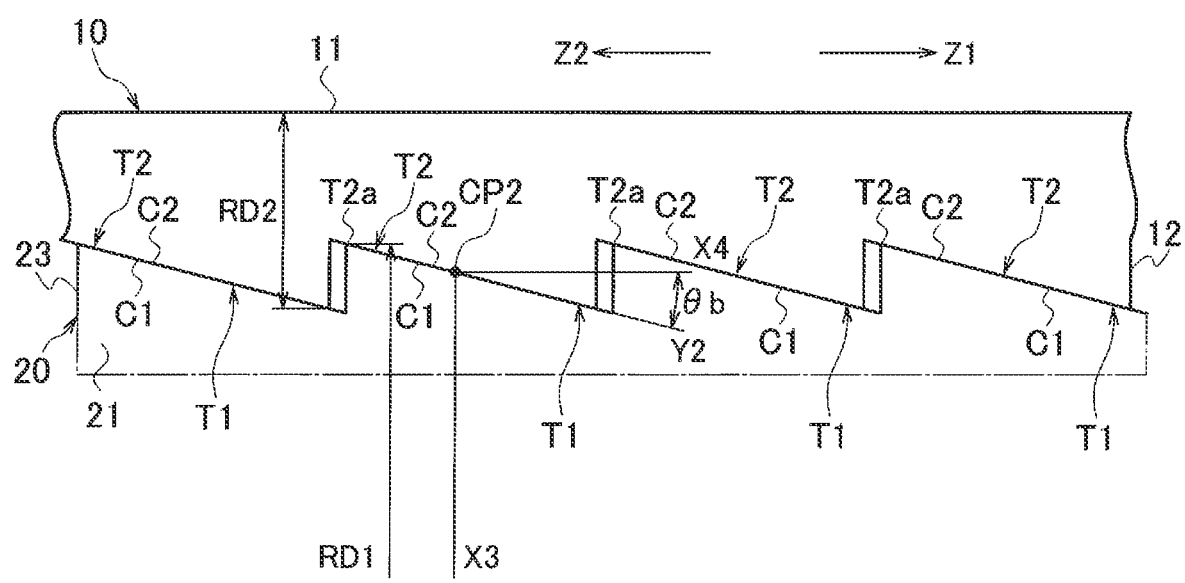
FIG. 10C is a diagram developing, in a circumferential direction, and schematically showing an example of a positional relation between external teeth of an inner collar member and internal teeth of an outer collar member according to the tenth embodiment.

In the tenth embodiment, as shown in FIG. 10A to FIG. 10C, external teeth T2 are formed side by side in the circumferential direction on the outer circumferential surface 23 of the main body section 21 of the inner collar member 20. Inner cam surfaces C2 are respectively provided on radial direction outer side surfaces of the external teeth T2. Internal teeth T1 are formed side by side in the circumferential direction on the inner circumferential surface 12 of the outer collar member 10. Outer cam surfaces C1 are respectively provided on radial direction inner side surfaces of the internal teeth T1. Outer cam surfaces C1 are respectively opposed to inner cam surfaces C2 in the radial direction.

The inner cam surfaces C2 and the outer cam surfaces C1 are respectively inclined such that the circumferential direction one side is located inside, in the radial direction, the circumferential direction other side in the cross section perpendicular to the axial direction of the through-hole H. As shown in FIG. 10B and FIG. 10C, in the cross section perpendicular to the axial direction of the through-hole H, a sum of a maximum value RD1 of a radial direction distance from the center of the outer circumferential surface 23 of the inner collar member 20 to the inner cam surfaces C2 and a maximum value RD2 of a radial direction distance from the outer cam surfaces C1 to the outer circumferential surface 11 of the outer collar member 10 is larger than the radius of the hole inner circumferential surface Hs. The outer collar member 10 is fitted into the hole inner circumferential surface Hs. The main body section 21 of the inner collar member 20 is fitted into the inner circumferential surface 12 of the outer collar member 10. In that state, the inner collar member 20 is rotated to the circumferential direction one side (clockwise in FIG. 10B; the Z1 direction) around the hole axis with respect to the outer collar member 10. The inner cam surfaces C2 of the inner collar member 20 are in contact with the outer cam surfaces C1 to apply a pressing force outward in the radial direction to the outer cam surfaces C1. The outer collar member 10 is deformed in the diameter expanding direction and the outer circumferential surface 11 of the outer collar member 10 is pressed against the hole inner circumferential surface Hs. The inner collar member 20 receives reaction of the pressing force from the outer cam surfaces C1. The inner collar member 20 is held in the outer collar member 10 by the reaction.

As shown in FIG. 10B and FIG. 10C, in the cross section perpendicular to the axial direction of the through-hole H, a smaller angle θb of angles formed by a tangential line Y2 at a contact CP2 of the inner cam surface C2 and the outer cam surface C1, and a straight line X4 perpendicular to a straight line X3 which passes the contact CP2 and connects the contact CP2 and the center of the inner collar member 20 satisfies the following expression:

$$\tan \theta b \leq \mu$$

where μ is a coefficient of static friction between the inner cam surface C2 and the outer cam surface C1.

According to this embodiment, the inner cam surfaces C2 are formed side by side in the circumferential direction on the outer circumferential surface 23 of the inner collar member 20. The outer cam surfaces C1 respectively opposed to the inner cam surfaces C2 in the radial direction are formed side by side in the circumferential direction on the inner circumferential surface 12 of the outer collar member 10. In the cross section perpendicular to the axial direction of the through-hole H, the inner cam surfaces C2 and the outer cam surfaces C1 are each inclined such that the circumferential direction one side is located inside, in the radial direction, the circumferential direction other side. The sum of the maximum value RD1 of the radial direction distance from the center of the outer circumferential surface 23 of the inner collar member 20 to the inner cam surfaces C2 and the maximum value RD2 of the radial direction distance from the outer cam surfaces C1 to the outer circumferential surface 11 of the outer collar member 10 is larger than the radius of the hole inner circumferential surface Hs. Therefore, in a state where the outer collar member 10 is fitted into the hole inner circumferential surface Hs, by rotating the inner collar member 20 to the circumferential direction one side (clockwise in FIG. 10B; the Z1 direction) around the hole axis with respect to the outer collar member 10, it is possible to bring the inner cam surfaces C2 into contact with the outer cam surfaces C1 to apply a pressing force outward in the radial direction to the outer cam surfaces C1.

Compared with when the rounded polygonal shapes are respectively formed on the outer circumferential surface 23 of the inner collar member 20 and the inner circumferential surface 12 of the outer collar member 10 as in the third to ninth embodiments, it is possible to reduce the volume of the gap formed between the inner collar member 20 and the outer collar member 10. Therefore, it is possible to reduce an amount of use of the adhesive for filling the gap. It is possible to improve the rigidity of the metal collar 2 after the adhesive hardening.

In the cross section perpendicular to the axial direction of the through-hole H, the angle θb satisfies the following expression:

$$\tan \theta b \leq \mu$$

where μ is a coefficient of static friction between the inner cam surface C2 and the outer cam surface C1.

Therefore, even if an external force in the radial direction acts on the inner collar member 20, a frictional force between the inner cam surface C2 and the outer cam surface C1 is larger than a component parallel to the tangential line Y2 of the external force. Therefore, it is possible to prevent a slip of the inner cam surface C2 with respect to the outer cam surface C1 and prevent slack of the inner collar member 20 and the outer collar member 10 (the metal collar 2).

<Method of Attaching the Metal Collar>

Figure 10D:
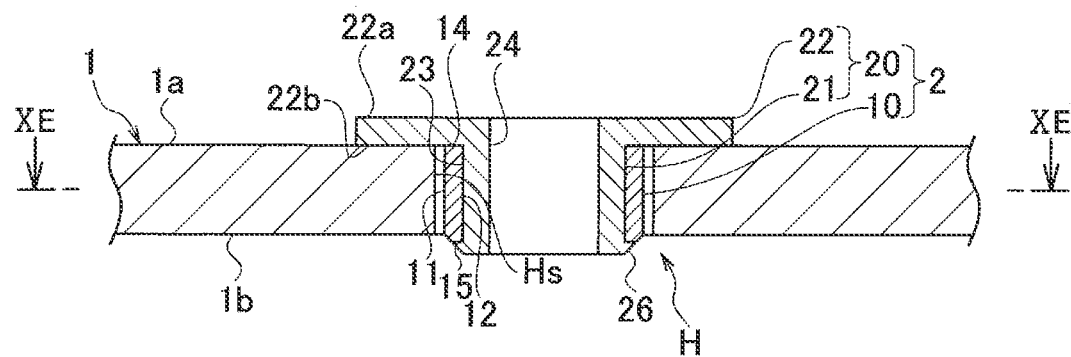
FIG. 10D is an explanatory diagram of an assembly process for a metal collar according to the tenth embodiment and shows a state where the metal collar is fitted into the through-hole.
Figure 10E:
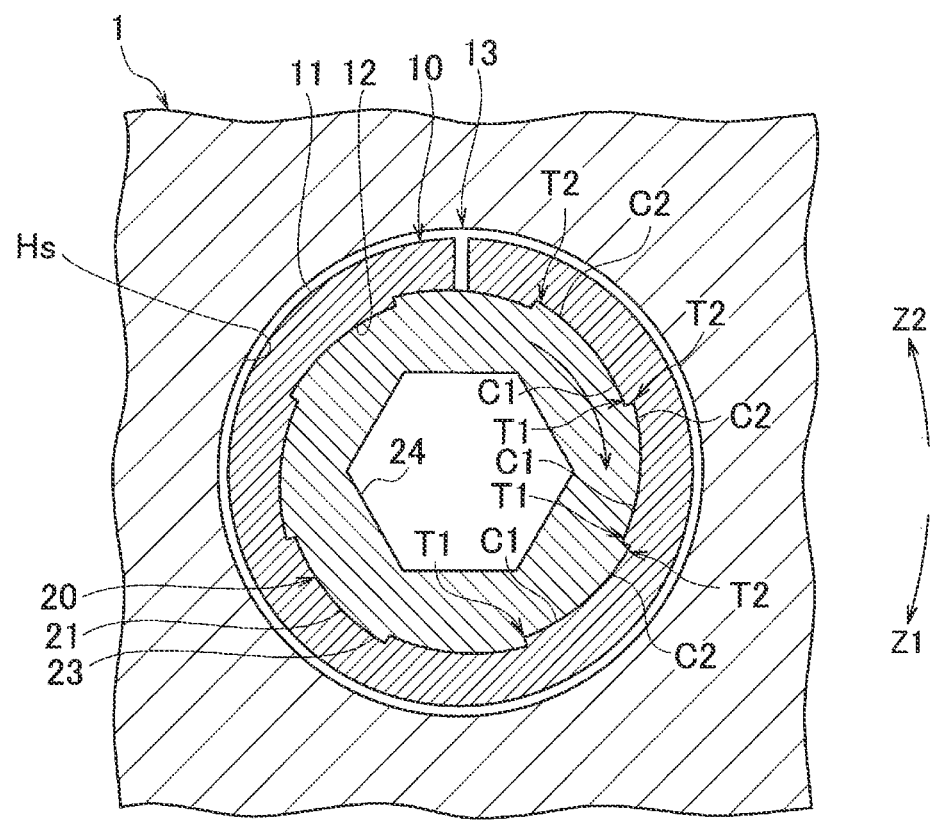
FIG. 10E is a sectional view along a line XE-XE in FIG. 10D.

In the assembly process according to this embodiment, as shown in FIG. 10D and FIG. 10E, after the outer collar member 10 is fitted into the hole inner circumferential surface Hs, while rotation around the hole axis of the outer collar member 10 with respect to the FRP member 1 is restrained, the inner collar member 20 is rotated around the hole axis to the circumferential direction one side (to the Z1 direction) with respect to the outer collar member 10. Consequently, as shown in FIG. 10B, the inner cam surfaces C2 are brought into contact with the outer cam surfaces C1 to apply a pressing force outward in the radial direction from the inner cam surfaces C2 to the outer cam surfaces C1. Explanation of the other processes is omitted because the other processes are the same as the processes of the method of attaching the metal collar 2 according to the embodiments explained above.

With the attaching method explained above, it is possible to efficiently obtain the fastening part structure (in a simple process with high productivity). An amount of the adhesive used for the bonding of the inner collar member 20 and the outer collar member 10 is small. It is possible to efficiently obtain the metal collar 2 having high rigidity.

Note that attaching methods for a metal collar according to the eleventh to fifteenth embodiments explained below are the same as the method of attaching the metal collar according to the tenth embodiment. Therefore, explanation of the method of attaching the metal collar is omitted concerning the eleventh to fifteenth embodiments.

Eleventh Embodiment

Figure 11:
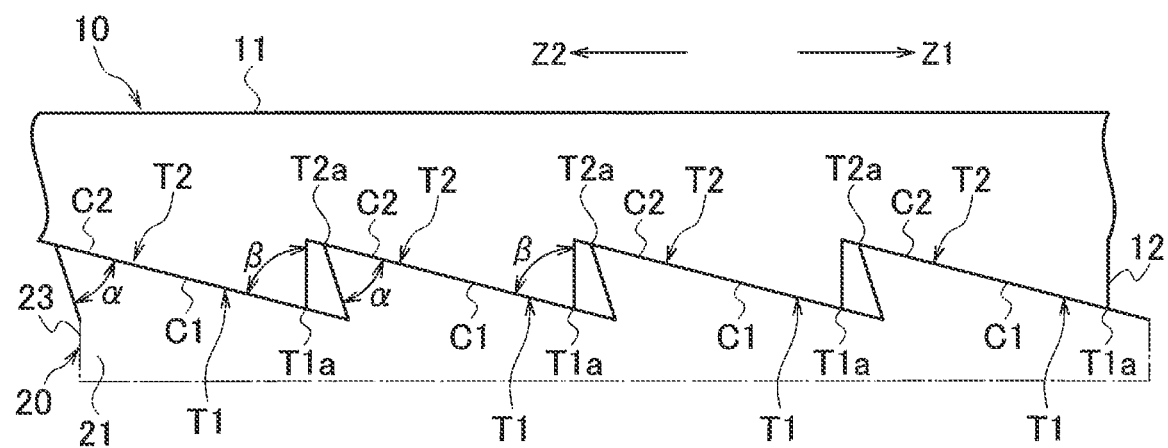
FIG. 11 is a diagram developing, in a circumferential direction, and schematically showing an example of a positional relation between external teeth of an inner collar member and internal teeth of an outer collar member according to an eleventh embodiment.

In the eleventh embodiment, as shown in FIG. 11, end portions T2a on the radial direction outer side of the external teeth T2 are formed at an acute angle in the cross section perpendicular to the axial direction of the through-hole H. An angle α of the end portions T2a satisfies a relation of the following expression with the angle θb described above.

$$\alpha < 90° - \theta b$$

According to this embodiment, the rigidity of the end portions T2a on the radial direction outer side of the external teeth T2 is lower than when the angle α is in a relation of α≥90°−θb. Therefore, even if the FRP member 1 is thinned by a change with time and the hole inner circumferential surface Hs retracts further to the radial direction outer side than the initial position, the end portions T2a are elastically restored. Therefore, it is possible to absorb the deformation of the FRP member 1 more (more than when the angle α is in the relation of α≥90°−θb). Consequently, it is possible to prevent slack of the metal collar 2.

Note that, instead of the end portions T2a on the radial direction outer side of the external teeth T2 or together with the end portions T2a, end portions T1a on the radial direction inner side of the internal teeth T1 may for formed at an acute angle in the cross section perpendicular to the axial direction of the through-hole H. An angle θ of the end portions T1a may be formed to satisfy a relation of the following expression with the angle θb.

$$\beta < 90° - \theta b$$

In this case as well, it is possible to set the rigidity of the end portion T1a on the radial direction inner side of the internal teeth T1 lower than when the angle β is in a relation of β≥90°−θb. The same effects as the effects explained above can be obtained.

Twelfth Embodiment

Figure 12A:
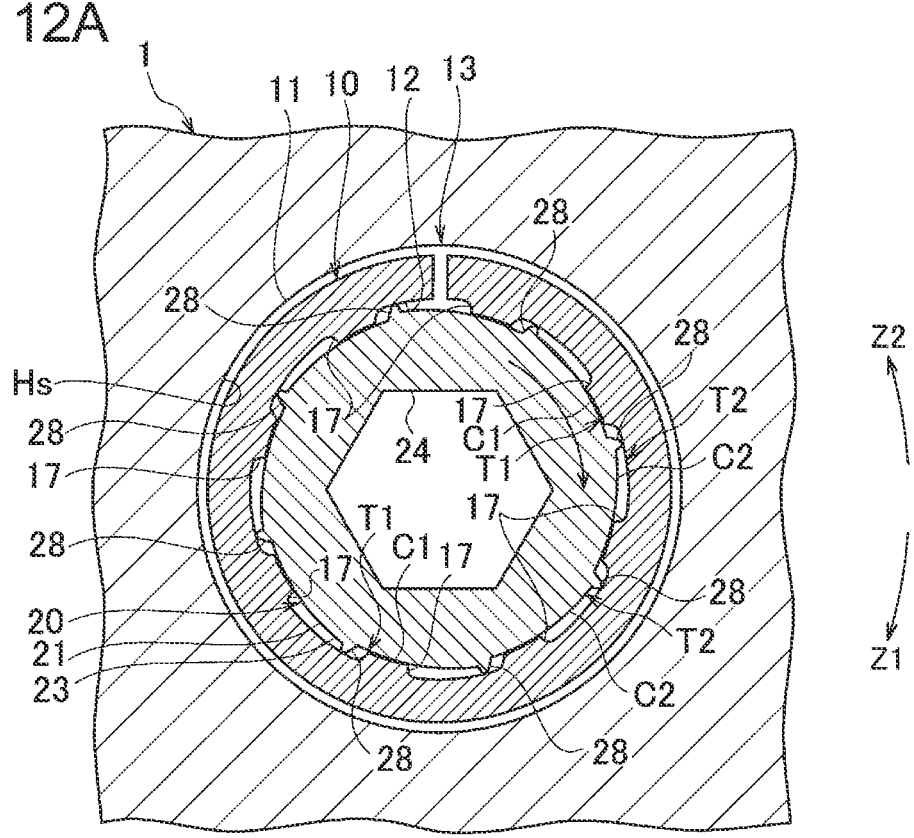
FIG. 12A is a sectional view perpendicular to the center axis of a through-hole for explaining an assembly process for a metal collar according to a twelfth embodiment and shows a state where the metal collar is fitted into the through-hole.
Figure 12B:
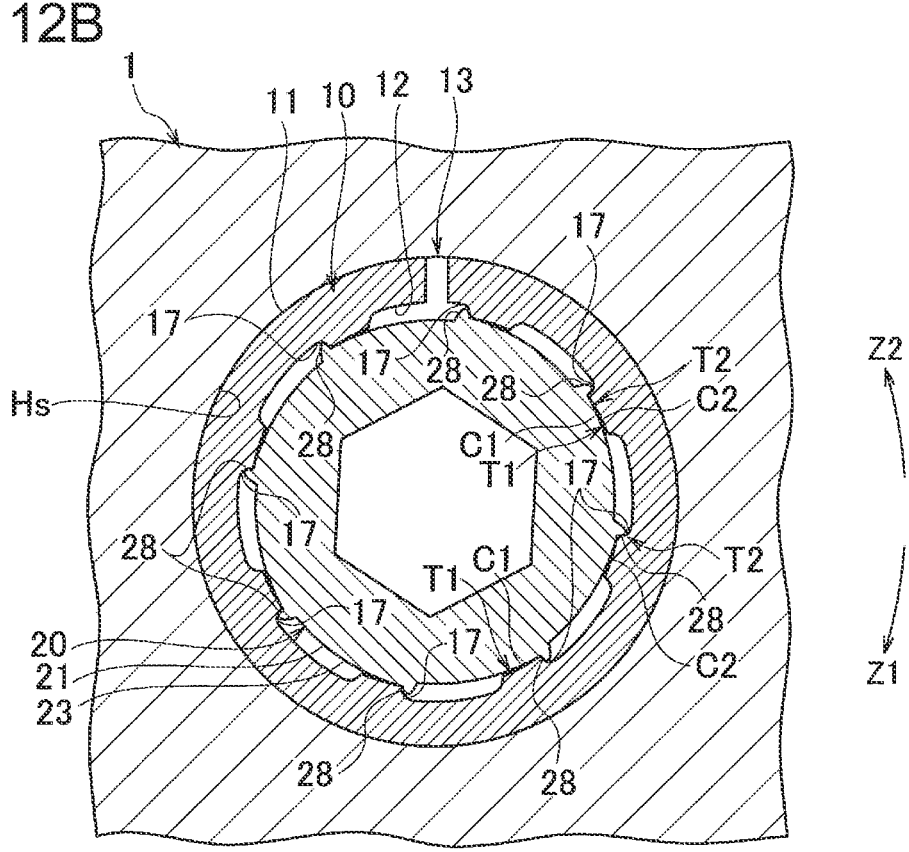
FIG. 12B is a sectional view perpendicular to the center axis of the through-hole for explaining the assembly process following FIG. 12A and shows a state where an inner collar member is rotated with respect to an outer collar member to deform the outer collar member for diameter expansion with the inner collar member.
Figure 12C:
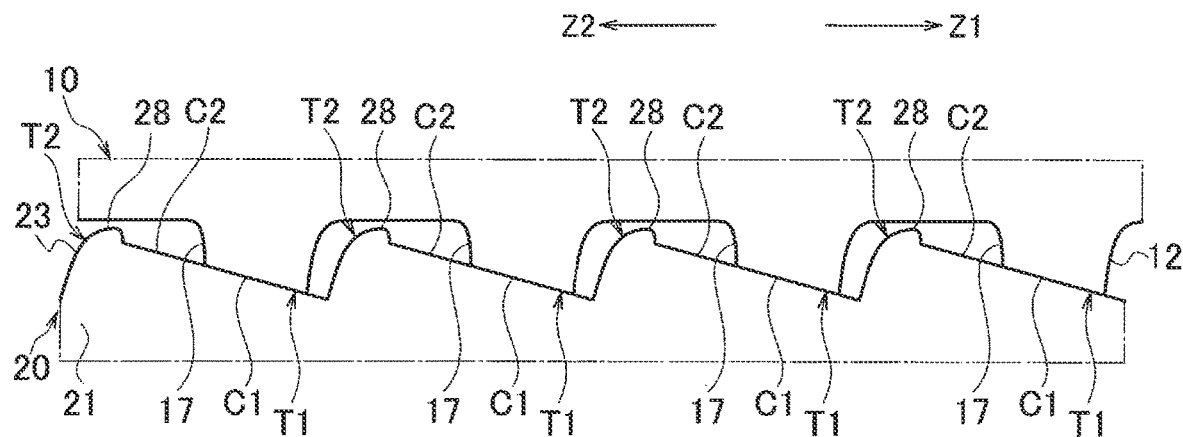
FIG. 12C is a diagram developing, in a circumferential direction, and schematically showing a positional relation between external teeth of the inner collar member and internal teeth of the outer collar member shown in FIG. 12A.
Figure 12D:
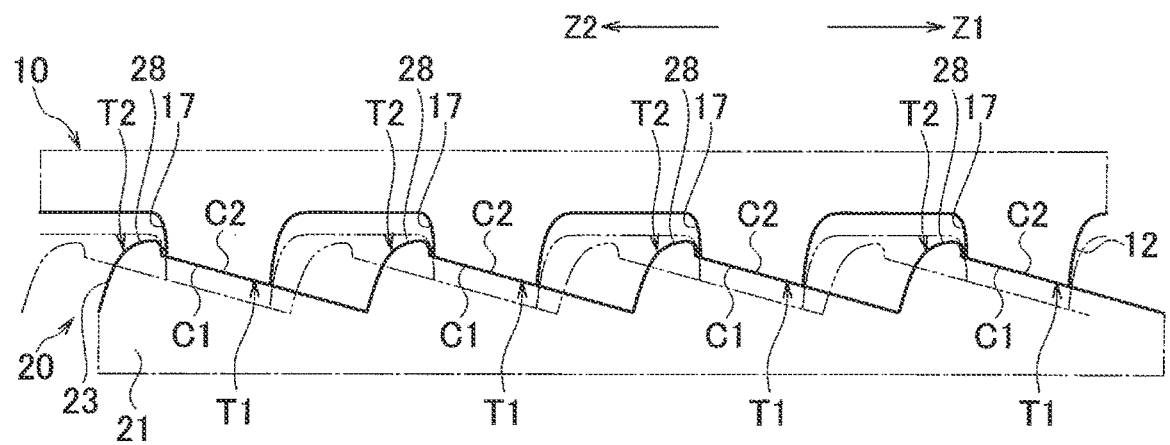
FIG. 12D is a diagram schematically showing an example of a positional relation between the external teeth of the inner collar member and the internal teeth of the outer collar member shown in FIG. 12B.

In the twelfth embodiment, as shown in FIG. 12A to FIG. 12D, protrusions 28 projecting outward in the radial direction are formed at the end portions on the circumferential direction other side of the inner cam surfaces C2. As shown in FIG. 12B and FIG. 12D, dented sections 17 are formed on the outer cam surfaces C1. The dented sections 17 engage with the protrusions 28 when the inner cam surfaces C2 are present in predetermined circumferential direction positions with respect to the outer cam surfaces C1 and limit rotation of the inner collar member 20 to the circumferential direction one side with respect to the outer collar member 10.

According to this embodiment, the inner cam surfaces C2 are prevented from rotating to the circumferential direction one side from the predetermined circumferential direction positions with respect to the outer cam surfaces C1. Therefore, even when excessively large rotation torque (equal to or larger than predetermined torque) is input when the inner collar member 20 is rotated around the hole axis with respect to the outer collar member 10, a pressing force outward in the radial direction applied from the inner cam surfaces C2 to the outer cam surfaces C1 and a press force of the outer circumferential surface 11 of the outer collar member 10 against the hole inner circumferential surface Hs can be reduced to a fixed upper limit value or less. Consequently, it is possible to prevent an excessive force from being input to the hole peripheral part of the FRP member 1 from the metal collar 2. Note that the predetermined circumferential direction position can be obtained by a calculation or an experiment in advance such that the press force of the outer circumferential surface 11 of the outer collar member 10 against the hole inner circumferential surface Hs is kept within a range of an allowable surface pressure of the hole inner circumferential surface Hs.

<Method of Attaching the Metal Collar>

In the assembly process according to this embodiment, when the inner collar member 20 is rotated around the hole axis with respect to the outer collar member 10, as shown in FIG. 12B and FIG. 12D, the inner collar member 20 is rotated until the protrusions 28 engage with the dented sections 17. Explanation of the other processes is omitted because the other processes are the same as the processes of the method of attaching the metal collar 2 according to the tenth embodiment.

With the attaching method explained above, it is possible to control the press force of the outer circumferential surface 11 of the outer collar member 10 against the hole inner circumferential surface Hs to an appropriate value and more surely prevent an excessive force from being input to the hole peripheral part of the FRP member 1 from the metal collar 2.

Note that, instead of or together with the protrusions 28, protrusions projecting inward in the radial direction may be formed at the end portions on the circumferential direction one side of the outer cam surfaces C1. In this case, dented sections that engage with the protrusions when the inner cam surfaces C2 are present in the predetermined circumferential direction positions with respect to the outer cam surfaces C1 and limit rotation of the inner collar member 20 to the circumferential direction one side with respect to the outer collar member 10 are formed on the inner cam surfaces C2. In this case, the same effects as the effects explained above can be obtained.

Thirteenth Embodiment

Figure 13A:
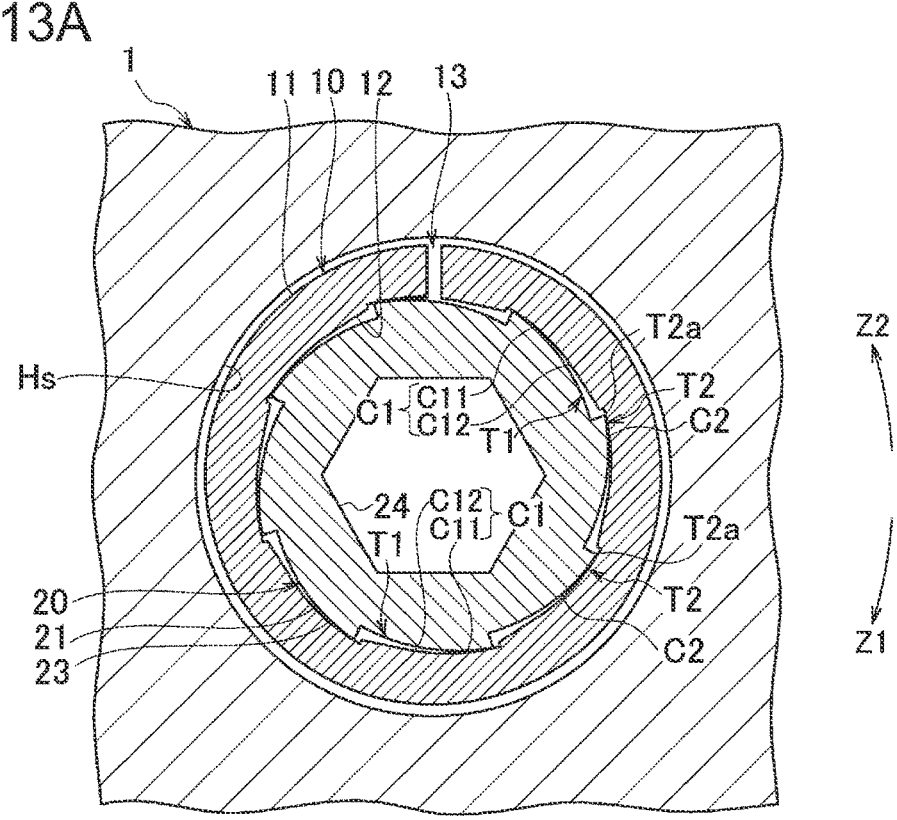
FIG. 13A is a sectional view perpendicular to the center axis of a through-hole for explaining an assembly process for a metal collar according to a thirteenth embodiment and shows a state where the metal collar is fitted into the through-hole.
Figure 13B:
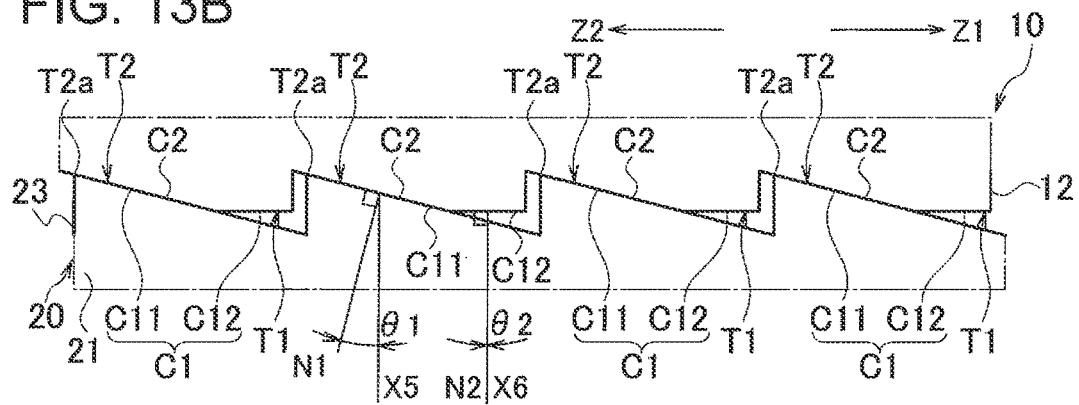
FIG. 13B is a diagram developing, in a circumferential direction, and schematically showing a positional relation between external teeth of an inner collar member and internal teeth of an outer collar member shown in FIG. 13A.

In the thirteenth embodiment, as shown in FIG. 13A and FIG. 13B, the end portions T2a on the radial direction outer side of the external teeth T2 are formed at an acute angle in the cross section perpendicular to the axial direction of the through-hole H. The outer cam surfaces C1 are divided into first cam surfaces C11 and second cam surfaces C12. The second cam surfaces C12 bend from the end portions on the circumferential direction one side of the first cam surfaces C11 and extend to the circumferential direction one side.

As shown in FIG. 13B, an angle $\theta 1$ is larger than an angle $\theta 2$ in the cross section perpendicular to the axial direction of the through-hole H. The angle $\theta 1$ is a smaller angle of angles formed by a normal N1 of the first cam surface C11 at a point on the first cam surface C11 and a straight line X5 connecting the point on the first cam surface C11 and the center of the inner collar member 20. The angle $\theta 2$ is a smaller angle of angles formed by a normal N2 of the second cam surface C12 at a point on the second cam surface C12 and a straight line X6 connecting the point on the second cam surface C12 and the center of the inner collar member 20.

According to this embodiment, since the angle $\theta 1$ is larger than the angle $\theta 2$, when the end portions T2a on the radial direction outer side of the external teeth T2 pass from the first cam surface C11 side to the second cam surface C12 side in boundaries between the first cam surfaces C11 and the second cam surfaces C12, an increase rate per unit rotation angle of rotation torque necessary for rotating the inner collar member 20 to the circumferential direction one side discontinuously decreases. Therefore, an operator or a machine for metal collar attachment (hereinafter, operator or the like) can sense or detect that the end portions T2a of the external teeth T2 pass the boundaries between the first cam surfaces C11 and the second cam surfaces C12 (change from a state shown in FIG. 13B to a state shown in FIG. 13C). Therefore, if the end portions T2a of the external teeth T2 are set to pass the boundaries at a point in time when a press force applied to the hole inner circumferential surface Hs from the outer circumferential surface 11 of the outer collar member 10 reaches an appropriate value and the rotation of the inner collar member 20 by the operator or the like is stopped at the point in time, it is possible to prevent an excessive force from being input to the hole peripheral part of the FRP member 1 from the metal collar 2.

Note that a relation between the internal teeth T1 and the external teeth T2 may be a relation opposite to the relation explained above. Specifically, the end portions T1a (see FIG. 11) on the radial direction inner side of the internal teeth T1 may be formed at an acute angle in the cross section perpendicular to the axial direction of the through-hole H. The inner cam surfaces C2 may be divided into third cam surfaces and fourth cam surfaces that bend from the end portions on the circumferential direction other side of the third cam surfaces and extend to the circumferential direction other side. In the cross section perpendicular to the axial direction of the through-hole H, a smaller angle $\theta 3$ of angles formed by the normal to the third cam surface at a point on the third cam surface and a straight line connecting the point on the third cam surface and the center of the inner collar member 20 may be set larger than a smaller angle $\theta 4$ of angles formed by the normal to the fourth cam surface at a point on the fourth cam surface and a straight line connecting the point on the fourth cam surface and the center of the inner collar member 20. In this case, the same effects as the effects explained above can be obtained.

<Method of Attaching the Metal Collar>

Figure 13C:
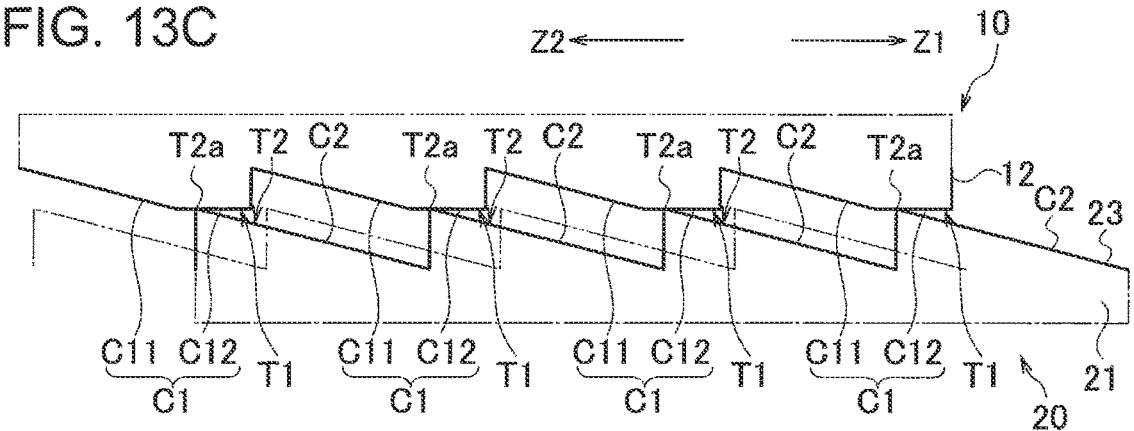
FIG. 13C is a diagram schematically showing an example of a positional relation between the external teeth of the inner collar member and the internal teeth of the outer collar member at the time when the inner collar member is rotated with respect to the outer collar member to deform the outer collar member for diameter expansion with the inner collar member.

In the assembly process according to this embodiment, when the inner collar member 20 is rotated around the hole axis with respect to the outer collar member 10, the inner collar member 20 is rotated until the end portions T2a on the radial direction outer side of the external teeth T2 move beyond the boundaries between the first cam surfaces C11 and the second cam surfaces C12 as shown in FIG. 13C from a state shown in FIG. 13B. In the assembly process according to the modification, when the inner collar member 20 is rotated around the hole axis with respect to the outer collar member 10, the inner collar member 20 is rotated until the end portion T1a on the radial direction inner side of the internal teeth T1 move beyond the boundaries between the third cam surfaces and the fourth cam surfaces. Explanation of the other processes is omitted because the other processes are the same as the processes of the method of attaching the metal collar 2 according to the tenth embodiment.

According to the attaching method explained above, the operator or the like can sense or detect that the end portions T2a of the external teeth T2 pass the boundaries (in the modification, the end portions T1a on the radial direction inner side of the internal teeth T1 pass the boundaries). Therefore, by setting the end portions T2a of the external teeth T2 (in the modification, the end portions T1a of the internal teeth T1) to pass the boundaries at a point in time when a press force applied to the hole inner circumferential surface Hs from the outer circumferential surface 11 of the outer collar member 10 reaches an appropriate value, the operator or the like can sense or detect that the press force reaches the appropriate value.

Fourteenth Embodiment

Figure 14A:
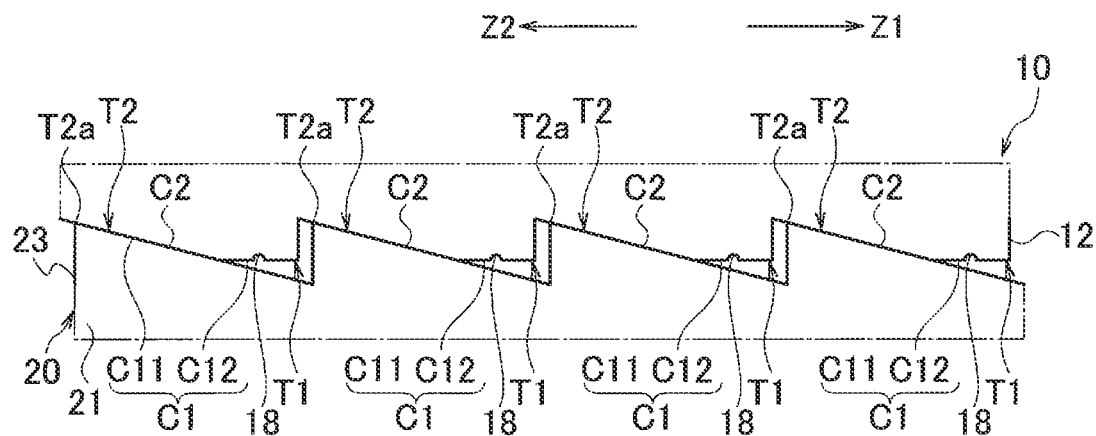
FIG. 14A is a diagram developing, in a circumferential direction, and schematically showing a positional relation between external teeth of an inner collar member and internal teeth of an outer collar member at the time when a metal collar according to a fourteenth embodiment is fitted into a through-hole.
Figure 14B:
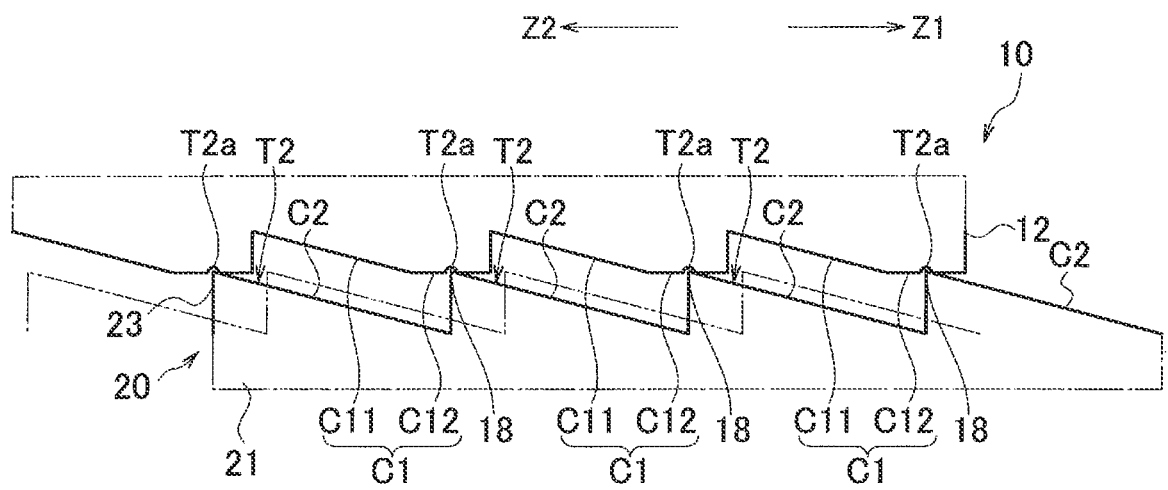
FIG. 14B is a diagram schematically showing an example of a positional relation between the external teeth of the inner collar member and the internal teeth of the outer collar member at the time when the inner collar member is rotated with respect to the outer collar member according to the fourteenth embodiment to deform the outer collar member for diameter expansion with the inner collar member.

In the fourteenth embodiment, as shown in FIG. 14A and 14B, dented sections 18, with which the end portions T2a on the radial direction outer side of the external teeth T2 engage, are formed on the second cam surfaces C12 in the thirteenth embodiment. The angle $\theta 2$ (see FIG. 13B) is 0° or more and 1° or less.

According to this embodiment, the dented sections 18, with which the end portions T2a in the radial direction outer side of the external teeth T2, are formed on the second cam surface C12. When the end portions T2a of the external teeth T2 engage with the dented sections 18, rotation torque necessary for rotating the inner collar member 20 with respect to the outer collar member 10 decreases at an instance when the end portions T2a enter the insides of the dented sections 18. Thereafter (after the end portions T2a engage with the dented sections 18), the rotation torque suddenly increases. Therefore, the operator or the like can sense or detect that the end portions T2a of the external teeth T2 engage with the dented sections 18 (can obtain a sense of click). By stopping the rotation of the inner collar member

20 at this point in time, it is possible to prevent excessive rotation of the inner collar member 20.

Since the end portions T2*a* of the external teeth T2 receive a pressing force outward in the radial direction, the end portions T2*a* engaging with the dented sections 18 are held in that state. Consequently, it is possible to prevent the inner collar member 20 from rotating back to the circumferential other side with respect to the outer collar member 10 (slack of the inner collar member 20).

Further, the angle θ2 is 0° or more and 1° or less. In this case, rotation torque necessary for rotating the inner collar member 20 to the circumferential direction one side around the hole axis with respect to the outer collar member 10 hardly increases after the end portions T2*a* of the external teeth T2 pass the boundaries between the first cam surfaces C11 and the second cam surfaces C12. Therefore, even if the end portions T2*a* climb over the dented sections 18 and the rotation of the inner collar member 20 to the circumferential direction one side is continued, it is possible to prevent an excessive force from being input to the hole peripheral part of the FRP member 1 from the metal collar 2.

<Method of Attaching the Metal Collar>

In the assembly process according to this embodiment, when the inner collar member 20 is rotated around the hole axis with respect to the outer collar member 10, the inner collar member 20 is rotated until the end portions T2*a* on the radial direction outer side of the external teeth T2 engage with the dented sections 18 as shown in FIG. 14B from a state shown in FIG. 14A. Explanation of the other processes is omitted because the other processes are the same as the processes of the method of attaching the metal collar 2 according to the tenth embodiment.

With the attaching method explained above, the operator or the like can sense or detect that the end portions T2*a* of the external teeth T2 engage with the dented sections 18 (can obtain a sense of click). By stopping the rotation of the inner collar member 20 at this point in time, it is possible to prevent excessive rotation of the inner collar member 20.

Note that a relation between the internal teeth T1 and the external teeth T2 may be a relation opposite to the relation explained above. Specifically, dented sections, with which the end portions T1 *a* on the radial direction inner side of the internal teeth T1 engage, may be formed on the fourth cam surfaces according to the modification of the thirteenth embodiment. The angle θ4 may be set to 0° or more and 1° or less. The same effects as the effects explained above can be obtained. Note that the attaching member for the metal collar 2 according to this modification is the same as the attaching method according to the fourteenth embodiment except that the inner collar member 20 is rotated until the end portions T1*a* of the internal teeth T1 engage with the dented sections when the inner collar member 20 is rotated around the hole axis with respect to the outer collar member 10.

Fifteenth Embodiment

Figure 15A:
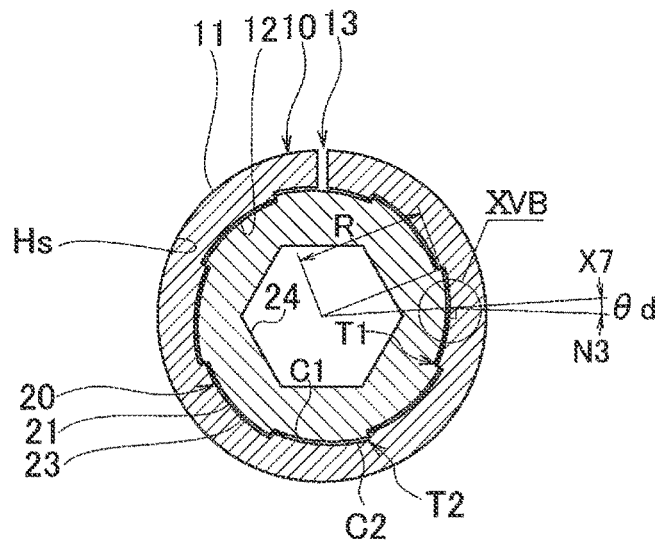
FIG. 15A is a main part sectional view of a metal collar according to a fifteenth embodiment and shows a state where an inner collar member is inserted into an outer collar member.
Figure 15B:
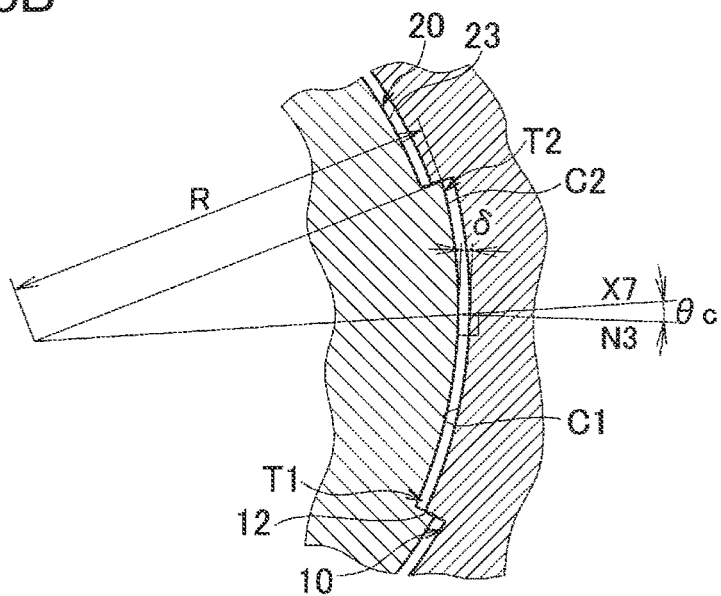
FIG. 15B is an enlarged diagram of a part XBV in FIG. 15A.

In the fifteenth embodiment, as shown in FIG. 15A and FIG. 15B, in a state where the circumferential direction one side end portion of the inner cam surface C2 and the circumferential direction one side end portion of the outer cam surface C1 are opposed in the radial direction and the circumferential direction other side end portion of the inner cam surface C2 and the circumferential direction other side end portion of the outer cam surface C1 are opposed in the radial direction, the size of a minimum gap δ formed between the inner cam surface C2 and the outer cam surface C1 opposed to each other in the radial direction satisfies the following expression.

$$\pi R/45 \times \sin \theta c \leq \text{Avg.}\delta \leq \pi R/30 \times \sin \theta c$$

where Avg.δ is an average of minimum gaps δ, R is a radial direction distance from the circumferential direction other side end portion of the inner cam surface C2 to the center of the inner collar member 20 in the cross section perpendicular to the axial direction of the through-hole H, and θc is a smaller angle of angles formed by a normal N3 of the inner cam surface C2 at a point on the inner cam surface C2 and a straight line X7 connecting the point on the inner cam surface C2 and the center of the inner collar member 20.

Note that the minimum gap δ is a gap of a narrowest region among gaps formed between a pair of the inner cam surface C2 and the outer cam surface C1 opposed in the radial direction. The average of minimum gaps δ is an average of the minimum gaps δ formed on all the inner cam surfaces C2. For example, the average of minimum gaps δ can be calculated as an average of the minimum gaps δ measured on several inner cam surfaces C2 among the inner cam surfaces C2 equally disposed in the circumferential direction.

Figure 15C:
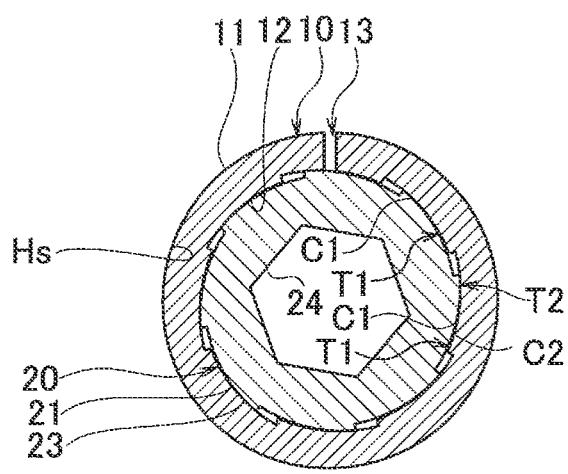
FIG. 15C is a sectional view perpendicular to the center axis of a through-hole for explaining an assembly process for the metal collar according to the fifteenth embodiment and shows a state where the metal collar is fitted into the through-hole.

According to this embodiment, when the inner collar member 20 is present, with respect to the outer collar member 10, in an angle position where the circumferential direction one side end portion of the inner cam surface C2 and the circumferential direction one side end portion of the outer cam surface C1 are opposed in the radial direction and the circumferential direction other side end portion of the inner cam surface C2 and the circumferential direction other side end portion of the outer cam surface C1 are opposed in the radial direction, a gap having at least the size of the minimum gap δ is formed between the inner cam surface C2 and the outer cam surface C1. Therefore, when the inner collar member 20 is inserted into the outer collar member 10, the outer collar member 10 can be easily inserted without deforming the outer collar member 10 for diameter expansion. Efficiency of assembly work of the metal collar 2 is improved. After the insertion, as shown in FIG. 15C, the inner cam surface C2 can be brought into contact with the outer cam surface C1 by rotating the inner collar member 20 by approximately 8° to 12° to the circumferential direction one side around the hole axis with respect to the outer collar member 10. The outer collar member 10 can be elastically deformed for diameter expansion by further rotating the inner collar member 20 by a slight angle. In this state, the outer collar member 10 can be held (provisionally fixed) on the outer circumferential surface 23 of the inner collar member 20 by a restoration force of the outer collar member 10. Therefore, it is easy to handle the metal collar 2 during the assembly work. A contact pressure between the outer cam surface C1 and the inner cam surface C2 at this point can be controlled to a necessary minimum. Therefore, even when the microcapsule M containing the adhesive is applied to the cam surfaces C1 and C2, it is possible to prevent the microcapsule M from being broken in a process (conveyance of the metal collar 2, insertion into the through-hole H, or the like) before the diameter expansion and deformation of the outer collar member 10 in the assembly process.

Note that the rotating direction (the circumferential direction one side (the Z1 direction)) of the inner collar member 20 in applying the pressing force outward in the radial direction to the outer cam surface C1 from the inner cam surface C2 in the tenth to fifteenth embodiments and the rotating direction (the circumferential direction one side (the Z1 direction)) of the inner collar member 20 in applying the pressing force outward in the radial direction to the inner circumferential surface 12 of the outer collar member 10 from the convex surface 25 of the inner collar member 20 in the third to ninth embodiments are the same as the direction of the tightening torque input to the inner collar member 20 in fastening the fastener F. Therefore, even when the tightening torque is input to the inner collar member 20, a force in a compressing direction acts on a bonding surface of the convex surface 25 and the inner circumferential surface 12 of the outer collar member 10 and a bonding surface of the inner cam surface C2 and the outer cam surface C1. Therefore, the metal collar 2 less easily slacks.

Sixteenth Embodiment

A fastening part structure according to a sixteenth embodiment is explained with reference to FIG. 16A to FIG. 16E. Note that elements having the same functions as the elements already explained above are denoted by the same reference numerals and signs and explanation of the elements is omitted.

Figure 16A:
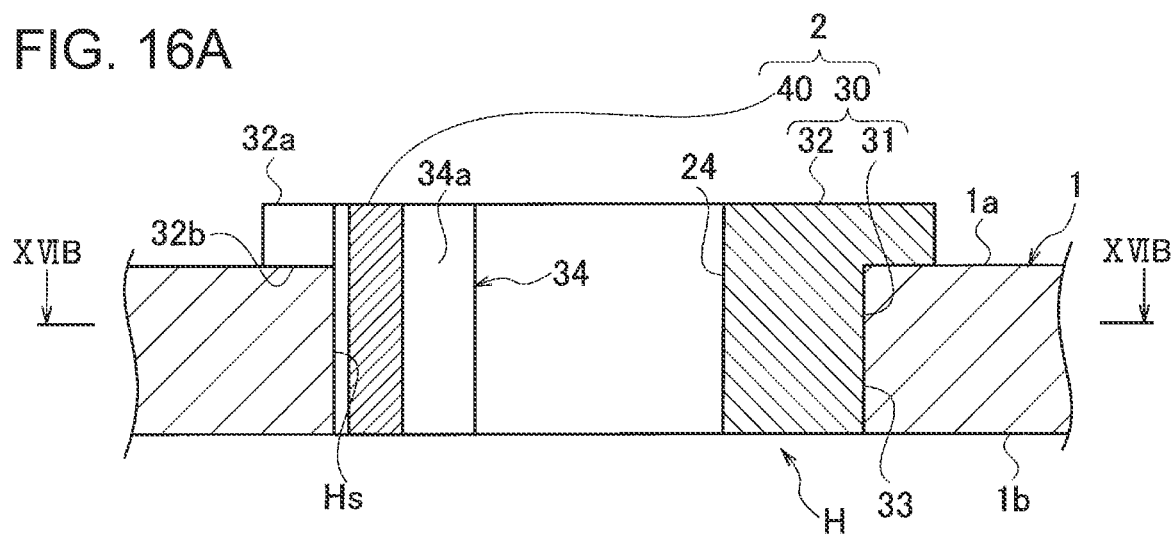
FIG. 16A is a sectional view along the center axis of a through-hole of a fastening part structure according to a sixteenth embodiment.
Figure 16B:
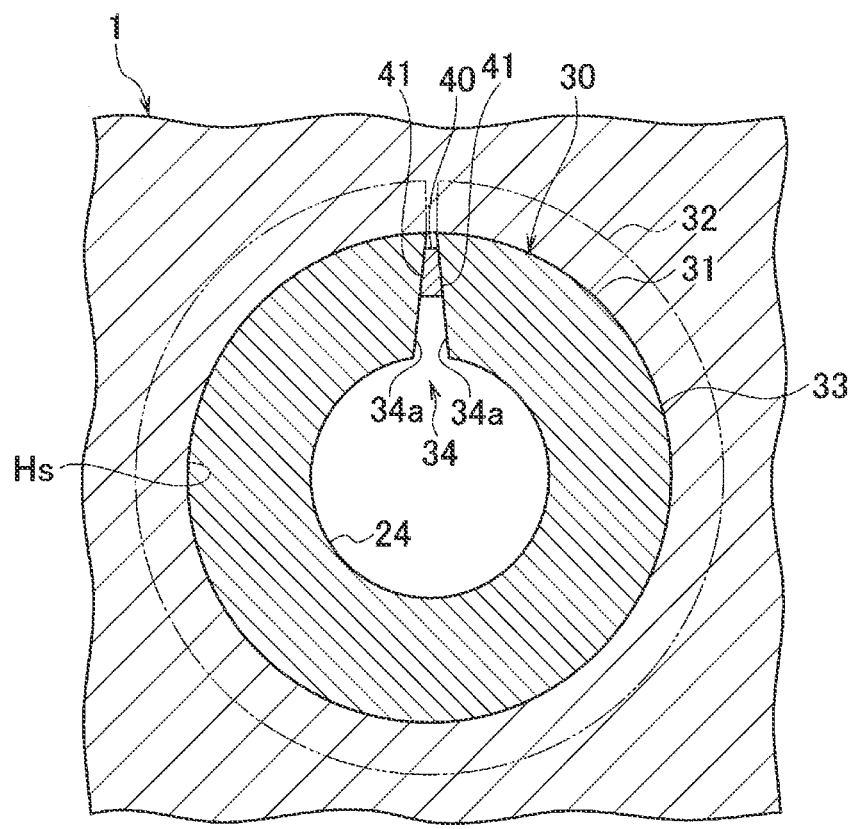
FIG. 16B is a sectional view along a line XVIB-XVIB in FIG. 16A.
Figure 16C:
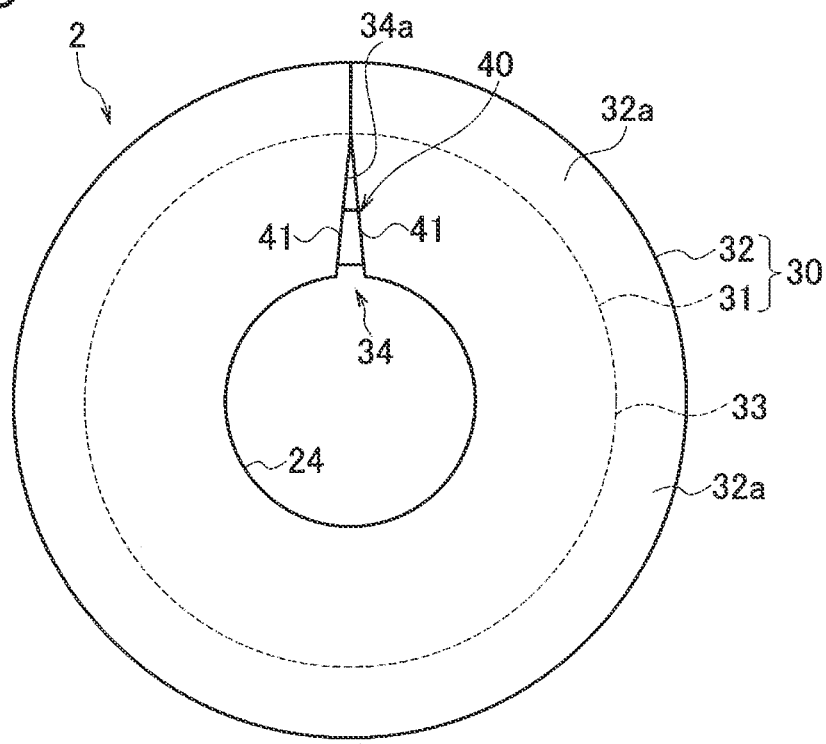
FIG. 16C is a plan view of a metal collar according to the sixteenth embodiment.
Figure 16D:
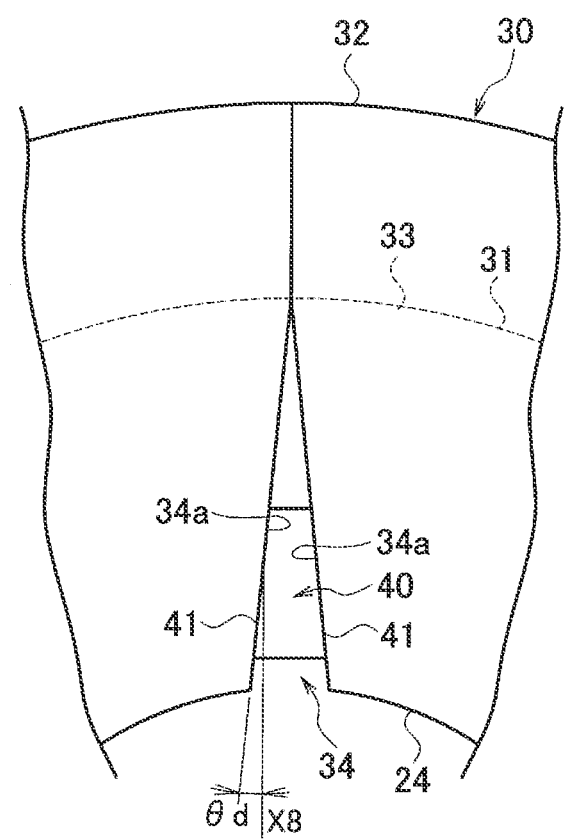
FIG. 16D is an enlarged plan view of a slit of the metal collar according to the sixteenth embodiment.

As shown in FIG. 16A and 16B, in the fastening part structure according to the sixteenth embodiment, the metal collar 2 is attached in the through-hole H formed in the FRP member 1. The metal collar 2 includes a collar member 30 and a wedge member 40 as shown in FIG. 16C and FIG. 16D.

The collar member 30 is made of metal such as steel and includes a tubular main body section 31 and a tabular flange section 32. The flange section 32 extends outward in the radial direction from the upper end portion of the main body section 31. An outer circumferential surface 33 of the main body section 31 is in contact with the hole inner circumferential surface Hs of the through-hole H.

The insertion hole 24 for inserting the fastener F such as a bolt is opened on a side surface (a front surface) 32a on the upper side of the flange section 32. A side surface (rear surface) 32b on the lower side (the FRP member 1 side) of the flange section 32 and a front surface 1a on the upper side (the flange section 32 side) of the FRP member 1 are opposed to and in contact with each other in the axial direction of the through-hole H.

In the collar member 30, a slit 34 is formed in a part in the circumferential direction of the outer circumferential surface 33 of the collar member 30. The collar member 30 assumes a C shape in plan view and is elastically deformable in the radial direction (the diameter expanding and reducing direction) of the through-hole H. The slit 34 communicates from the front surface 32a, which is one end face, to the lower side surface, which is the other end face, in the axial direction of the collar member 30.

The wedge member 40 is a columnar member made of metal such as steel and having the same degree of length as the axial direction length of the main body section 31 of the collar member 30. The wedge member 40 is driven into the slit 34 of the collar member 30. A side surface 41 (a pressing surface) of the wedge member 40 applies a pressing force to inner surfaces 34a of the slit 34 in a direction in which the inner surfaces 34a separate in the circumferential direction. The collar member 30 is deformed in the diameter expanding direction and the outer circumferential surface 33 of the collar member 30 is pressed against the hole inner circumferential surface Hs by the pressing force. The wedge member 40 receives reaction of the pressing force from the inner surfaces 34a of the slit 34 and is held in the collar member 30 by the reaction.

As shown in FIG. 16D, in the cross section perpendicular to the axial direction of the through-hole H, an angle θd formed by a surface region, with which the wedge member 40 is in contact, in the inner surface 34a of the slit 34 and a straight line X8 connecting a point on the surface region and the center of the collar member 30 satisfies the following expression:

$$\tan \theta d \leq \mu$$

where μ is a coefficient of static friction between the side surface 34a of the slit 34 and the wedge member 40.

The side surfaces 41 of the wedge member 40 and the inner surfaces 34a of the slit 34 are bonded by an adhesive. The outer circumferential surface 33 of the main body section 31 of the collar member 30 and the hole inner circumferential surface Hs are bonded by the adhesive.

Action effects of this embodiment are explained below.

In this embodiment, the wedge member 40 applies a pressing force to the inner surfaces 34a of the slit 34 in the direction in which the inner surfaces 34a separate from each other in the circumferential direction. The collar member 30 is deformed in the diameter expanding direction and the outer circumferential surface 33 of the collar member 30 is pressed against the hole inner circumferential surface Hs by the pressing force. Therefore, a layer thickness of the adhesive disposed in the gap between the outer circumferential surface 33 and the hole inner circumferential surface Hs can be set smaller than when the pressing force does not act. The wedge member 40 is held in the collar member 30 by reaction of the pressing force received from the inner surfaces 34a of the slit 34. That is, the shape of the collar member 30 is restrained by the hole inner circumferential surface Hs and the wedge member 40. Therefore, a higher pressing force can be more stably obtained than when the pressing force is obtained only from the elastic force of the collar member 30. Therefore, with the fastening part structure according to this embodiment, it is possible to suppress influence (for example, a change with time of the positional relation between the through-hole H and the metal collar 2) due to creep deformation of the adhesive.

In this embodiment, in the collar member 30, the slit 34 is formed in a part in the circumferential direction of the outer circumferential surface 33. The collar member 30 is deformable in the radial direction of the through-hole H. Therefore, when the collar member 30 is attached in the through-hole H, the collar member 30 can be fitted while being deformed for diameter reduction. Consequently, it is possible to prevent a high frictional force from acting on the hole inner circumferential surface Hs from the collar member 30. The collar member 30 attached in the through-hole H is disposed such that the outer circumferential surface 33 of the collar member 30 is in contact with the hole inner circumferential surface Hs. Therefore, when the wedge member 40 is driven into the collar member 30, the hole inner circumferential surface Hs can be protected by the collar member 30. Therefore, with the fastening part structure according to this embodiment, it is possible to prevent damage to the reinforced fiber in the hole peripheral part that may occur in the process of attaching the metal collar 2.

In this embodiment, in the cross section perpendicular to the axial direction of the through-hole H, the angle θd formed by the surface region, with which the wedge member 40 is in contact, in the inner surface 34a of the slit 34 and the straight line X8 connecting the point on the surface region and the center of the collar member 30 satisfies the following expression:

$$\tan \theta d \leq \mu$$

where μ is a coefficient of static friction between the side surface 34a of the slit 34 and the wedge member 40.

Therefore, even if an external force in the circumferential direction of the collar member 30 acts on the wedge member 40, a frictional force between the wedge member 40 and the inner surfaces 34a of the slit 34 is larger than a component of the external force parallel to the inner surfaces 34a of the slit 34. Therefore, it is possible to prevent a slip of the wedge member 40 with respect to the inner surface 34a of the slit 34 and prevent slack of the collar member 30 and the wedge member 40 (the metal collar 2).

<Method of Attaching the Metal Collar>

A method of attaching the metal collar 2 in this embodiment is explained with reference to FIG. 16A, FIG. 16B, and FIG. 16E.

(1) Adhesive Application Process

Prior to an assembly process explained below, the microcapsules M are applied to at least one of the side surface 41 of the wedge member 40 and the inner surfaces 34a of the slit 34 and the outer circumferential surface 33 of the main body section 31 of the collar member 30 in advance and dried. The microcapsules M are broken when the pressing force or a press force at the time when the outer circumferential surface 33 of the main body section 31 is pressed against the hole inner circumferential surface Hs acts on the microcapsules M and discharges an adhesive encapsulated inside the microcapsules M.

(2) Assembly Process

Figure 16E:
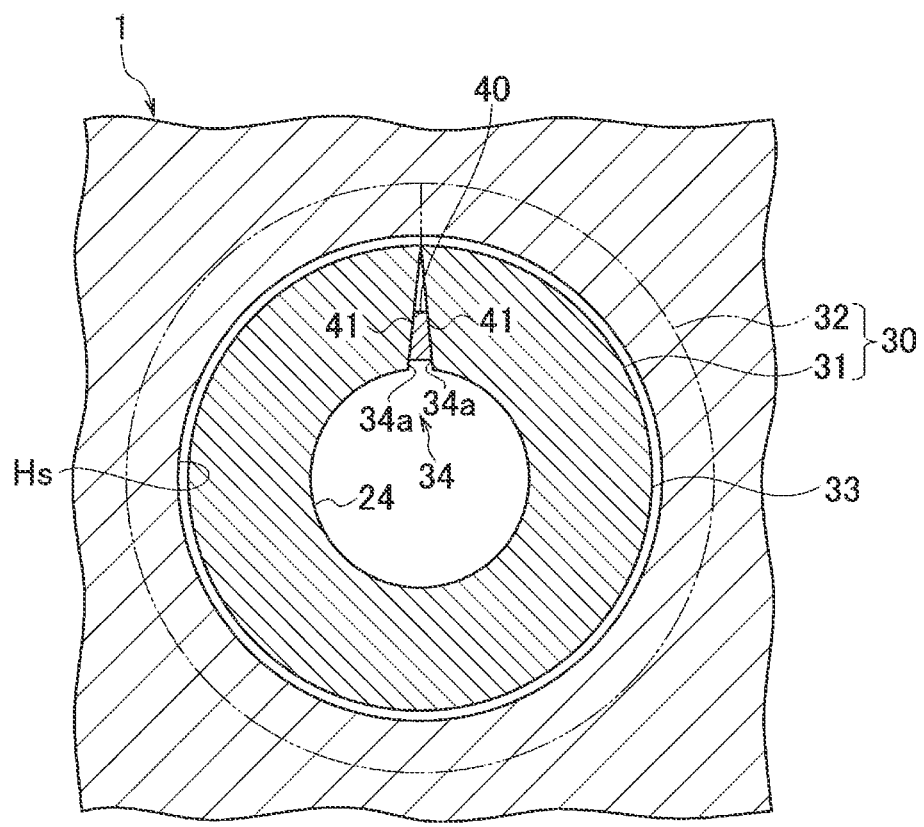
FIG. 16E is a sectional view perpendicular to the center axis of the through-hole for explaining an assembly process for the metal collar according to the sixteenth embodiment and shows a state where the metal collar is fitted into the through-hole.

In an assembly process, first, as shown in FIG. 16E, the collar member 30 is fitted into the hole inner circumferential surface Hs of the through-hole H of the FRP member 1.

Subsequently, the wedge member 40 is driven into the slit 34 using a driving jig as shown in FIG. 16A and FIG. 16B. Consequently, the side surfaces 41 (a pressing surface) of the wedge member 40 are brought into contact with the inner surfaces 34a of the slit 34 to apply, from the side surfaces 41 to the inner surfaces 34a, a pressing force in a direction in which the inner surfaces 34a of the slit 34 separate from each other in the circumferential direction. The collar member 30 is deformed in the radial direction and the outer circumferential surface 33 of the collar member 30 is pressed against the hole inner circumferential surface Hs by the pressing force. The wedge member 40 is held in the collar member 30 by reaction of the pressing force.

The microcapsules M applied to at least one of the side surface 41 and the inner surfaces 34a are broken by the pressing force to discharge the adhesive encapsulated inside the microcapsules M. The microcapsules M applied to the outer circumferential surface 33 of the collar member 30 are broken by the pressing force to discharge the adhesive encapsulated inside the microcapsules M. Thereafter, the discharged adhesive is hardened.

With this attaching method, it is possible to efficiently obtain the fastening part structure (in a simple process with high productivity).

With the assembly process, the microcapsules M are applied to at least one of the side surface 41 of the wedge member 40 and the inner surfaces 34a of the slit 34 and the outer circumferential surface 33 of the main body section 31 of the collar member 30 in advance. Therefore, it is possible to omit application of the adhesive in the assembly process and productivity is improved. Since the microcapsules M discharge the adhesive with the action of the pressing force, the adhesive can be more surely spread to a point where the pressing force acts. Therefore, it is possible to improve bonding strength of the wedge member 40 and the collar member 30. It is possible to improve strength and rigidity of the metal collar 2 against tightening torque input from the fastener F.

On the outer circumferential surface 33 of the main body section 31, since the microcapsules M discharge the adhesive with the action of the press force on the hole inner circumferential surface Hs, the adhesive can also be more surely spread to a point where the press force acts. Therefore, it is possible to improve bonding strength of the FRP member 1 and the collar member 30. It is possible to further improve the strength and the rigidity of the metal collar 2 against the tightening torque input from the fastener F.

As the adhesive used in this embodiment, a foamable adhesive is suitable. The foamable adhesive foams when being discharged from the microcapsules M and spreads to a wider range than a spreading range of a non-foamable adhesive. Therefore, a gap of the slit 34, a gap between the wedge member 40 and the collar member 30, a gap between the collar member 30 and the hole inner circumferential surface Hs, and a gap between the rear surface of the flange section 32 and the surface 1a on the upper side of the FRP member 1 are filled with the adhesive at a higher filling rate. Consequently, it is possible to exert high waterproofness against intrusion of water and the like into the gaps.

Note that attaching methods for a metal collar in seventeenth, nineteenth, twentieth, and twenty-second to twenty-fourth embodiments explained below are the same as the method of attaching the metal collar in the sixteenth embodiment. Therefore, explanation of the method of attaching the metal collar is omitted concerning the seventeenth, nineteenth, twentieth, and twenty-second to twenty-fourth embodiments.

Seventeenth to Twenty-fourth Embodiment

Fastening part structures according to the seventeenth to twenty-fourth embodiments are explained with reference to FIG. 17A to FIG. 24B.

Note that the fastening part structures according to the seventeenth to twenty-fourth embodiments include the same configuration as the configuration in the sixteenth embodiment. That is, in the seventeenth to twenty-fourth embodiments as well, the wedge member 40 applies a pressing force to the inner surfaces 34a of the slit 34 in a direction in which the inner surfaces 34a separate from each other in the circumferential direction. The wedge member 40 is held in the collar member 30 by reaction of the pressing force received from the inner surfaces 34a of the slit 34. Further, in the collar member 30, the slit 34 is formed in a part in the circumferential direction of the outer circumferential surface 33. The collar member 30 is configured to be deformable in the radial direction of the through-hole H. The outer circumferential surface 33 of the collar member 30 attached in the through-hole H is in contact with the hole inner circumferential surface Hs of the through hole H. Therefore, in the fastening part structures according to the seventeenth to twenty-fourth embodiments, as in the sixteenth embodiment, it is possible to prevent damage to the reinforced fiber of the hole peripheral part, which may occur in the process of attaching the metal collar 2, while suppressing influence due to creep deformation of the adhesive.

Although detailed explanation is omitted, in an assembly process in the seventeenth to twenty-fourth embodiments, as in the sixteenth embodiment, the microcapsules M are applied to at least one of the side surface 41 of the wedge member 40 and the inner surfaces 34a of the slit 34 and the outer circumferential surface 33 of the main body section 31 of the collar member 30 in advance. Therefore, as in the sixteenth embodiment, it is possible to improve productivity in the assembly process for the metal collar. It is possible to improve the strength and the rigidity of the metal collar 2 against the tightening torque input from the fastener F. As in the sixteenth embodiment, a foamable adhesive is suitable as an adhesive in use.

In the following explanation concerning the seventeenth to twenty-fourth embodiments, only components different from components in preceding embodiments and modifications of the embodiments are explained. Elements having the same functions as functions of elements already explained in the preceding embodiments and the like are denoted by the same reference numerals and signs and explanation of the elements is omitted.

Seventeenth Embodiment

Figure 17A:
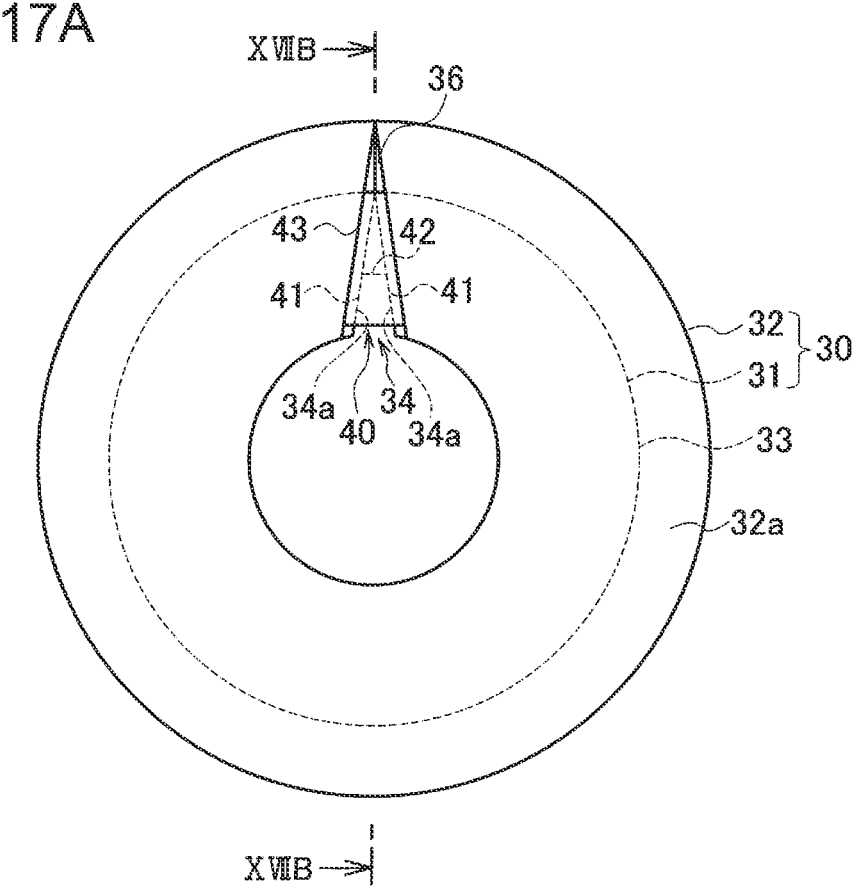
FIG. 17A is a plan view of a metal collar according to a seventeenth embodiment.
Figure 17B:
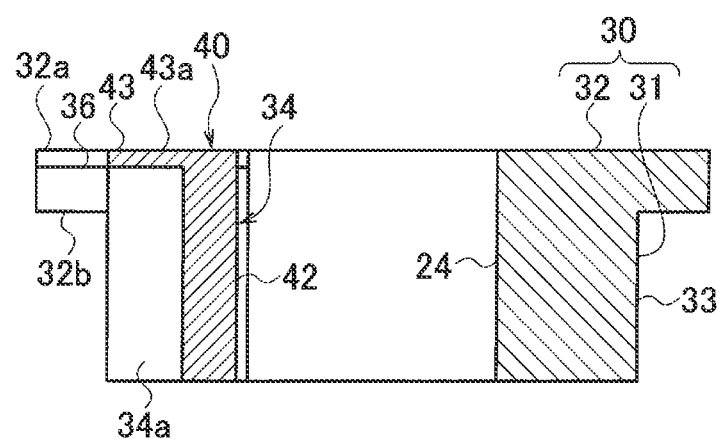
FIG. 17B is a sectional view along a line XVIIB-XVIIB in FIG. 17A.

In the seventeenth embodiment, as shown in FIG. 17A and FIG. 17b, the wedge member 40 includes a columnar wedge section 42 having a trapezoidal cross section and a tabular brim section 43 projecting from side surfaces of the wedge section 42 at an end portion of the wedge section 42. The wedge section 42 is driven into the slit 34. In a state where the wedge section 42 is driven into the slit 34, the brim section 43 extends along the flange section 32 of the collar member 30 and covers an end portion of the slit 34 opened in the flange section 32.

According to this embodiment, in the state where the wedge section 42 is driven into the slit 34, the brim section 43 projecting from the side surfaces of the wedge section 42 extends along the flange section 32. Therefore, movement in the axial direction of the through-hole H of the wedge member 40 with respect to the collar member 30 is hindered by interference between the brim section 43 and the flange section 32. Consequently, it is possible to prevent the wedge-member 40 from coming off.

The brim section 43 covers the end portion of the slit 34 opened in the flange section 32. Therefore, it is possible to prevent intrusion of foreign matters into the silt 34.

Eighteenth Embodiment

Figure 18:
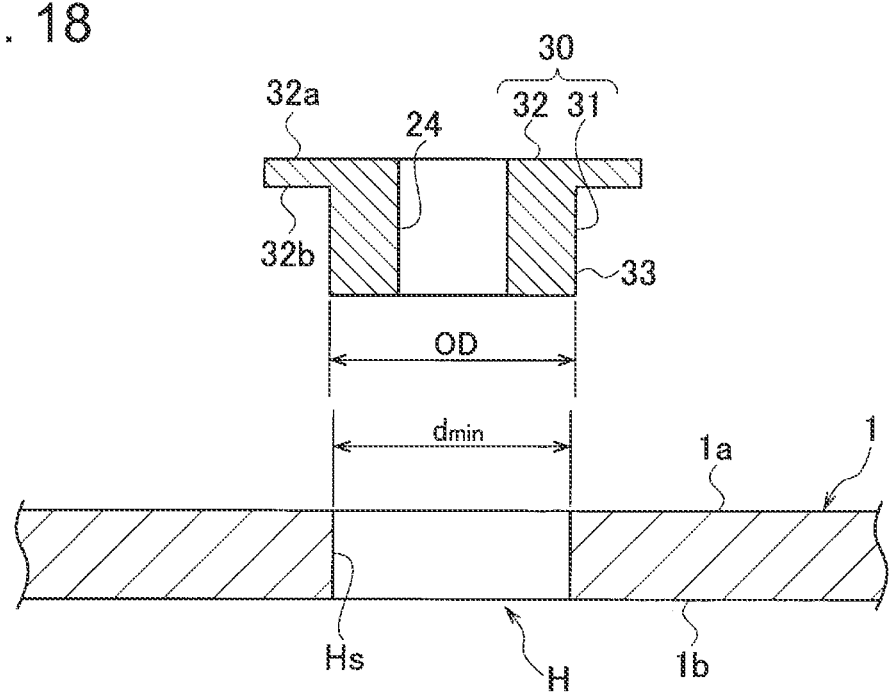
FIG. 18 is an explanatory diagram of an assembly process for a metal collar according to an eighteenth embodiment.

In the eighteenth embodiment, as shown in FIG. 18, in a state where the collar member 30 is deformed for diameter reduction such that the inner surfaces 34a of the slit 34 come into contact with each other, the outer circumferential surface 33 of the collar member 30 has a radial direction dimension OD smaller than a minimum value dmin of a tolerance of a radial direction dimension of the hole inner circumferential surface Hs. In a natural state of the collar member 30, the outer circumferential surface 33 of the collar member 30 has the radial direction dimension OD larger than a maximum value of the tolerance of the radial direction dimension of the hole inner circumferential surface Hs.

According to this embodiment, even when the radial direction dimension of the hole inner circumferential surface Hs is the minimum value dmin of the tolerance, the radial direction dimension OD of the outer circumferential surface 33 of the collar member 30 can be set smaller than the radial direction dimension of the hole inner circumferential surface Hs by applying an external force to the collar member 30 and deforming the collar member 30 for diameter reduction. Consequently, when the collar member 30 is fitted into the hole inner circumferential surface Hs, it is possible to more surely prevent a high frictional force from acting on the hole inner circumferential surface Hs from the collar member 30.

Even when the tolerance of the radial direction dimension of the hole inner circumferential surface Hs is the maximum value, the outer circumferential surface 33 of the collar member 30 can be brought into contact with the hole inner circumferential surface Hs by, after fitting the collar member 30 into the hole inner circumferential surface Hs, removing the external force applied to the collar member 30 and elastically restoring the collar member 30 in the diameter expanding direction inside the through-hole H. Consequently, before driving the wedge member 40 into the slit 34, it is possible to press the outer circumferential surface 33 of the collar member 30 against the hole inner circumferential surface Hs with a restoration force of the collar member 30 and provisionally fix the collar member 30 to the FRP member 1. By setting, in advance, the outer circumferential surface 33 in a state where the outer circumferential surface 33 is pressed against the hole inner circumferential surface Hs, it is possible to reduce a deformation amount of the collar member 30 due to the driving of the wedge member 40 and set the angle θd small.

<Method of Attaching the Metal Collar>

In the assembly process according to this embodiment, when the collar member 30 is fitted into the hole inner circumferential surface Hs of the through-hole H of the FRP member 1, the collar member 30 is fitted in a state where an external force is applied to the collar member 30 to deform the collar member 30 for diameter reduction and set the radial direction dimension OD of the outer circumferential surface 33 of the collar member 30 smaller than the radial direction dimension of the hole inner circumferential surface Hs.

Before the wedge member 40 is driven into the slit 34, the external force applied to the collar member 30 is removed to elastically restore the collar member 30 in the diameter expanding direction inside the through-hole H.

Thereafter, the wedge member 40 is driven into the slit 34. The inner surfaces 34a of the slit 34 are brought into contact with the side surfaces 41 (the pressing surfaces) of the wedge member 40 to apply, from the side surfaces 41 to the inner surfaces 34a, a pressing force in a direction in which the inner surfaces 34a of the slit 34 of the wedge member 40 separate from each other in the circumferential direction. Explanation of the other processes is omitted because the other processes are the same as the processes of the method of attaching the metal collar 2 according to the sixteenth embodiment.

Note that, when the shapes of the hole inner circumferential surface Hs and the outer circumferential surface 33 of the collar member 30 in the cross section perpendicular to the axial direction of the through-hole H are non-circular shapes (for example, elliptical shapes or rounded polygonal shapes), the same configuration as the configuration in the embodiment can be adopted. In this case, in a state where the collar member 30 is deformed for diameter reduction such that the inner surfaces 34a of the slit 34 come into contact with each other, the outer circumferential surface 33 of the collar member 30 has a radial direction dimension smaller than the minimum value of the tolerance of the radial direction dimension of the hole inner circumferential surface Hs. In a natural state of the collar member 30, the outer circumferential surface 33 of the collar member 30 has a radial direction dimension larger than the maximum value of the tolerance of the radial direction dimension of the hole inner circumferential surface Hs.

Nineteenth Embodiment

Figure 19:
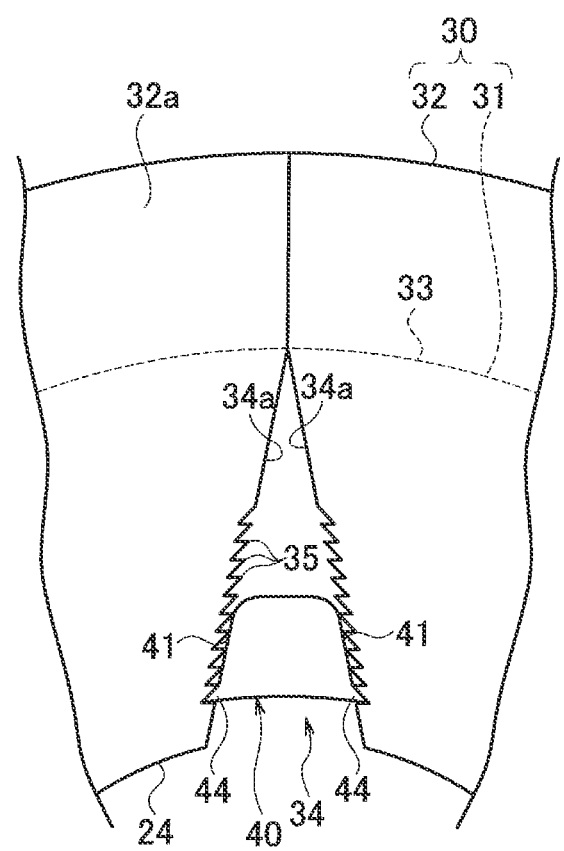
FIG. 19 is a main part enlarged view of a metal collar according to a nineteenth embodiment.

In the nineteenth embodiment, as shown in FIG. 19, latchet teeth 35 are formed side by side along a driving direction of the wedge member 40 on the inner surfaces 34a of the slit 34. Locking claws 44 engageable with the latchet teeth 35 are formed on the side surfaces 41 of the wedge member 40. The tips of the locking claws 44 have a tapered shape. When the locking claws 44 engage with the latchet teeth 35, the tips of the locking claws 44 are elastically deformed along the shape of the latchet teeth 35.

According to this embodiment, it is possible to prevent slack of the wedge member 40 driven into the slit 34 (a slip of the wedge member 40 with respect to the inner surfaces 34a of the slit 34). Since the tips of the locking claws 44 have the tapered shape and the locking claws 44 are elastically deformed along the shape of the latchet teeth 35 when the locking claws 44 engage with the latchet teeth 35, adhesion of the locking claws 44 and the latchet teeth 35 is improved. Consequently, it is possible to more surely prevent intrusion of water and the like from between the inner surfaces 34a of the slit 34 and the wedge member 40.

Twentieth Embodiment

Figure 20A:
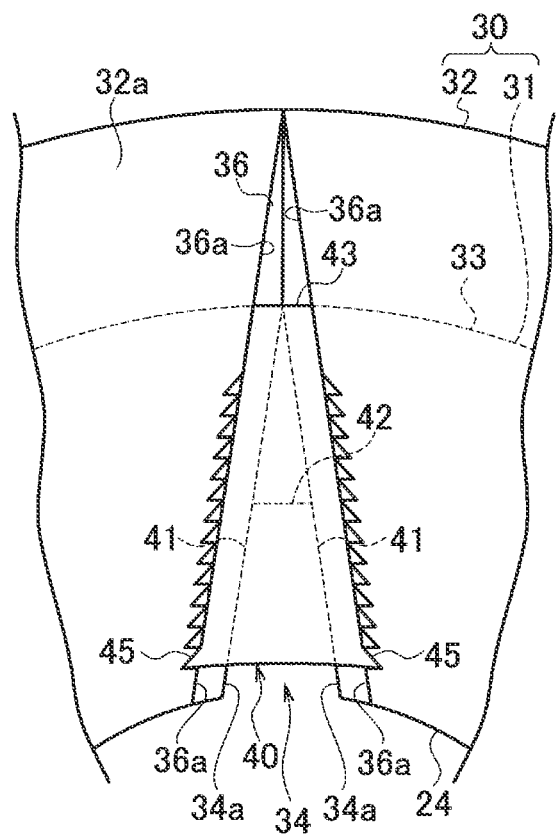
FIG. 20A is a main part enlarged view of a metal collar according to a twentieth embodiment.
Figure 20B:
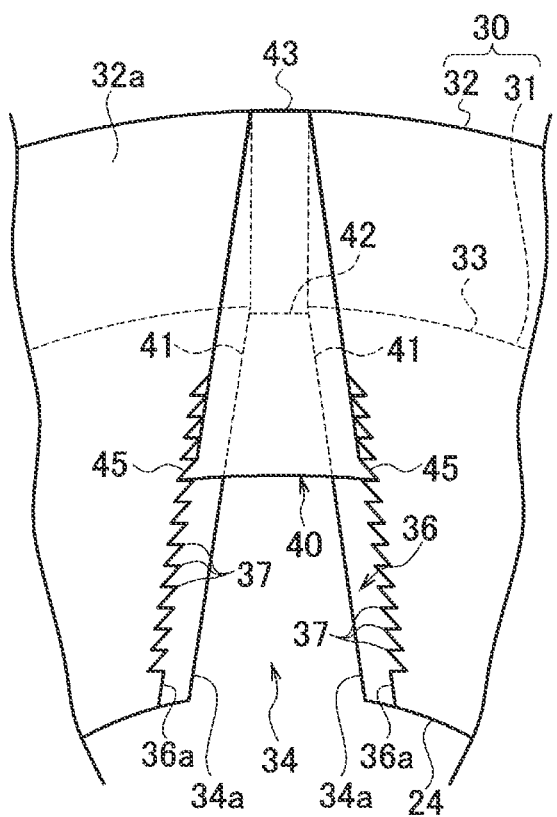
FIG. 20B is a diagram schematically showing an example of a positional relation between a slit of a collar member and a wedge member at the time when the wedge member is driven into the slit of the collar member according to the twentieth embodiment to deform the outer collar member for diameter expansion with the wedge member.

In the twentieth embodiment, as shown in FIG. 20A and FIG. 20B, a dented section 36 is formed on the surface 32a of the flange section 32. In a state where the wedge 42 is driven into the slit 34, the dented section 36 houses the brim section 43. Latchet teeth 37 are formed side by side along a driving direction of the wedge member 40 on side surfaces 36a of the dented section 36. Locking claws 45 engageable with the latchet teeth 37 are formed on surfaces of the brim section 43 opposed to the side surfaces 36a of the dented section 36. The tips of the locking claws 45 have a tapered shape. The tips of the locking claws 45 are elastically deformed along the shape of the latchet teeth 37 when the locking claws 45 engage with the latchet teeth 37.

According to this embodiment, since the locking claws 45 of the brim section 43 lock to the latchet teeth 37, the side surfaces 36a of the dented section 36 and the surfaces in the brim section 43 opposed to the side surfaces 36a of the dented section 36 adhere. Gaps between the side surfaces 36a and the surfaces can be closed. Consequently, it is possible to prevent intrusion of water and the like from the gaps. The tips of the locking claws 45 have the tapered shape. The tips of the locking claws 45 are elastically deformed along the shape of the latchet teeth 37 when the locking claws 45 engage with the latchet teeth 37. Therefore, adhesion of the side surfaces 36a of the dented section 36 and the surfaces in the brim section 43 opposed to the side surfaces 36a of the dented section 36 is improved. Intrusion of waters and the like is more surely prevented.

Twenty-First Embodiment

Figure 21A:
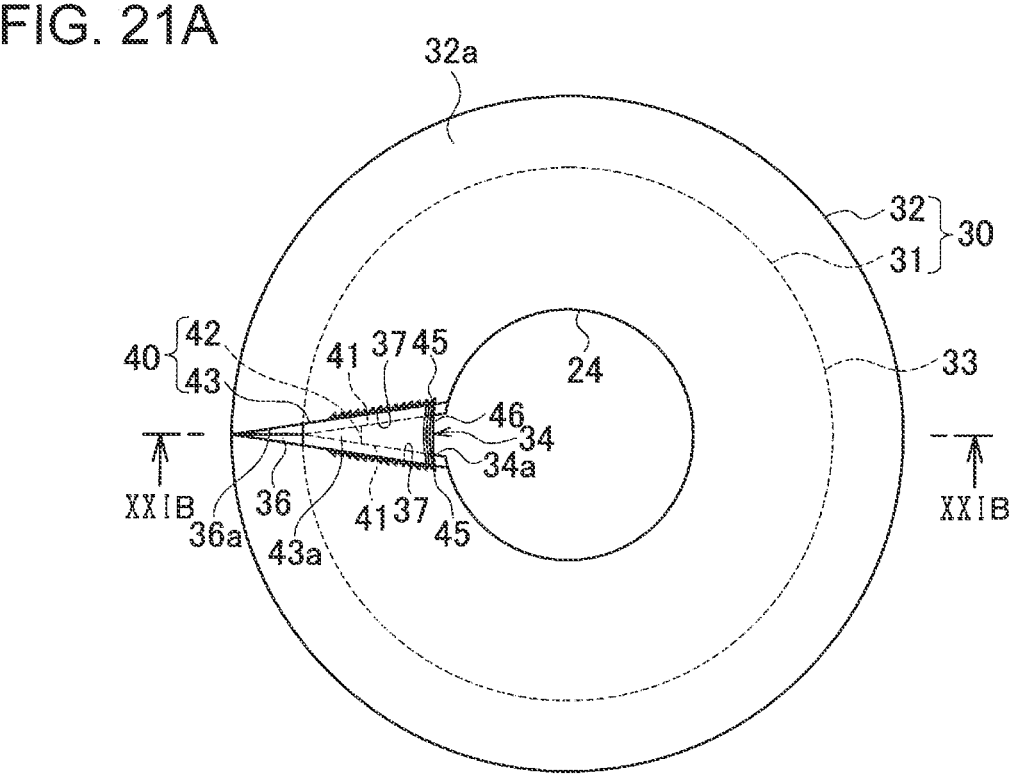
FIG. 21A is a plan view of a metal collar according to a twenty-first embodiment.
Figure 21B:
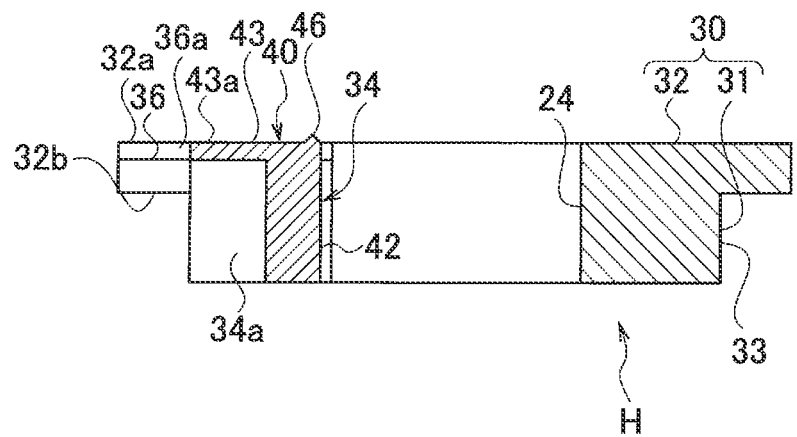
FIG. 21B is a sectional view along a line XXIB-XXIB in FIG. 21A.

In the twenty-first embodiment, as shown in FIG. 21A and FIG. 21B, in a state where the brim section 43 is housed in the dented section 36, a surface 43a of the brim section 43 is parallel to the surface 32a of the flange section 32. Side surfaces of the brim section 43 and the side surfaces 36a of the dented section 36 (specifically, a pair of locking claws 45 and the latchet teeth 37 engaging with the locking claws 45) are in contact in two parts in the circumferential direction of the hole circumferential edge portion of the insertion hole 24. A projecting ridge 46 is formed in the hole circumferential edge portion on the surface 43a of the brim section 43. The projecting ridge 46 continuously extends in the circumferential direction of the hole circumferential edge portion to connect two points where the side surfaces of the brim section 43 and the side surfaces 36a of the dented section 36 are in contact. In the state where the brim section 43 is housed in the dented section 36, the projecting ridge 46 projects higher than the hole circumferential edge portion on the surface 32a of the flange section 32. A projection amount of the projecting ridge 46 from the surface 32a of the flange section 32 is not particularly limited. However, the projection amount is, for example, approximately 0.1 mm. The projecting ridge 46 is crushed and deformed by an axial force of the fastener F inserted into the insertion hole 24.

Figure 21C:
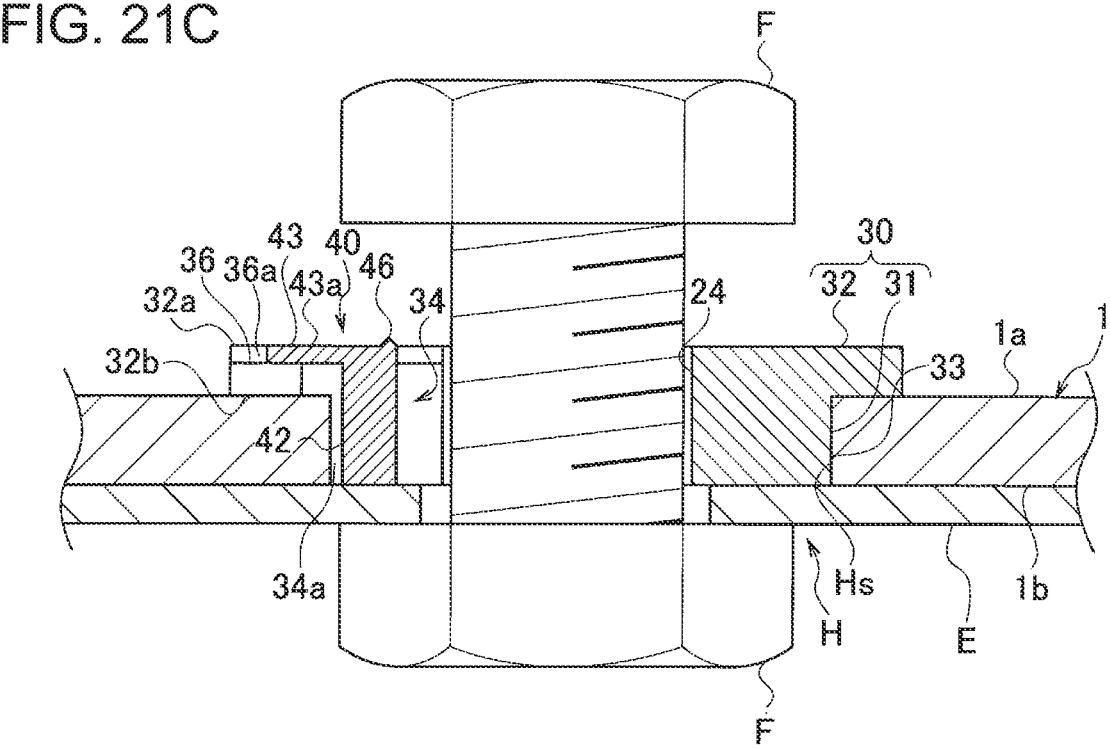
FIG. 21C is a diagram for explaining action of the metal collar according to the twenty-first embodiment.
Figure 21D:
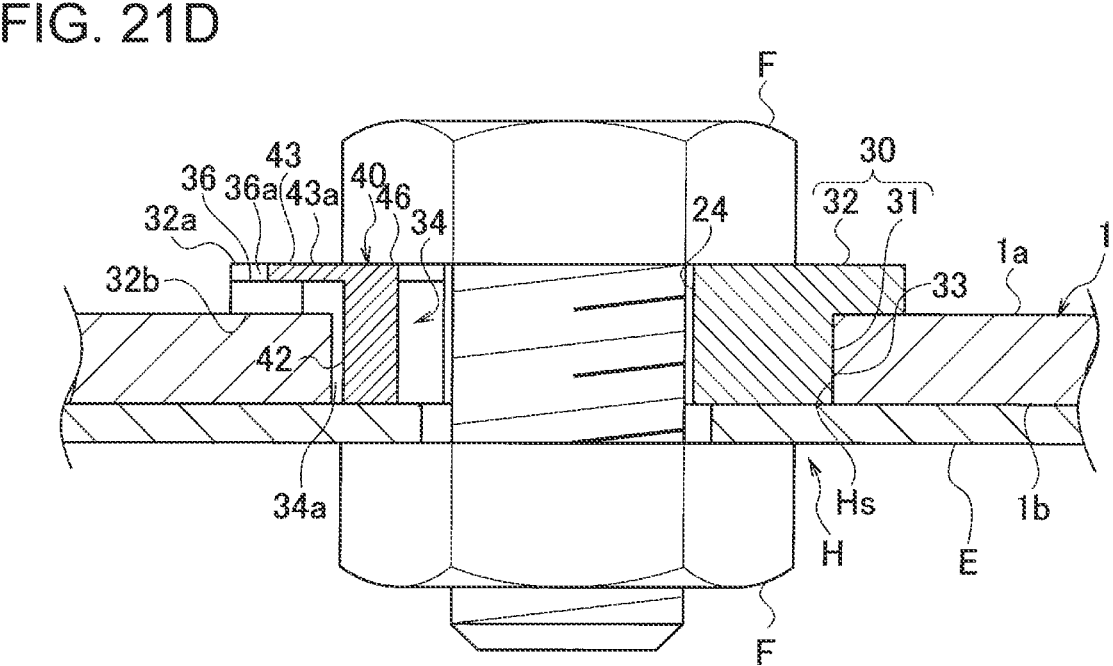
FIG. 21D is a diagram for explaining the action of the metal collar according to the twenty-first embodiment following FIG. 21C.

According to this embodiment, at the hole circumferential edge portion on the surface 43a of the brim section 43, the projecting ridge 46 extends in the circumferential direction of the hole circumferential edge portion and projects higher than the hole circumferential edge portion on the surface 32a of the flange section 32. Therefore, after the wedge member 40 is driven into the slit 34, by inserting the fastener F into the insertion hole 24 as shown in FIG. 21C and fastening the fastener F as shown in FIG. 21D, it is possible to apply the axial force of the fastener F to the projecting ridge 46 from the head of the fastener F and crush and deform (plastically deform) the projecting ridge 46.

The projecting ridge 46 continuously extends in the circumferential direction of the hole circumferential edge portion to connect the two points where the side surfaces of the brim section 43 and the side surfaces 36a of the dented section 36 are in contact. Therefore, even when there is a step between the surface 43a of the brim section 43 housed in the dented section 36 and the surface 32a of the flange section 32, a gap formed between the surface 43a of the brim section 43 and the head of the fastener F can be closed by the projecting ridge 46. Consequently, it is possible to prevent water and the like from intruding into the insertion hole 24 from the outside via the gap.

<Method of Attaching the Metal Collar>

In the assembly process according to this embodiment, when the wedge member 40 is driven into the slit 34, the wedge section 42 is driven into the silt 34 while the brim section 43 is housed in the dented section 36. Thereafter, the fastener F is inserted into the insertion hole 24 and the fastener F is fastened, whereby the axial force of the fastener F is caused to act on the projecting ridge 46 from the head to crush and deform the projecting ridge 46. Explanation of the other processes is omitted because the other processes are the same as the processes of the method of attaching the metal collar 2 according to the sixteenth embodiment.

With the attaching method explained above, it is possible to obtain a fastening part having high waterproofness.

Twenty-Second Embodiment

Figure 22A:
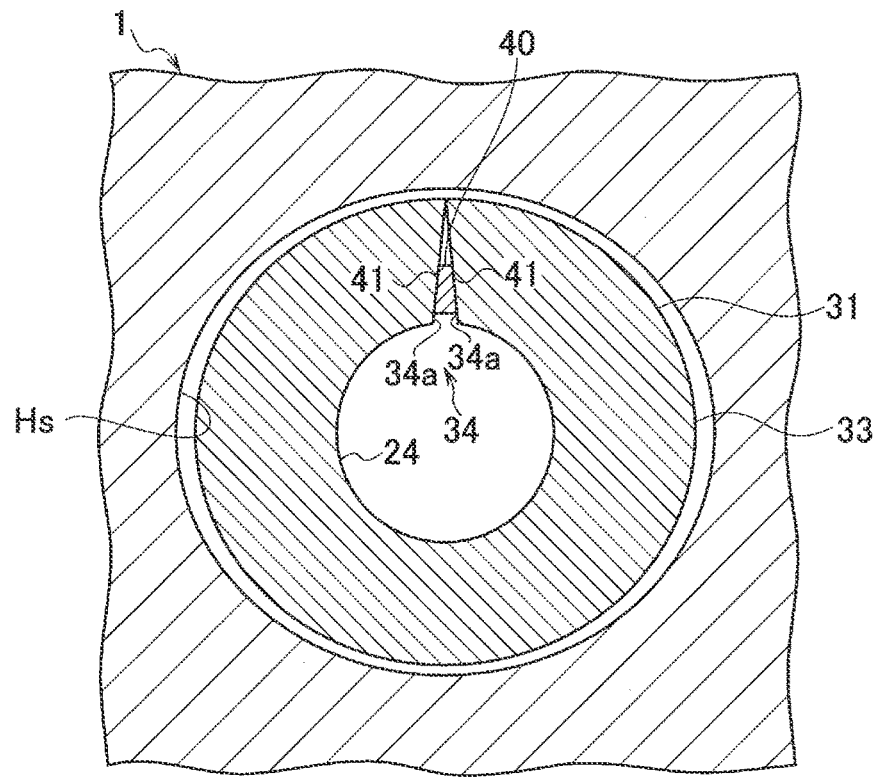
FIG. 22A is a sectional view perpendicular to the center axis of a through-hole for explaining an assembly process for a metal collar according to a twenty-second embodiment and shows a state where the metal collar is fitted into the through-hole.
Figure 22B:
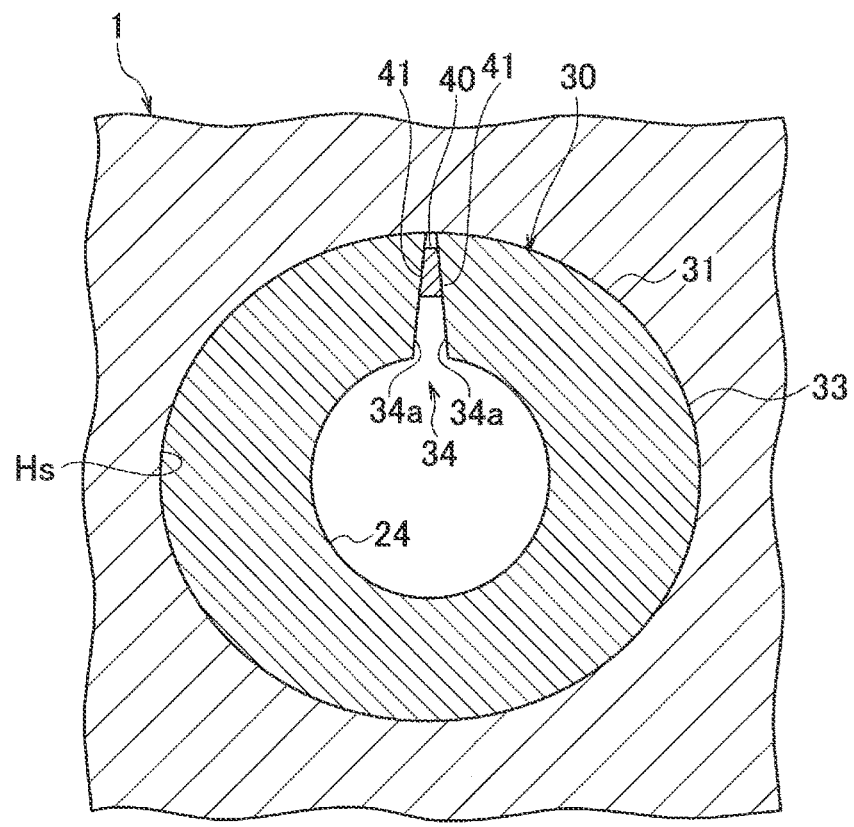
FIG. 22B is a sectional view perpendicular to the center axis of the through-hole for explaining the assembly process following FIG. 22A and shows a state where a wedge member is driven into a slit of a collar member to deform the outer collar member for diameter expansion with the wedge member.

In the twenty-second embodiment, as shown in FIG. 22A and FIG. 22B, the hole inner circumferential surface Hs and the outer circumferential surface 33 of the main body section 31 of the collar member 30 are formed in elliptical shapes substantially similar to each other in the cross section perpendicular to the axial direction of the through-hole H.

According to this embodiment, after expansion in diameter and deformation of the collar member 30, as shown in FIG. 22B, the collar member 30 is restrained to be unrotatable in the through-hole H. Therefore, it is possible to increase strength of the fastening part against tightening torque input from the fastener F.

Note that the hole inner circumferential surface Hs and the outer circumferential surface 33 of the main body section 31 of the collar member 30 are not limited to the elliptical shapes and may be formed in rounded polygonal shapes substantially similar to each other. In this case, the same effects as the effects explained above can be obtained.

Twenty-Third Embodiment

Figure 23A:
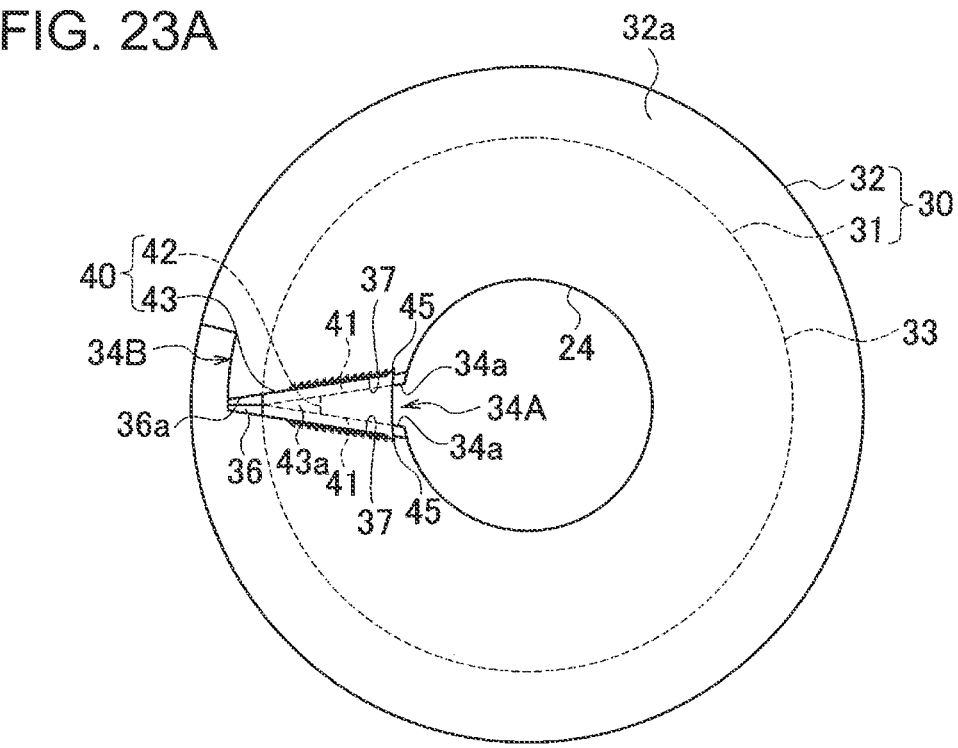
FIG. 23A is a plan view of the metal collar according to a twenty-third embodiment.
Figure 23B:
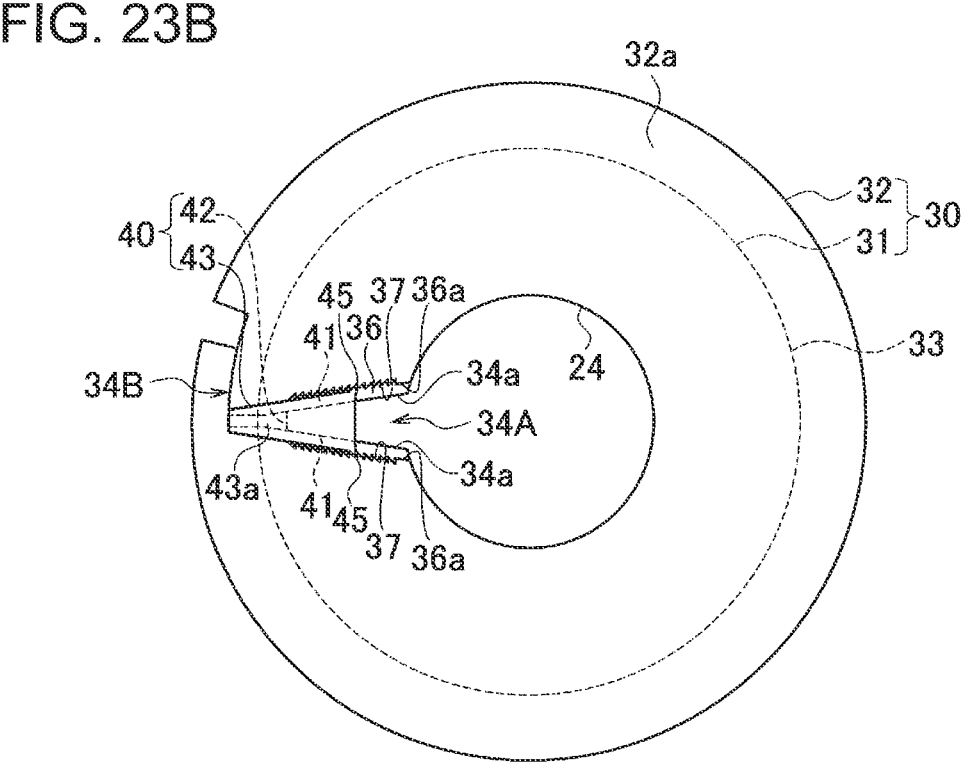
FIG. 23B is a plan view of the metal collar at the time when a wedge member is driven into a slit of a collar member according to the twenty-third embodiment to deform the collar member for diameter expansion with the wedge member.

In the twenty-third embodiment, as shown in FIG. 23A and FIG. 23B, the slit 34 is bent in an axial direction view of the through-hole H and includes a radial direction slit 34A into which the wedge member 40 is driven and a circumferential direction silt 34B. The circumferential direction slit 34B extends in parallel to the outer circumferential surface 33 from the radial direction outer side end of the radial direction slit 34A. When the collar member 30 is deformed in the radial direction, the inner surfaces 34*a* of the circumferential direction slit 34B slide on each other along the circumferential direction of the outer circumferential surface 33.

According to this embodiment, as shown in FIG. 23B, even if the wedge member 40 is driven into the slit 34 and the width of the radial direction outer side end portion of the radial direction slit 34A is increased, it is possible to maintain a state where the inner surfaces 34*a* of the circumferential direction slit 34B located on the radial direction outer side are in contact with each other. Therefore, compared with when the circumferential direction slit 34B is not provided, it is possible to suppress intrusion of water and the like into the radial direction slit 34A from the outside.

Twenty-Fourth Embodiment

Figure 24A:
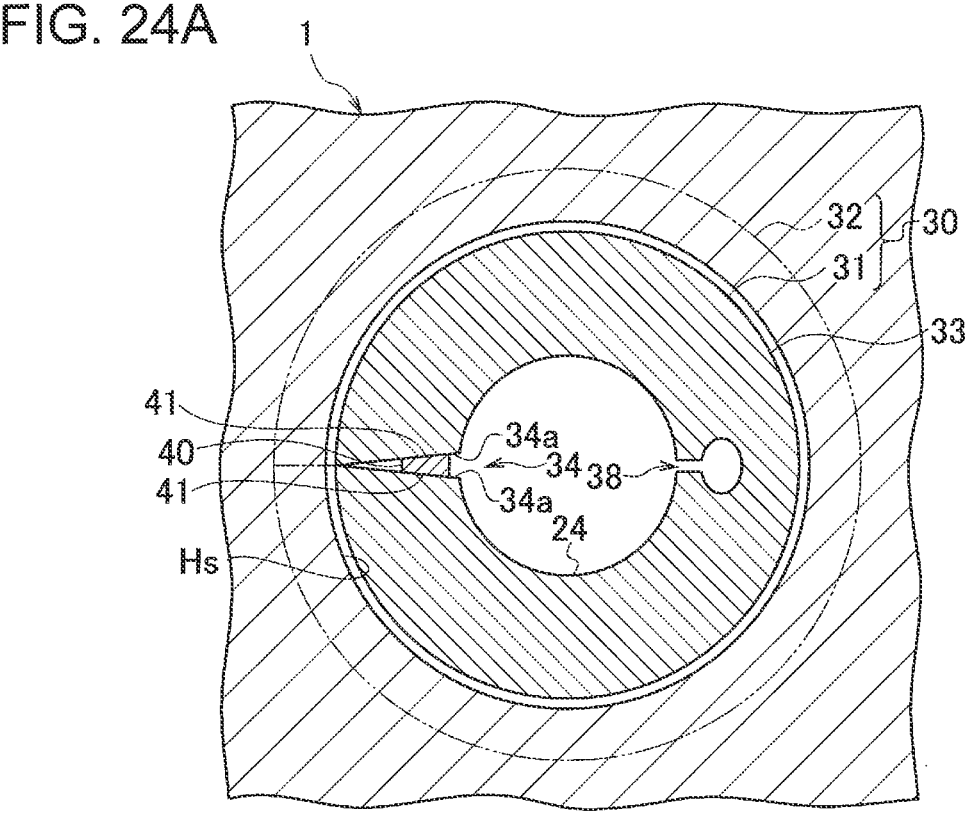
FIG. 24A is a sectional view perpendicular to the center axis of a through-hole for explaining an assembly process for a metal collar according to a twenty-fourth embodiment and shows a state where the metal collar is fitted into the through-hole.
Figure 24B:
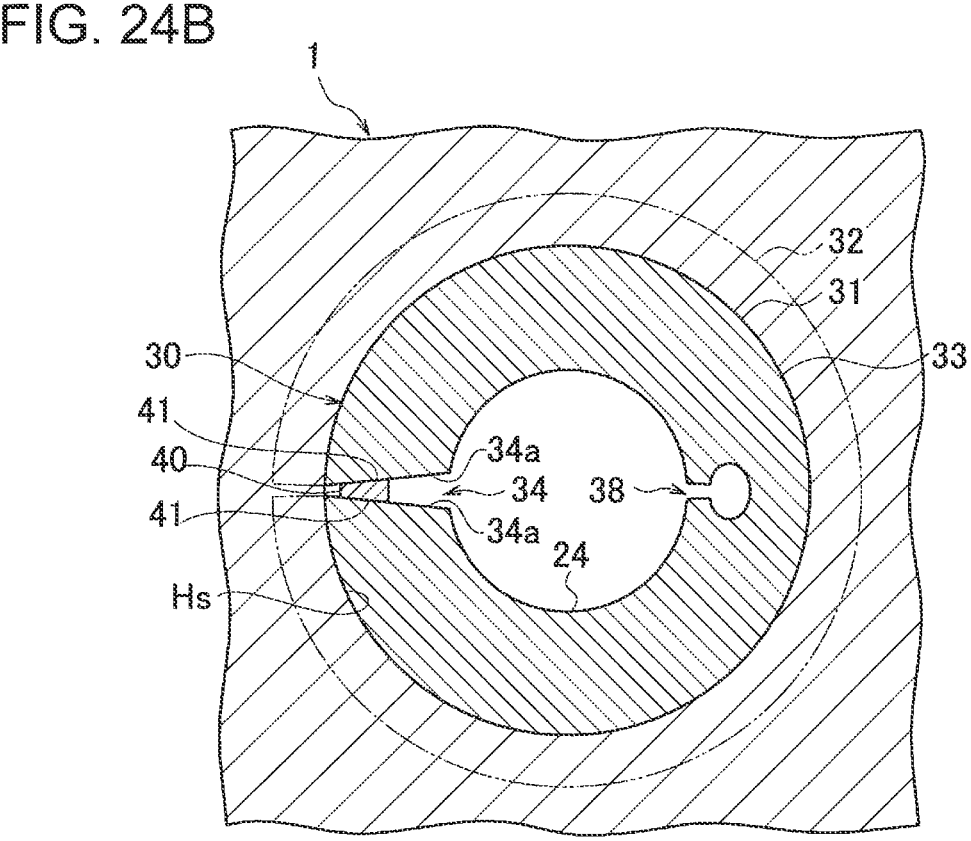
FIG. 24B is a sectional view perpendicular to the center axis of the through-hole for explaining the assembly process following FIG. 24A and shows a state where a wedge member is driven into a slit of a collar member to deform the collar member for diameter expansion with the wedge member.

In the twenty-fourth embodiment, as shown in FIG. 24A and FIG. 24B, a cutout 38 is formed in a circumferential direction position different from a circumferential direction position where the slit 34 of the inner circumferential surface of the collar member 30 is formed. The cutout 38 is formed in a position on the opposite side of the slit 34 across the insertion hole 24 (a position opposed to the slit 34 in the radial direction) in a plan view of the collar member 30. The cutout 38 extends over the entire region of the axial direction length of the collar member 30 and has depth outward in the radial direction.

According to this embodiment, by forming the cutout 38, it is possible to reduce the rigidity of the collar member 30 against deformation in the radial direction than when the cutout 38 is not formed. Therefore, it is possible to increase a ratio (an amplification ratio) of a press force (an output) of the outer circumferential surface 33 of the collar member 30 against the hole inner circumferential surface Hs to a driving force of the wedge member 40, that is, a pressing force (an input) of the wedge member 40 against the inner surfaces 34*a* of the slit 34 than when the cutout 38 is not formed. Consequently, it is possible to more accurately control the press force by adjusting the driving force of the wedge member 40.

Note that the position of the cutout 38 and the number of cutouts 38 are not limited to those shown in the figures. Cutouts 38 may be formed in circumferential direction positions different from the circumferential direction position where the slit 34 is formed. The shape of the cutout 38 is not limited to the shape shown in the figures and may be a U shape, a V shape, and the like in the plan view of the collar member 30.

Other Embodiments

As other embodiments, there are embodiments obtained by combining two or more embodiments selected out of the third to fifteenth embodiments (including the modifications of the embodiments). Further, as the other embodiments, there are embodiments obtained by combining two or more embodiments selected out of the sixteenth to twenty-fourth embodiments (including the modifications of the embodiments). In the embodiments according to the combinations, the effects of the embodiments corresponding to combined elements can be obtained.

<Metal Collar>

As explained above, the metal collar 2 according to the embodiments and the modifications includes the first collar member (the outer collar member 10, the collar member 30) and the second collar member (the inner collar member 20, the wedge member 40). The first collar member (10, 30) includes the outer circumferential surface (11, 33) that comes into contact with the hole inner circumferential surface Hs of the through-hole H when being attached in the through-hole H, and the inner circumferential surface located inside of the outer circumferential surface in the radial direction of the through-hole H. The slit (13, 34) communicating from one end face to the other end face is formed in a part in the circumferential direction of the outer circumferential surface. The first collar member is configured to be deformable in the radial direction. The second collar member (20, 40) includes one of the pressing surface (23) that applies, when the second collar member is fitted into the inner circumferential surface (12) of the first collar member (10), a pressing force outward in the radial direction to at least a part of the inner circumferential surface (12) and the pressing surface (41) that applies, when the second collar member is fitted into the slit (34) of the first collar member (30), a pressing force to the inner surfaces (34*a*) of the slit (34) in the direction in which the inner surfaces separate from each other in the circumferential direction. The second collar member (20, 40) is held in the first collar member (10, 30) by reaction of the pressing force and deforms the first collar member (10, 30) for diameter expansion with the pressing force and presses the outer circumferential surface (11, 33) of the first collar member (10, 30) against the hole inner circumferential surface Hs.

Adhesive

The microcapsules M containing the adhesive may be applied to at least one of the pressing surface (23, 41) of the second collar member (20, 40) and the inner surfaces (34*a*) of the slit or the inner circumferential surface (12) of the first collar member (10, 30) to which the pressing force is applied by the pressing surface. Further, the microcapsules M containing the adhesive may be applied to the outer circumferential surface (11, 33) of the first collar member (10, 30). The adhesive may be a foamable adhesive that foams and hardens when being discharged from the microcapsules M.

The several embodiments and the modifications are explained above. However, these embodiments and the like are only illustrations described to facilitate understanding of the invention. The technical scope of the invention is not limited to the specific technical matters disclosed in the embodiments and the like and includes various modifications, changes, alternative techniques, and the like that can be easily derived from the technical matters.

INDUSTRIAL APPLICABILITY

The fastening part structure for the FRP member, the metal collar, and method of attaching the metal collar can be used in constituent members of vehicles such as an automobile, for example, a hood, a door panel, a bumper, a trunk lid, a rear gate, a fender panel, a side body panel, and a roof panel. The fastening part structure for the FRP member, the metal collar, and method of attaching the metal collar can also be used in constituent members of carriers such as an airplane, a ship, and a railroad vehicle, household electric products, power generation equipment, production machines, housing appliances, furniture, leisure articles, and the like.

REFERENCE SIGNS LIST

FRP member
   1a side surface (front surface) on the upper side
H through-hole
Hs hole inner circumferential surface
M microcapsule
F fastener
2 metal collar
10 outer collar member (first collar member, first member)
11 outer circumferential surface
   11A first semi-cylindrical surface
   11B second semi-cylindrical surface
12 inner circumferential surface
13 slit
14 upper side surface (side surface on a flange section side)
   14A, 15A dented section having depth in the axial direction of a through-hole
16 protrusion housed in a guide groove
17 dented section that engages with a protrusion formed on a cam surface
18 dented section with which an end portion of an external tooth engages
20 inner collar member (second collar member, second member)
21 main body section
22 flange section
   22a side surface (front surface) on the upper side
   22b side surface (rear surface) on the lower side
23 outer circumferential surface (pressing surface)
   23a self-tapping screw
24 insertion hole
25 convex surface corresponding to a corner of a regular polygon
26 claw section
27 guide groove
27 protrusion formed on a cam surface
T1 internal teeth
   T1a end portion on a radial direction inner side
T2 external teeth
   T2a end portion on a radial direction outer side
C1 outer cam surface
C2 inner cam surface
   C11 first cam surface
   C12 second cam surface
30 collar member (first collar member, first member)
31 main body section
32 flange section
   32a side surface (front surface) on the upper side
33 outer circumferential surface
34 slit
   34a inner surface
   34A radial direction silt
   34B circumferential direction slit
35 ratchet teeth (second latchet teeth)
36 dented section
   36a side surface of the dented section
37 latchet teeth (first latchet teeth)
38 cutout
40 wedge member (second collar member, second member)
41 side surface (pressing surface)
42 wedge section
43 brim section
   43a surface
44 locking claw (second locking claw)
45 locking claw (first locking claw)
46 projecting ridge

The invention claimed is:

1. A fastening part structure for an FRP member comprising:
a metal collar attached in a first through-hole formed in the FRP member, the metal collar forming a second through-hole extending through the FRP member, wherein
the metal collar includes:
an annular or tubular outer collar member, an outer circumferential surface of which is in contact with a hole inner circumferential surface of the first through-hole, a part of the outer collar member in a circumferential direction of the outer circumferential surface being provided with a slit communicating from one end face to another end face of the outer collar member; and
an inner collar member fitted into an inner circumferential surface of the outer collar member, at least a part of an outer circumferential surface of the inner collar member being in contact with at least a part of the inner circumferential surface to apply a pressing force outward in a radial direction of the first through-hole to at least the part of the inner circumferential surface, wherein the pressing force is applied by a rotation of the inner collar member around an axis of the first through-hole relative to the outer collar member, and
the inner collar member is held in the outer collar member by reaction of the pressing force, and applies the pressing force to deform the outer collar member for diameter expansion and to press the outer circumferential surface of the outer collar member against the hole inner circumferential surface, and
the inner collar member includes a flange section whose outer circumferential edge portion is located outside in the radial direction than the hole inner circumferential surface.

2. The fastening part structure for an FRP member according to claim 1, wherein
in a cross section perpendicular to an axial direction of the first through-hole, the outer circumferential surface of the inner collar member and the inner circumferential surface of the outer collar member are respectively formed in rounded regular polygonal shapes and a sum of a distance from a center of the outer circumferential surface of the inner collar member to a most distant point of a convex surface corresponding to a corner of the regular polygonal shape on the outer circumferential surface and a maximum value of an average thickness T in the radial direction of the outer collar member is larger than a maximum value of a radial direction distance from a center of the hole inner circumferential surface to the hole inner circumferential surface, and the convex surface of the inner collar member is in contact with the inner circumferential surface of the outer collar member to apply the pressing force outward in the radial direction to the inner circumferential surface, where the average thickness T is a value obtained by dividing, by n, a sum of thicknesses in the radial direction of the outer collar member in n positions separated from one another by 360°/n in a circumferential direction of the inner circumferential surface of the outer collar member and n is a number of corners of the regular polygonal shape.

3. The fastening part structure for an FRP member according to claim 2, wherein, in the cross section perpendicular to the axial direction of the first through-hole, a smaller angle $\theta$ of angles formed by a tangential line at a contact of the convex surface and the inner circumferential surface of the outer collar member, and a straight line perpendicular to a straight line which passes the contact and connects the contact and a center of the outer circumferential surface of the inner collar member satisfies a following expression:

$\tan \theta \leq \mu$ where $\mu$ is a coefficient of static friction between the convex surface and the inner circumferential surface of the outer collar member.

4. The fastening part structure for an FRP member according to claim 2, wherein the flange section extends outward in the radial direction from an end portion of an outer circumferential surface of the inner collar member and the inner collar member includes a claw section projecting outward in the radial direction from an end portion on an opposite side of the end portion where the flange section is provided, and the claw section holds the outer collar member between the claw section and the flange section.

5. The fastening part structure for an FRP member according to claim 2, wherein the flange section extends outward in the radial direction from an end portion of the outer circumferential surface of the inner collar member, and the outer circumferential surface of the inner collar member and the inner circumferential surface of the outer collar member are provided with tapers for reducing radial direction dimensions of the outer circumferential surface and the inner circumferential surface toward the flange section.

6. The fastening part structure for an FRP member according to claim 2, wherein rigidity against a radial direction load of a portion, with which the convex surface of the inner collar member is in contact to apply the pressing force, in the outer collar member is set lower than rigidity in other portions in the outer collar member.

7. The fastening part structure for an FRP member according to claim 6, wherein a dented section having depth in the axial direction of the first through-hole is formed in the portion, with which the convex surface of the inner collar member is in contact to apply the pressing force, in the outer collar member.

8. The fastening part structure for an FRP member according to claim 2, wherein the flange section extends outward in the radial direction from an end portion of the outer circumferential surface of the inner collar member, the flange section includes a front surface on which an opening of an insertion hole for inserting the fastener is formed and a rear surface in contact with a side surface on the flange section side of the outer collar member, and a taper extending toward the front surface while extending inward in the radial direction is provided on the rear surface.

9. The fastening part structure for an FRP member according to claim 2, wherein the flange section extends outward in the radial direction from an end portion of the outer circumferential surface of the inner collar member, and a taper for reducing a radial direction dimension of the outer circumferential surface toward the flange section is provided on the outer circumferential surface of the outer collar member.

10. The fastening part structure for an FRP member according to claim 2, wherein the outer circumferential surface of the outer collar member is divided into a first semi-cylindrical surface located on one side of the slit in the circumferential direction of the outer circumferential surface and a second semi-cylindrical surface located on another side of the slit in the circumferential direction of the outer circumferential surface, and a curvature radius of the first semi-cylindrical surface is smaller than a minimum value of a tolerance of a radius of the hole inner circumferential surface and a curvature radius of the second semi-cylindrical surface is larger than a maximum value of the tolerance of the radius of the hole inner circumferential surface.

11. The fastening part structure for an FRP member according to claim 10, wherein the flange section extends outward in the radial direction from an end portion of the outer circumferential surface of the inner collar member, the outer collar member includes a pair of slit circumferential edge portions that define the slit, a protrusion projecting toward a flange section side is provided at an end portion on the flange section side in the slit circumferential edge portion on the one side in the circumferential direction of the pair of slit circumferential edge portions, a guide groove that houses the protrusion to be relatively movable around an axis of the first through-hole is provided on a side surface on the outer collar member side of the flange section, and the guide groove engages with the protrusion to hinder rotation of the inner collar member around the axis of the first through-hole with respect to the outer collar member when the protrusion is located at an end portion of the guide groove, and allows the protrusion to move in the guide groove and the inner collar member to rotate around the axis of the first through-hole with respect to the outer collar member when the protrusion is located in a portion other than the end portion of the guide groove.

12. The fastening part structure for an FRP member according to claim 2, wherein in the cross section perpendicular to the axial direction of the first through-hole, the hole inner circumferential surface and the outer circumferential surface of the outer collar member are respectively formed in elliptical shapes or rounded regular polygonal shapes and a distance from a center of the outer circumferential surface of the outer collar member to a most distant point of a convex surface corresponding to a major axis end portion of the elliptical shape or a corner of the regular polygonal shape on the outer circumferential surface is larger than a minimum value of the radial direction distance from a center of the hole inner circumferential surface to the hole inner circumferential surface, in the cross section perpendicular to the axial direction of the first through-hole, the outer circumferential surface of the inner collar member and the inner circumferential surface of the outer collar member are respectively formed in rounded regular polygonal shapes and the sum of the distance from the center of the outer circumferential surface of the inner collar member to the most distant point of the convex surface corresponding to the corner of the regular polygonal shape on the outer circumferential surface and the maximum value of the average thickness T in the radial direction of the outer collar member is larger than the maximum value of the radial direction distance from the center of the hole inner circumferential surface to the hole inner circumferential surface, the convex surface of the outer collar member is in contact with the hole inner circumferential surface, and the convex surface of the inner collar member is in contact with the inner circumferential surface of the outer collar member to apply the pressing force outward in the radial direction to the inner circumferential surface, where the average thickness T is a value obtained by dividing, by n, a sum of thicknesses in the radial direction of the outer collar member in n positions separated from one another by 360°/n in a circumferential direction of the inner circumferential surface of the outer collar member and n is the number of corners of the regular polygonal shape.

13. The fastening part structure for an FRP member according to claim 1, wherein inner cam surfaces are formed side by side in the circumferential direction on the outer circumferential surface of the inner collar member, outer cam surfaces respectively opposed to the inner cam surfaces in the radial direction are formed side by side in the circumferential direction on the inner circumferential surface of the outer collar member, in a cross section perpendicular to an axial direction of the first through-hole, each of the inner cam surfaces and the outer cam surfaces is inclined such that one side in the circumferential direction is located on an inner side, in the radial direction, of the other side in the circumferential direction, in the cross section perpendicular to the axial direction of the first through-hole, a sum of a maximum value of a radial direction distance from a center of the outer circumferential surface of the inner collar member to the inner cam surface and a maximum value of a radial direction distance from the outer cam surface to the outer circumferential surface of the outer collar member is larger than a radius of the hole inner circumferential surface, and the inner cam surface is in contact with the outer cam surface to apply the pressing force outward in the radial direction to the outer cam surface.

14. The fastening part structure for an FRP member according to claim 13, wherein, in the cross section perpendicular to the axial direction of the first through-hole, a smaller angle θ of angles formed by a tangential line at a contact of the inner cam surface and the outer cam surface, and a straight line perpendicular to a straight line which passes the contact and connects the contact and a center of the inner collar member satisfies a following expression:

$$\tan\theta \leq \mu.$$

where μ is a coefficient of static friction between the inner cam surface and the outer cam surface.

15. The fastening part structure for an FRP member according to claim 13, wherein external teeth each including the inner cam surface are formed side by side in the circumferential direction on the outer circumferential surface of the inner collar member, internal teeth each including the outer cam surface are formed side by side in the circumferential direction on the inner circumferential surface of the outer collar member, and at least one of an end portion on an outer side in the radial direction of each external tooth and an end portion on the inner side in the radial direction of each internal tooth is formed at an acute angle α in the cross section perpendicular to the axial direction of the first through-hole, and the acute angle α satisfies a following expression:

$$\alpha < 90° - \theta$$

where θ is a smaller angle of angles formed by a tangential line at a contact of the inner cam surface and the outer cam surface, and a straight line perpendicular to a straight line which passes the contact and connects the contact and a center of the inner collar member in the cross section perpendicular to the axial direction of the first through-hole.

16. The fastening part structure for an FRP member according to claim 13, wherein, in a state where an end portion on one side in the circumferential direction of the inner cam surface and an end portion on the one side in the circumferential direction of the outer cam surface are opposed in the radial direction and an end portion on the other side in the circumferential direction of the inner cam surface and an end portion on the other side in the circumferential direction of the outer cam surface are opposed in the radial direction, a size of a minimum gap δ formed between the inner cam surface and the outer cam surface opposed to each other in the radial direction satisfies a following expression:

$$\pi R/45 \times \sin\theta c \leq \text{Avg}.\delta \leq \pi R/30 \times \sin\theta c$$

where Avg.δ is an average of the minimum gaps δ, R is a radial direction distance from the end portion on the other side in the circumferential direction of the inner cam surface to a center of the inner collar member in the cross section perpendicular to the axial direction of the first through-hole, and θc is a smaller angle of angles formed by a normal of the inner cam surface at a point on the inner cam surface and a straight line connecting the point on the inner cam surface and the center of the inner collar member.

17. The fastening part structure for an FRP member according to claim 13, wherein protrusions projecting outward in the radial direction are formed at end portions on the other side in the circumferential direction of the inner cam surfaces, and dented sections are formed on the outer cam surfaces, the dented sections engaging with the protrusions and limiting rotation of the inner collar member to the one side in the circumferential direction with respect to the outer collar member when the inner cam surface is present in a predetermined circumferential direction position with respect to the outer cam surface.

18. The fastening part structure for an FRP member according to claim 13, wherein
protrusions projecting inward in the radial direction are formed at end portions on the one side in the circumferential direction of the outer cam surfaces, and
dented sections are formed on the inner cam surfaces, the dented sections engaging with the protrusions and limiting rotation of the inner collar member to the one side in the circumferential direction with respect to the outer collar member when the inner cam surface is present in a predetermined circumferential direction position with respect to the outer cam surface.

19. The fastening part structure for an FRP member according to claim 13, wherein
external teeth each including the inner cam surface are formed side by side in the circumferential direction on the outer circumferential surface of the inner collar member,
end portions on the outer side in the radial direction of the external teeth are each formed at an acute angle in the cross section perpendicular to the axial direction of the first through-hole,
each of the outer cam surfaces is divided into a first cam surface and a second cam surface bending from an end portion on the one side in the circumferential direction of the first cam surface and extending to the one side in the circumferential direction, and
in the cross section perpendicular to the axial direction of the first through-hole, a smaller angle $\theta1$ of angles formed by a normal to the first cam surface at a point on the first cam surface and a straight line connecting the point on the first cam surface and a center of the inner collar member is larger than a smaller angle $\theta2$ of angles formed by a normal to the second cam surface at a point on the second cam surface and a straight line connecting the point on the second cam surface and the center of the inner collar member.

20. The fastening part structure for an FRP member according to claim 19, wherein dented sections, with which the end portion on the outer side in the radial direction of the external teeth engage, are formed on the second cam surfaces.

21. The fastening part structure for an FRP member according to claim 19, wherein the angle $\theta2$ is 0° or more and 1° or less.

22. The fastening part structure for an FRP member according to claim 13, wherein
internal teeth each including the outer cam surface are formed side by side in the circumferential direction on the inner circumferential surface of the outer collar member, end portions on the inner side in the radial direction of the internal teeth are formed at an acute angle in the cross section perpendicular to the axial direction of the first through-hole,
each of the inner cam surfaces is divided into a third cam surface and a fourth cam surface bending from an end portion on the other side in the circumferential direction of the third cam surface and extending to the other side in the circumferential direction, and
in the cross section perpendicular to the axial direction of the first through-hole, a smaller angle $\theta3$ of angles formed by a normal to the third cam surface at a point on the third cam surface and a straight line connecting the point on the third cam surface and a center of the inner collar member is larger than a smaller angle $\theta4$ of angle formed by a normal to the fourth cam surface at a point on the fourth cam surface and a straight line connecting the point on the fourth cam surface and the center of the inner collar member.

23. The fastening part structure for an FRP member according to claim 22, herein dented sections, with which the end portions on the inner side in the radial direction of the internal teeth engage, are formed on the fourth cam surfaces.

24. The fastening part structure for an FRP member according to claim 22, wherein the angle $\theta4$ is 0° or more and 1° or less.

25. A fastening part structure for an FRP member comprising
a metal collar attached in a first through-hole formed in the FRP member, the metal collar forming a second through-hole extending through the FRP member, wherein
the metal collar includes:
a collar member, an outer circumferential surface of which is in contact with a hole inner circumferential surface of the first through-hole, a part of the collar member in a circumferential direction of the outer circumferential surface being provided with a slit communicating from one end face to another end face of the collar member; and
a wedge member driven into the slit, the wedge member applying a pressing force in a direction in which inner surfaces of the slit separate in the circumferential direction, and
the wedge member is held in the collar member by reaction of the pressing force, deforms the collar member for diameter expansion with the pressing force, and presses the outer circumferential surface of the collar member against the hole inner circumferential surface.

26. The fastening part structure for an FRP member according to claim 25, wherein, in a cross section perpendicular to an axial direction of the first through-hole, an angle $\theta$ formed by a surface region, with which the wedge member is in contact, in the inner surface of the slit and a straight line connecting a point on the surface region and a center of the collar member satisfies a following expression:

$$\tan \theta \leq \mu$$

where $\mu$ is a coefficient of static friction between the surface regions of the inner surfaces of the slit and the wedge member.

27. The fastening part structure for an FRP member according to claim 25, wherein
the collar member includes a tubular main body section and a flange section extending outward in a radial direction from an end portion of the main body section,
the wedge member includes a wedge section driven into the slit and a brim section projecting from side surfaces of the wedge section, and
the brim section extends along the flange section in a state where the wedge section is driven into the slit.

28. The fastening part structure for an FRP member according to claim 27, wherein the brim section covers an end portion of the slit opened in the flange section in a state where the wedge section is driven into the slit.

29. The fastening part structure for an FRP member according to claim 27, wherein
a dented section capable of housing the brim section in a state where the wedge section is driven into the slit is formed on a surface of the flange section, first latchet teeth are formed side by side along a driving direction of the wedge member on side surfaces of the dented section, and first locking claws engageable with the first latchet teeth are formed on surfaces of the brim section to be opposed to the side surfaces of the dented section.

30. The fastening part structure for an FRP member according to claim 29, wherein tips of the first locking claws have a tapered shape and are configured to be elastically deformable along a shape of the first latchet teeth when the first locking claw engages with the first latchet teeth.

31. The fastening part structure for an FRP member according to claim 27, wherein an opening of an insertion hole for inserting the fastener and a dented section capable of housing the brim section in a state where the wedge section is driven into the slit are formed on a surface of the flange section, in a state where the brim section is housed in the dented section, a surface of the brim section is parallel to the surface of the flange section and side surfaces of the brim section and side surfaces of the dented section are in contact in two parts in a circumferential direction of a hole circumferential edge portion of the insertion hole, and a projecting ridge is formed at the hole circumferential edge portion on the surface of the brim section, the projecting ridge continuously extending in the circumferential direction of the hole circumferential edge portion to connect two points where the side surfaces of the brim section and the side surfaces of the dented section are in contact, projecting higher than the hole circumferential edge portion on the surface of the flange section, and being deformable to crush by an axial force of the fastener inserted into the insertion hole.

32. The fastening part structure for an FRP member according to claim 25, wherein second latchet teeth are formed side by side along a driving direction of the wedge member on the inner surfaces of the slit, and second locking claws engageable with the second latchet teeth are formed on surfaces of the wedge member to be opposed to the inner surfaces of the slit.

33. The fastening part structure for an FRP member according to claim 32, wherein tips of the second locking claws have a tapered shape and are configured to be elastically deformable along a shape of the second latchet teeth when the second locking claws engage with the second latchet teeth.

34. The fastening part structure for an FRP member according to claim 25, wherein a radial direction dimension of the outer circumferential surface of the collar member is smaller than a minimum value of a tolerance of a radial direction dimension of the hole inner circumferential surface when the collar member is deformed for diameter reduction such that the inner surfaces of the slit come into contact with each other and is larger than a maximum value of the tolerance of the radial direction dimension of the hole inner circumferential surface when the collar member is in a natural state.

35. The fastening part structure for an FRP member according to claim 25, wherein the hole inner circumferential surface and the outer circumferential surface of the collar member are formed in elliptical shapes or rounded polygonal shapes in a cross section perpendicular to an axial direction of the first through-hole.

36. The fastening part structure for an FRP member according to claim 25, wherein the slit is bent in an axial direction view of the first through-hole and includes a radial direction slit into which the wedge member is driven and a circumferential direction slit extending in parallel to the outer circumferential surface from an outer side end in the radial direction of the radial direction slit, and inner surfaces of the circumferential direction slit are configured to slide on each other along the circumferential direction of the outer circumferential surface when the collar member is deformed in the radial direction.

37. The fastening part structure for an FRP member according to claim 25, wherein, in the inner circumferential surface of the collar member, a cutout is formed in a circumferential direction position different from a circumferential direction position where the slit is formed, and the cutout extends over an entire region of an axial direction length of the first through-hole of the collar member and has depth outward in a radial direction.

38. A method of attaching a metal collar in a first through-hole formed in an FRP member, the metal collar forming a second through-hole extending through the FRP member, the method comprising:

preparing a metal collar including:

an annular or tubular outer collar member which includes an outer circumferential surface that comes into contact with a hole inner circumferential surface of the first through-hole when the outer collar member is attached in the first through-hole, and which is provided with a slit in a part of the outer collar member in a circumferential direction of the outer circumferential surface, the slit communicating from one end face to another end face of the outer collar member, and thereby is configured to be deformable in a radial direction of the first through-hole; and an inner collar member including, at least in a part of an outer circumferential surface, a pressing surface capable of applying a pressing force outward in the radial direction to at least a part of an inner circumferential surface of the outer collar member when the inner collar member is fitted into the inner circumferential surface, the inner collar member including a flange section whose outer circumferential edge portion is located outside in the radial direction than the hole inner circumferential surface;

fitting the outer collar member into the hole inner circumferential surface of the first through-hole;

fitting the inner collar member into the inner circumferential surface of the outer collar member;

bringing the pressing surface into contact with at least a part of the inner circumferential surface of the outer collar member to apply a pressing force outward in the radial direction from the pressing surface to at least a part of the inner circumferential surface by rotating the inner collar member around an axis of the first through-hole relative to the outer collar member, wherein the inner collar member is held in the outer collar member with reaction of the pressing force and deforms the outer collar member for diameter expansion with the pressing force to press the outer circumferential surface of the outer collar member against the hole inner circumferential surface.

39. The method of attaching a metal collar according to claim 38, further comprising:

forming the outer circumferential surface of the inner collar member and the inner circumferential surface of the outer collar member respectively in rounded regular polygonal shapes in a cross section perpendicular to an axial direction of the first through-hole such that a sum of a distance from a center of the outer circumferential surface of the inner collar member to a most distant point of a convex surface corresponding to a corner of the regular polygonal shape on the outer circumferential surface and a maximum value of an average thickness T in the radial direction of the outer collar member is larger than a maximum value of a radial direction distance from a center of the hole inner circumferential surface to the hole inner circumferential surface; and rotating the inner collar member around an axis of the first through-hole with respect to the outer collar member fitted into the hole inner circumferential surface and bringing the convex surface into contact with the inner circumferential surface of the outer collar member to apply the pressing force to the inner circumferential surface, where the average thickness T is a value obtained by dividing, by n, a sum of thicknesses in the radial direction of the outer collar member in n positions separated from one another by 360°/n in the circumferential direction of the inner circumferential surface of the outer collar member and n is a number of corners of the regular polygonal shape.

40. The method of attaching a metal collar according to claim 39, further comprising:

forming the outer collar member such that the outer collar member is elastically deformable in the radial direction until a radial direction dimension of the outer circumferential surface of the outer collar member becomes smaller than a minimum value of a tolerance of a radial direction dimension of the hole inner circumferential surface and a radial direction dimension of the outer circumferential surface of the outer collar member in a natural state is larger than a maximum value of the tolerance of the radial direction dimension of the hole inner circumferential surface;

fitting the outer collar member into the hole inner circumferential surface in a state where an external force is applied to the outer collar member to deform the outer collar member for diameter reduction and set the radial direction dimension of the outer circumferential surface of the outer collar member smaller than the radial direction dimension of the hole inner circumferential surface; and before rotating the inner collar member around the axis of the first through-hole with respect to the outer collar member, removing the external force applied to the outer collar member to elastically deform the outer collar member for diameter expansion inside the first through-hole.

41. The method of attaching a metal collar according to claim 39, further comprising:

dividing the outer circumferential surface of the outer collar member into a first semi-cylindrical surface located on one side of the slit in the circumferential direction of the outer circumferential surface and a second semi-cylindrical surface located on another side of the slit in the circumferential direction of the outer circumferential surface;

forming a curvature radius of the first semi-cylindrical surface smaller than a minimum value of a tolerance of a radius of the hole inner circumferential surface and forming a curvature radius of the second semi-cylindrical surface larger than a maximum value of the tolerance of the radius of the hole inner circumferential surface; and when fitting the outer collar member into the hole inner circumferential surface, rotating the outer collar member around the axis of the first through-hole while towing an end portion of the outer collar member adjacent to the one side in the circumferential direction of the slit toward an end portion of the outer collar member located on the other side of the slit in the circumferential direction.

42. The method of attaching a metal collar according to claim 39, further comprising:

forming the hole inner circumferential surface and the outer circumferential surface of the outer collar member respectively in elliptical shapes or rounded regular polygonal shapes in the cross section perpendicular to the axial direction of the first through-hole such that the distance from the center of the outer circumferential surface of the outer collar member to a most distant point of a convex surface corresponding to a major axis end portion of the elliptical shape or the corner of the regular polygonal shape on the outer circumferential surface is larger than a minimum value of a radial direction distance from the center of the hole inner circumferential surface to the hole inner circumferential surface;

forming the outer circumferential surface of the inner collar member and the inner circumferential surface of the outer collar member respectively in rounded regular polygonal shapes in the cross section perpendicular to the axial direction of the first through-hole such that the sum of the distance from the center of the outer circumferential surface of the inner collar member to the most distant point of the convex surface corresponding to the corner of the regular polygonal shape on the outer circumferential surface and the maximum value of the average thickness T in the radial direction of the outer collar member is larger than the maximum value in the radial direction distance from the center of the hole inner circumferential surface to the hole inner circumferential surface; and after fitting the outer collar member into the hole inner circumferential surface, rotating the inner collar member around the axis of the first through-hole with respect to the FRP member to rotate the outer collar member around the axis of the first through-hole with respect to the FRP member and bring the convex surface of the outer collar member into contact with the hole inner circumferential surface and thereafter further rotating the inner collar member around the axis of the first through-hole with respect to the outer collar member to bring the convex surface of the inner collar member into contact with the inner circumferential surface of the outer collar member and apply the pressing force to the inner circumferential surface, where the average thickness T is a value obtained by dividing, by n, a sum of thicknesses in the radial direction of the outer collar member in n positions separated from one another by 360°/n in the circumferential direction of the inner circumferential surface of the outer collar member and n is the number of corners of the regular polygonal shape.

43. The method of attaching a metal collar according to claim 38, wherein, inner cam surfaces are formed side by side in the circumferential direction on the outer circumferential surface of the inner collar member, outer cam surfaces respectively opposed to the inner cam surfaces in the radial direction are formed side by side in the circumferential direction on the inner circumferential surface of the outer collar member, in a cross section perpendicular to an axial direction of the first through-hole, each of the inner cam surfaces and the outer cam surfaces is inclined such that one side in the circumferential direction is located on an inner side, in the radial direction, of the other side in the circumferential direction, in the cross section perpendicular to the axial direction of the first through-hole, a sum of a maximum value of a radial direction distance from a center of the outer circumferential surface of the inner collar member to the inner cam surface and a maximum value of a radial direction distance from the outer cam surface to the outer circumferential surface of the outer collar member is larger than a radius of the hole inner circumferential surface, and the method further comprises, after fitting the outer collar member into the hole inner circumferential surface, rotating the inner collar member around the axis of the first through-hole with respect to the outer collar member to bring the inner cam surface into contact with the outer cam surface and apply the pressing force outward in the radial direction to the outer cam surface.

44. The method of attaching a metal collar according to claim 43, further comprising:

forming protrusions projecting outward in the radial direction at an end portion on the other side in the circumferential direction of the inner cam surfaces;

forming dented sections on the outer cam surfaces such that, when the inner cam surfaces are present in a predetermined circumferential direction position with respect to the outer cam surfaces, the dented sections engage with the protrusions and limit rotation of the inner collar member to the one side in the circumferential direction with respect to the outer collar member; and rotating the inner collar member until the dented sections engages with the protrusions when rotating the inner collar member around the axis of the first through-hole with respect to the outer collar member.

45. The method of attaching a metal collar according to claim 43, further comprising:

forming protrusions projecting inward in the radial direction at end portions on the one side in the circumferential direction of the outer cam surfaces;

forming dented sections on the inner cam surfaces such that, when the inner cam surfaces are present in a predetermined circumferential direction position with respect to the outer cam surfaces, the dented sections engage with the protrusions and limit rotation of the inner collar member to the one side in the circumferential direction with respect to the outer collar member; and rotating the inner collar member until the dented sections engage with the protrusions when rotating the inner collar member around the axis of the first through-hole with respect to the outer collar member.

46. The method of attaching a metal collar according to claim 43, wherein external teeth each including the inner cam surface are formed side by side in the circumferential direction on the outer circumferential surface of the inner collar member, end portions on the outer side in the radial direction of the external teeth are each formed at an acute angle in the cross section perpendicular to the axial direction of the first through-hole, and the method further comprises:

dividing each of the outer cam surfaces into a first cam surface and a second cam surface bending from an end portion on the one side in the circumferential direction of the first cam surface and extending to the one side in the circumferential direction;

forming, in the cross section perpendicular to the axial direction of the first through-hole, a smaller angle $\theta 1$ of angles formed by a normal to the first cam surface at a point on the first cam surface and a straight line connecting the point on the first cam surface and a center of the inner collar member larger than a smaller angle $\theta 2$ of angles formed by a normal to the second cam surface at a point on the second cam surface and a straight line connecting the point on the second cam surface and the center of the inner collar member; and when rotating the inner collar member around the axis of the first through-hole with respect to the outer collar member, rotating the inner collar member until the end portions on the outer side in the radial direction of the external teeth move beyond boundaries between the first cam surfaces and the second cam surfaces.

47. The method of attaching a metal collar according to claim 46, further comprising:

forming dented sections, with which the end portions on the outer side in the radial direction of the external teeth engage, on the second cam surfaces; and when rotating the inner collar member around the axis of the first through-hole with respect to the outer collar member, rotating the inner collar member until the end portions on the outer side in the radial direction of the external teeth engage with the dented sections.

48. The method of attaching a metal collar according to claim 43, wherein internal teeth each including the outer cam surface are formed side by side in the circumferential direction on the inner circumferential surface of the outer collar member, end portions on the inner side in the radial direction of the internal teeth are each formed at an acute angle in the cross section perpendicular to the axial direction of the first through-hole, and the method further comprises:

dividing each of the inner cam surfaces into a third cam surface and a fourth cam surface bending from an end portion on the other side in the circumferential direction of the third cam surface and extending to the other side in the circumferential direction;

setting, in the cross section perpendicular to the axial direction of the first through-hole, a smaller angle $\theta 3$ of angles formed by a normal to the third cam surface at a point on the third cam surface and a straight line connecting the point on the third cam surface and a center of the inner collar member larger than a smaller angle $\theta 4$ of angles formed by a normal to the fourth cam surface at a point on the fourth cam surface and a straight line connecting the point on the fourth cam surface and the center of the inner collar member; and when rotating the inner collar member around the axis of the first through-hole with respect to the outer collar member, rotating the inner collar member until the end portions on the inner side in the radial direction of the internal teeth move beyond boundaries between the third cam surfaces and the fourth cam surfaces.

49. The method of attaching a metal collar according to claim 48, further comprising:
forming dented sections, with which the end portions on the inner side in the radial direction of the internal teeth engage, on the fourth cam surfaces; and
when rotating the inner collar member around the axis of the first through-hole with respect to the outer collar member, rotating the inner collar member until the end portions on the inner side in the radial direction of the internal teeth engage with the dented sections.

50. The method of attaching a metal collar according to claim 38, further comprising:
before fitting the outer collar member into the hole inner circumferential surface, applying microcapsules containing an adhesive to at least one of a pressing surface of the inner collar member and the inner circumferential surface of the outer collar member to which the pressing force is applied by the pressing surface; and
breaking the microcapsules with the pressing force applied to the inner circumferential surface of the outer collar member from the pressing surface and discharging the adhesive encapsulated inside the microcapsules.

51. The method of attaching a metal collar according to claim 38, further comprising:
before fitting the outer collar member into the hole inner circumferential surface, applying microcapsules containing an adhesive to the outer circumferential surface of the outer collar member; and
breaking the microcapsules with a press force for pressing the outer circumferential surface of the outer collar member against the hole inner circumferential surface and discharging the adhesive encapsulated inside the microcapsules.

52. A method of attaching a metal collar in a first through-hole formed in an FRP member, the metal collar forming a second through-hole extending through the FRP member, the method comprising:
preparing a metal collar including:
a collar member which includes an outer circumferential surface that comes into contact with a hole inner circumferential surface of the first through-hole when the collar member is attached in the first through-hole, and which is provided with a slit in a part in a circumferential direction of the outer circumferential surface, the slit communicating from one end face to another end face of the collar member, and thereby is configured to be deformable in a radial direction of the first through-hole; and
a wedge member including pressing surfaces capable of, when the wedge member is driven into the slit, applying a pressing force to inner surfaces of the slit in a direction in which the inner surfaces separate from each other in the circumferential direction;
fitting the collar member into the hole inner circumferential surface of the first through-hole;
driving the wedge member into the slit;
bringing the pressing surfaces into contact with the inner surfaces of the slit to apply, to the inner surfaces of the slit from the pressing surfaces, the pressing force in the direction in which the inner surfaces separate from each other in the circumferential direction; and
holding the wedge member in the collar member by reaction of the pressing force and deforming the collar member for diameter expansion with the pressing force to press the outer circumferential surface of the collar member against the hole inner circumferential surface.

53. The method of attaching a metal collar according to claim 52, further comprising:
forming the collar member such that, when the collar member is elastically deformed for diameter reduction to bring the inner surfaces of the slit into contact with each other, a radial direction dimension of the outer circumferential surface of the collar member becomes smaller than a minimum value of a tolerance of a radial direction dimension of the hole inner circumferential surface and forming the collar member such that, when the collar member is in a natural state, a radial direction dimension of the outer circumferential surface of the collar member is larger than a maximum value of the tolerance of the radial direction dimension of the hole inner circumferential surface;
fitting the collar member into the hole inner circumferential surface in a state where an external force is applied to the collar member to deform the collar member for diameter reduction and a radial direction dimension of the outer circumferential surface of the collar member is set smaller than a radial direction dimension of the hole inner circumferential surface; and
before driving the wedge member into the slit, removing the external force applied to the collar member to elastically deform the collar member for diameter expansion inside the first through-hole.

54. The method of attaching a metal collar according to claim 52, wherein
the collar member includes a tubular main body section and a flange section extending outward in the radial direction from an end portion of the main body section,
the wedge member includes a wedge section driven into the slit and a brim section projecting from side surfaces of the wedge section,
an opening of an insertion hole for inserting a fastener and a dented section in which the brim section is housed in a state where the wedge section is driven into the slit are formed on a surface of the flange section,
the brim section is formed such that, when the brim section is housed in the dented section, a surface of the brim section is parallel to the surface of the flange section and side surfaces of the brim section and side surfaces of the dented section are in contact in two parts in a circumferential direction of a hole circumferential edge portion of the insertion hole, and
a projecting ridge continuously extending in the circumferential direction of the hole circumferential edge portion to connect two points of the side surfaces of the brim section in contact with the side surfaces of the dented section and, when the brim section is housed in the dented section, projecting higher than the hole circumferential edge portion on the surface of the flange section, and
the method further comprises:
when driving the wedge member into the slit, driving the wedge section into the slit while housing the brim section in the dented section; and
after applying the pressing force to the inner surfaces of the slit from the pressing surfaces, inserting the fastener into the insertion hole and crushing and deforming the projecting ridge with an axial force of the fastener.

55. The method of attaching a metal collar according to claim 52, further comprising:

before fitting the collar member into the hole inner circumferential surface, applying microcapsules containing an adhesive to at least either the pressing surfaces of the wedge member or the inner surfaces of the slit to which the pressing force is applied by the pressing surfaces; and breaking the microcapsules with the pressing force applied to the inner surfaces of the slit from the pressing surfaces and discharging the adhesive encapsulated inside the microcapsules.

56. The method of attaching a metal collar according to claim 52, further comprising:

before fitting the collar member into the hole inner circumferential surface, applying microcapsules containing an adhesive to the outer circumferential surface of the collar member; and breaking the microcapsules with a press force for pressing the outer circumferential surface of the collar member against the hole inner circumferential surface and discharging the adhesive encapsulated inside the microcapsules.

57. A fastening part structure for an FRP member comprising a metal collar attached in a first through-hole formed in the FRP member, the metal collar forming a second through-hole extending through the FRP member, wherein the metal collar includes:

a first member including an outer circumferential surface in contact with a hole inner circumferential surface of the first through-hole and an inner circumferential surface located on an inner side of the outer circumferential surface in a radial direction of the first through-hole, a part of the first member in a circumferential direction of the outer circumferential surface being provided with a slit communicating from one end face to another end face of the first member; and a second member that applies a pressing force outward in the radial direction to at least a part of the inner circumferential surface, wherein the pressing force outward in the radial direction to at least the part of the inner circumferential surface is applied by a rotation of the second member around an axis of the first through-hole relative to the first member, and the second member is held in the first member by reaction of the pressing force and deforms the first member for diameter expansion with the pressing force to press the outer circumferential surface of the first member against the hole inner circumferential surface, the second member includes a flange section whose outer circumferential edge portion is located outside in the radial direction than the hole inner circumferential surface.

58. A metal collar to be attached in a first through-hole formed in an FRP member, the metal collar forming a second through-hole extending through the FRP member, the metal collar comprising:

a first collar member which includes an outer circumferential surface that comes into contact with a hole inner circumferential surface of the first through-hole when being attached in the first through-hole and an inner circumferential surface located on an inner side of the outer circumferential surface in a radial direction of the first through-hole, and which is provided with a slit in a part of the first collar member in a circumferential direction of the outer circumferential surface, the slit communicating from one end face to another end face of the first collar member, and thereby is configured to be deformable in the radial direction of the first through-hole; and a second collar member including a pressing surface that applies a pressing force outward in the radial direction to at least a part of the inner circumferential surface, where the pressing force is applied when the second collar member is fitted into the inner circumferential surface of the first collar member and rotated around an axis of the first through-hole relative to the first collar member, wherein the second collar member is configured to be held in the first collar member by reaction of the pressing force and deform the first collar member for diameter expansion with the pressing force to press the outer circumferential surface of the first collar member against the hole inner circumferential surface, the second collar member includes a flange section whose outer circumferential edge portion is located outside in the radial direction than the hole inner circumferential surface.

59. The metal collar according to claim 58, wherein microcapsules containing an adhesive are applied to at least one of a pressing surface of the second collar member and the inner circumferential surface of the first collar member to which the pressing force is applied by the pressing surface, and the microcapsules are configured to be broken by the pressing force such that the adhesive encapsulated inside the microcapsules is discharged.

60. The metal collar according to claim 58, wherein microcapsules containing an adhesive are applied to the outer circumferential surface of the first collar member, and the microcapsules are configured to be broken by a press force exerted by pressing the outer circumferential surface of the first collar member against the hole inner circumferential surface, and to discharge the adhesive encapsulated inside the microcapsules.

61. The metal collar according to claim 58, wherein the second collar member includes an outer circumferential surface opposed in the radial direction to the inner circumferential surface of the first collar member and the flange section extends outward in the radial direction from an end portion of the outer circumferential surface, a side surface on the flange section side of the first collar member and a side surface on the first collar member side of the flange section are opposed to in an axial direction of the first through-hole and in contact with each other, in a cross section perpendicular to the axial direction of the first through-hole, the outer circumferential surface of the second collar member and the inner circumferential surface of the first collar member are respectively formed in rounded regular polygonal shapes and a sum of a distance from a center of the outer circumferential surface of the second collar member to a most distant point of a convex surface corresponding to a corner of the regular polygonal shape on the outer circumferential surface and a maximum value of an average thickness T in the radial direction of the first collar member is larger than a maximum value of a radial direction distance from a center of the hole inner circumferential surface to the hole inner circumferential surface, the convex surface of the second collar member forms the pressing surface that applies the pressing force outward in the radial direction to the inner circumferential surface of the first collar member, on the outer circumferential surface of the second collar member and the inner circumferential surface of the first collar member, tapers for reducing radial direction dimensions of the outer circumferential surface and the inner circumferential surface toward the flange section are provided, and microcapsules containing an adhesive are applied to at least one of the side surface on the flange section side of the first collar member and the side surface on the first collar member side of the flange section, where the average thickness T is a value obtained by dividing, by n, a sum of thicknesses in the radial direction of the first collar member in n positions separated from one another by 360°/n in the circumferential direction of the inner circumferential surface of the first collar member and n is a number of corners of the regular polygonal shape.

62. The metal collar according to claim 59, wherein the adhesive is a foamable adhesive that foams and hardens when being discharged from the microcapsules.

63. A fastening part structure for an FRP member comprising:

a metal collar attached in a first through-hole formed in the FRP member, the metal collar forming a second through-hole extending through the FRP member, wherein the metal collar includes:

an annular or tubular outer collar member, an outer circumferential surface of which is in contact with a hole inner circumferential surface of the first through-hole, a part of the outer collar member in a circumferential direction of the outer circumferential surface being provided with a slit communicating from one end face to another end face of the outer collar member; and an inner collar member fitted into an inner circumferential surface of the outer collar member, at least a part of an outer circumferential surface of the inner collar member being in contact with at least a part of the inner circumferential surface to apply a pressing force outward in a radial direction of the first through-hole to at least the part of the inner circumferential surface, wherein the pressing force is applied by a rotation of the inner collar member around an axis of the first through-hole relative to the outer collar member, and the inner collar member is held in the outer collar member by reaction of the pressing force, and applies the pressing force to deform the outer collar member for diameter expansion and to press the outer circumferential surface of the outer collar member against the hole inner circumferential surface, wherein a self-tapping screw having an outer diameter larger than a value obtained by subtracting a double of thickness in the radial direction of the outer collar member from an inner diameter of the hole inner circumferential surface is formed on the outer circumferential surface of the inner collar member, and a screw thread of the self-tapping screw bites into the inner circumferential surface of the outer collar member to apply the pressing force outward in the radial direction to the inner circumferential surface.

64. A method of attaching a metal collar in a first through-hole formed in an FRP member, the metal collar forming a second through-hole extending through the FRP member, the method comprising:

preparing a metal collar including:

an annular or tubular outer collar member which includes an outer circumferential surface that comes into contact with a hole inner circumferential surface of the first through-hole when the outer collar member is attached in the first through-hole, and which is provided with a slit in a part of the outer collar member in a circumferential direction of the outer circumferential surface, the slit communicating from one end face to another end face of the outer collar member, and thereby is configured to be deformable in a radial direction of the first through-hole; and an inner collar member including, at least in a part of an outer circumferential surface, a pressing surface capable of applying a pressing force outward in the radial direction to at least a part of an inner circumferential surface of the outer collar member when the inner collar member is fitted into the inner circumferential surface;

fitting the outer collar member into the hole inner circumferential surface of the first through-hole;

fitting the inner collar member into the inner circumferential surface of the outer collar member;

bringing the pressing surface into contact with at least a part of the inner circumferential surface of the outer collar member to apply a pressing force outward in the radial direction from the pressing surface to at least a part of the inner circumferential surface by rotating the inner collar member around an axis of the first through-hole relative to the outer collar member, forming, on an outer circumferential surface of the inner collar member, a self-tapping screw having an outer diameter larger than a value obtained by subtracting a double of thickness in the radial direction of the outer collar member from an inner diameter of the hole inner circumferential surface; and after fitting the outer collar member into the hole inner circumferential surface, screwing the self-tapping screw into the inner circumferential surface of the outer collar member and causing a screw thread of the self-tapping screw to bite into the inner circumferential surface of the outer collar member, wherein the inner collar member is held in the outer collar member with reaction of the pressing force and deforms the outer collar member for diameter expansion with the pressing force to press the outer circumferential surface of the outer collar member against the hole inner circumferential surface.

* * * * *